US012595649B2

(12) United States Patent
Garrels et al.

(10) Patent No.: US 12,595,649 B2
(45) Date of Patent: Apr. 7, 2026

(54) FLUIDICS DEVICES FOR PLUMBING FIXTURES

(71) Applicant: Kohler Co., Kohler, WI (US)

(72) Inventors: Clayton C. Garrels, Kohler, WI (US); William C. Kuru, Plymouth, WI (US); William Kalk, Sheboygan, WI (US); Randal S. Graskamp, Sheboygan, WI (US); Jason Kwacz, Kohler, WI (US)

(73) Assignee: Kohler Co., Kohler, WI (US)

( * ) Notice: Subject to any disclaimer, the term of this patent is extended or adjusted under 35 U.S.C. 154(b) by 713 days.

(21) Appl. No.: 17/522,526

(22) Filed: Nov. 9, 2021

(65) Prior Publication Data

US 2022/0064929 A1 Mar. 3, 2022

Related U.S. Application Data

(63) Continuation-in-part of application No. 16/864,746, filed on May 1, 2020, now Pat. No. 11,739,517.

(60) Provisional application No. 62/849,522, filed on May 17, 2019.

(51) Int. Cl.

| | |
|---|---|
| ***E03D 11/08*** | (2006.01) |
| ***B05B 1/08*** | (2006.01) |
| ***B05B 1/18*** | (2006.01) |

(52) U.S. Cl.

CPC ................ *E03D 11/08* (2013.01); *B05B 1/08* (2013.01); *B05B 1/18* (2013.01); *E03D 2201/40* (2013.01)

(58) Field of Classification Search

CPC ........................................................ B05B 1/08

See application file for complete search history.

(56) References Cited

U.S. PATENT DOCUMENTS

| | | | | |
|---|---|---|---|---|
| 3,122,165 A | | 2/1964 | Horton et al. | |
| 3,185,166 A | | 5/1965 | Horton et al. | |
| 3,217,727 A | * | 11/1965 | Spyropoulos ............. | F15C 1/22 137/829 |
| 3,224,674 A | | 12/1965 | Warren | |
| 3,226,023 A | | 12/1965 | Horton | |
| 3,263,695 A | | 8/1966 | Scudder et al. | |
| 3,306,538 A | | 2/1967 | Mccracken, Jr. | |
| 3,338,515 A | | 8/1967 | Dexter | |

(Continued)

FOREIGN PATENT DOCUMENTS

| | | |
|---|---|---|
| CN | 2525791 Y | 12/2002 |
| DE | 77 04 324 | 6/1977 |

(Continued)

OTHER PUBLICATIONS

Chinese Office Action for Chinese Application No. 202010413547.X dated Apr. 16, 2021.

(Continued)

*Primary Examiner* — Lauren A Crane

(74) *Attorney, Agent, or Firm* — Lempia Summerfield Katz LLC

(57) ABSTRACT

A shower head includes a water input pipe, a fluidic oscillator, and at least one water outlet. The water input pipe is configured to supply a flow of water. The fluidic oscillator includes at least one predetermined geometry to control the flow of water ejected from the fluidic oscillator to include a repeating fan of water at a predetermined angle range. The at least one water outlet is configured to provide the flow water including the repeating pattern of water.

16 Claims, 64 Drawing Sheets

(56) References Cited

U.S. PATENT DOCUMENTS 3,398,759 A 8/1968 Rose
3,417,770 A 12/1968 Denison
3,425,430 A 2/1969 Horton
3,425,432 A 2/1969 Langley
3,442,281 A 5/1969 Warren
3,452,771 A 7/1969 Kirshner et al.
3,461,898 A 8/1969 Bellman et al.
3,468,220 A 9/1969 Lazar
3,468,326 A 9/1969 Cohen
3,474,805 A 10/1969 Swartz
3,490,293 A 1/1970 Evans
3,490,408 A 1/1970 Monge et al.
3,490,475 A * 1/1970 Mcleod, Jr. ............... F15C 1/22 137/833
3,495,609 A 2/1970 Swartz
3,504,691 A 4/1970 Campagnuolo et al.
3,528,442 A 9/1970 Campagnuolo
3,528,443 A 9/1970 Swartz
3,534,755 A 10/1970 Urbanosky
3,552,414 A 1/1971 Sutton
3,552,415 A 1/1971 Small
3,557,814 A 1/1971 Neradka
3,563,462 A * 2/1971 Bauer ................... B05B 1/1645 239/456
3,584,635 A 6/1971 Warren
3,589,381 A 6/1971 Yamamoto et al.
3,599,653 A 8/1971 Clayton
3,719,195 A 3/1973 Matsuda
3,741,481 A * 6/1973 Bauer ....................... B05B 1/08 239/589.1
3,776,460 A 12/1973 Fichter
3,820,716 A 6/1974 Bauer
3,825,739 A 7/1974 Richards et al.
3,998,386 A * 12/1976 Viets ......................... F15C 1/22 239/464
4,029,127 A 6/1977 Thompson
4,151,955 A 5/1979 Stouffer
4,185,777 A 1/1980 Bauer
4,231,519 A 11/1980 Bauer
4,398,664 A 8/1983 Stouffer
4,508,267 A 4/1985 Stouffer
4,863,302 A 9/1989 Herzfeld et al.
RE33,158 E 2/1990 Stouffer et al.
RE33,159 E 2/1990 Bauer
5,363,704 A 11/1994 Huang
5,396,808 A 3/1995 Huang et al.
5,540,248 A 7/1996 Drzewiecki et al.
5,884,360 A 3/1999 Palffy
5,893,383 A 4/1999 Facteau
5,971,301 A 10/1999 Stouffer et al.
6,186,409 B1 2/2001 Srinath et al.
6,457,658 B2 10/2002 Srinath et al.
6,575,386 B1 6/2003 Thurber et al.
6,651,266 B1 11/2003 Liu
6,729,564 B2 5/2004 Srinath et al.
6,805,164 B2 10/2004 Stouffer
6,860,157 B1 3/2005 Yang et al.
6,904,626 B1 6/2005 Hester et al.
6,948,244 B1 9/2005 Crockett
6,976,507 B1 12/2005 Webb et al.
7,070,129 B1 7/2006 Raghu et al.
7,111,800 B2 9/2006 Berning et al.
7,267,290 B2 9/2007 Gopalan et al.
7,404,416 B2 7/2008 Schultz et al.
7,472,847 B2 1/2009 Mukai et al.
7,472,848 B2 1/2009 Gopalan et al.
7,478,764 B2 1/2009 Gopalan
7,621,463 B2 11/2009 Presz et al.
7,677,480 B2 3/2010 Russell et al.
7,766,261 B1 8/2010 Santamarina et al.
7,775,456 B2 8/2010 Gopalan et al.
8,205,812 B2 6/2012 Hester et al.
8,297,529 B2 10/2012 Smith et al.
8,387,171 B2 3/2013 Farber et al.
8,603,257 B2 12/2013 Burt et al.
8,662,421 B2 3/2014 Russell et al.
8,770,229 B2 7/2014 Gopalan et al.
8,800,894 B2 8/2014 Cheng et al.
8,869,320 B1 10/2014 Santamarina et al.
9,089,856 B2 7/2015 Gopalan et al.
9,108,711 B2 8/2015 Krueger
9,162,237 B2 10/2015 Huffington et al.
9,168,540 B2 10/2015 Zhou et al.
9,333,517 B2 5/2016 Koklu
9,339,825 B2 5/2016 Koklu
9,566,593 B2 2/2017 Marty et al.
9,618,150 B2 4/2017 Bauer et al.
9,737,181 B1 8/2017 Hall
9,789,496 B2 10/2017 Koklu
9,802,209 B2 10/2017 Koklu
9,821,324 B2 11/2017 Hartranft et al.
10,071,386 B2 9/2018 Ukigai et al.
10,086,388 B2 10/2018 Gopalan et al.
10,155,232 B2 12/2018 Hartranft et al.
10,427,175 B2 10/2019 Nagata et al.
2005/0252539 A1* 11/2005 Maruyama ................ B60S 1/52 134/123
2006/0021665 A1 2/2006 Buyalsky
2006/0219822 A1 10/2006 Miller et al.
2007/0295840 A1 12/2007 Gopalan et al.
2008/0121295 A1 5/2008 Tippetts
2008/0216222 A1 9/2008 Farber
2009/0045268 A1* 2/2009 Selander ............... B05B 12/126 239/310
2010/0072307 A1* 3/2010 Hester ....................... B05B 1/08 239/589.1
2011/0061692 A1 3/2011 Gopalan
2011/0233301 A1 9/2011 Gopalan et al.
2012/0266920 A1* 10/2012 Burt ........................ E03D 9/032 4/224
2013/0299608 A1 11/2013 Spangler et al.
2015/0315998 A1 11/2015 Krueger
2017/0087567 A1 3/2017 Nagata et al.
2017/0087568 A1 3/2017 Nagata et al.
2017/0087569 A1 3/2017 Nagata et al.
2017/0087570 A1 3/2017 Ukigai et al.
2017/0165687 A1 6/2017 Ukigai et al.
2017/0247871 A1 8/2017 Mukerji
2018/0161786 A1 6/2018 Bobusch et al.
2018/0318855 A1 11/2018 Russell et al.
2020/0254464 A1* 8/2020 Romack ................ B29C 64/112
2021/0023580 A1 1/2021 Lim

FOREIGN PATENT DOCUMENTS

DE 77 07 270 U1 6/1978
DE 27 10 238 9/1978
EP 1 827 703 9/2007
JP 2000-120141 4/2000
JP 2017-064100 4/2017
JP 2017-064394 4/2017
JP 2017-108832 6/2017
JP 2017-109153 6/2017
JP 6241815 12/2017
JP 2018-110780 7/2018
JP 2018-166685 11/2018
JP 2018-167164 11/2018
WO WO-2016/198449 12/2016
WO WO-2017/192704 11/2017
WO WO-2018/197231 11/2018
WO WO-2019/020516 1/2019
WO 2022051605 A1 3/2022

OTHER PUBLICATIONS

European Search Report cited in related Application No. 20173393.8, mailed Oct. 1, 2020 (10 pages).

Chinese Office Action from Chinese Patent Application No. 202010413547.X, dated Apr. 6, 2022, 12 pages (including English summary), CN.

Chinese Office Action for Chinese Application No. 202010413547.X dated Dec. 2, 2021.

(56) References Cited

OTHER PUBLICATIONS

Extended European Search Report from European Patent Application No. 25187668.6, dated Oct. 16, 2025, 11 pages.

* cited by examiner

2400

FLUIDICS DEVICES FOR PLUMBING FIXTURES

CROSS-REFERENCE TO RELATED PATENT APPLICATIONS

This application is a continuation-in-part under 35 U.S.C. § 120 and 37 C.F.R. § 1.53(b) of U.S. patent application Ser. No. 16/864,746 filed May 1, 2020, which claims the benefit of and priority to U.S. Provisional Application No. 62/849,522, filed May 17, 2019, the entire disclosure of which is hereby incorporated by reference herein.

BACKGROUND

The present disclosure relates generally to plumbing fixtures with water delivery functionality. More specifically, the present disclosure relates to the application of fluidics devices to improve performance of plumbing fixtures.

Commercial and residential plumbing fixtures such as toilets, faucets, showers, whirlpool tubs, and urinals rely on continuous stream flows (e.g., steady-state flows, etc.) of water to perform working operations. For example, toilets rely on the continuous streams of water from a rim or a sump of a toilet bowl to clean the surfaces of a toilet bowl and to remove waste from the toilet bowl during a flush. Similarly, faucets and sprayers utilize a continuous stream of water to provide cleaning action. However, continuous stream flows are not always effective at achieving the intended goals of the product. In the toilet example, continuous stream flows may not be enough to remove all of the waste from the toilet bowl or to fully clean the surfaces of the toilet bowl. Larger volumes of water or higher intensity flows may be required to ensure sufficient cleaning capabilities are provided by the plumbing fixtures.

Many plumbing fixtures also include valves for controlling multiple independent jets. The valves are used to coordinate the operation and timing of each jet for the plumbing fixture. For example, a toilet may include a rim jet in a rim of the toilet bowl and a sump jet in a sump of the toilet bowl. The toilet may include electronic valves that coordinate the release of water from the rim jet and the sump jet. At the beginning of a flush, water may be provided to the sump jet to remove water contained within the toilet bowl. After the water/waste has been removed from the toilet bowl, the electronic valve may switch so that water is provided to the rim jet. Water flowing from the rim jet refills the toilet bowl and cleans the surfaces of the toilet bowl. Other applications may include electronic valves and control circuits to perform other water delivery and timing functions. However, these electronic valves typically have many moving parts and the valve and associated control circuits are expensive to manufacture.

SUMMARY

One exemplary embodiment relates to a toilet assembly. The toilet assembly includes a toilet body and a fluidic oscillator. The toilet body defines a toilet bowl that is configured to receive a volume of fluid therein. The fluidic oscillator is coupled to the toilet body in a rim area of the toilet bowl. The fluidic oscillator is positioned to direct a fluid onto an inner surface of the toilet bowl. The fluidic oscillator is configured to continuously redirect the flow of fluid to different locations along the inner surface of the toilet bowl.

Another exemplary embodiment relates to a toilet assembly. The toilet assembly includes a toilet body and a plurality of fluidic oscillators. The toilet body defines a toilet bowl that is configured to receive a volume of fluid therein. The plurality of fluidic oscillators is positioned to direct fluid onto an interior surface of the toilet bowl. The fluidic oscillators are fluidly connected to one another in a ring shaped arrangement that extends along a perimeter of the toilet bowl.

Yet another exemplary embodiment relates to a flushing system. The flushing system includes a plurality of fluidic oscillators that are fluidly connected together in a ring shaped arrangement. The plurality of fluidic oscillators is configured to be positioned within a rim area of a toilet bowl. The plurality of fluidic oscillators is configured to continuously redirect the flow of a fluid to different locations along an inner surface of the toilet bowl.

DETAILED DESCRIPTION

Figure 1:
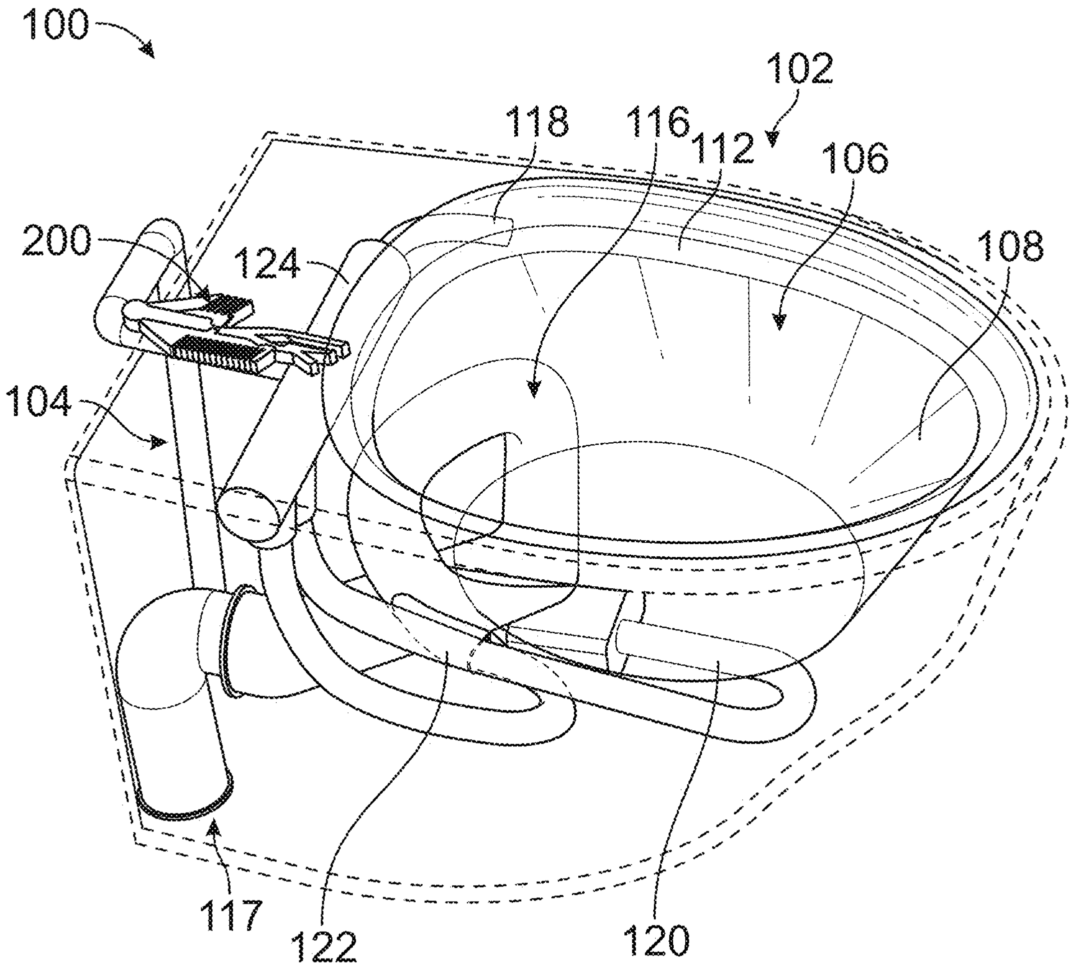
FIG. 1 is a top perspective view of a line pressure toilet including a fluid control circuit, according to an exemplary embodiment.

Referring generally to the figures, a plumbing fixture includes one or more fluidics devices or structures that are configured to control the flow of water through one or more jets (e.g., fluid outlets, outlet openings, etc.) of the plumbing fixture. The plumbing fixture may be a plumbing fixture used in a building such as a toilet, faucet, shower head, hand sprayer, bath tub, or the like. The fluidics devices include interconnected flow channels (e.g., passages, etc.) that include geometries which may be altered to selectively control the flow of water ejected from the fluidics devices. For example, the channels may be configured to provide pulsating or oscillating flows of water to achieve improved water delivery performance through the plumbing fixture, which, advantageously, improves the cleaning capabilities of the plumbing fixture. Alternatively, or in combination, the fluidics devices may be configured to control the timing of the flow through the one or more jets.

One embodiment of the present disclosure relates to a plumbing fixture. The plumbing fixture includes a plurality of jets and a fluidic oscillator configured to switch the flow of water between the jets or pulsate the flow of water to the jets.

In some embodiments, the fluidic oscillator includes an inlet channel, an outlet channel, and a resonant chamber. In some embodiments, the plumbing fixture includes an actuator configured to modify the volume of the resonant chamber.

In some embodiments, the plumbing fixture includes a plurality of fluidic oscillators. In some embodiments, a first fluidic oscillator of the plurality of fluidic oscillators is arranged in a series flow arrangement with a second fluidic oscillator of the plurality of fluidic oscillators.

In some embodiments, the plumbing fixture includes a toilet including a toilet bowl, a rim jet disposed in a rim area of the toilet bowl, and a sump jet disposed in a sump of the toilet bowl. The toilet also includes a first fluidic oscillator. A first leg of the first fluidic oscillator is fluidly coupled to the rim jet. A second leg of the first fluidic oscillator is fluidly coupled to the sump jet. In some embodiments, at least one leg of the first fluidic oscillator is fluidly coupled to a second fluidic oscillator.

In some embodiments, the plumbing fixture includes a shower head including a first plurality of jets and a second plurality of jets. In some embodiments, the second plurality of jets circumferentially surrounds the first plurality of jets. In some embodiments, the jets include multiple shower heads.

In some embodiments, the plumbing fixture includes a bath including multiple whirlpool jets. Each whirlpool jet includes an upper stage fluidic oscillator fluidly coupled to a lower stage fluidic oscillator. In some embodiments, an operating frequency of the upper stage fluidic oscillator is lower than an operating frequency of the lower stage fluidic oscillator.

In some embodiments, the plumbing fixture includes a bath. The plurality of jets includes a porous material beneath a water line of the bath. The fluidic oscillator is configured to provide a pulsating flow of air through a first outlet channel of the fluidic oscillator. The first outlet channel of the fluidic oscillator is fluidly coupled to the porous material.

In some embodiments, the plumbing fixture includes a faucet including a nozzle insert having a fluidic oscillator disposed thereon.

Another embodiment of the present disclosure relates to a plumbing fixture. The plumbing fixture includes a plurality of jets and a fluid control circuit configured to control the operation and timing of the jets. The fluid control circuit includes a fluidics device including at least one of a flow restrictor and a fluidic oscillator.

In some embodiments, the plumbing fixture includes a toilet including a toilet bowl. In some embodiments, the jets include at least two of a sump jet located in a sump of the toilet bowl, a priming jet located in a trapway of the toilet, and a rim jet located in a rim area of the toilet bowl.

Another embodiment of the present disclosure relates to a plumbing fixture. The plumbing fixture includes a fluidic oscillator including an inlet channel, a resonant chamber fluidly coupled to the inlet channel, an outlet channel fluidly coupled to the inlet channel, and an output chamber fluidly coupled to the output channel. The fluidic oscillator includes an outlet opening disposed on the outlet chamber. A cross-sectional area of the outlet opening is less than a cross-sectional area of the outlet chamber.

In some embodiments, the plumbing fixture includes a bath including a whirlpool jet. The fluidic device is at least partially disposed in a jet channel of the whirlpool jet.

Another embodiment of the present disclosure relates to a toilet including a toilet bowl and a sump at a base of the toilet bowl. The toilet includes a sump jet disposed in the sump and configured to provide water to the sump. The toilet further includes a fluidics device fluidly coupled to the sump jet. In some embodiments, the fluidics device is a fluidic oscillator configured to generate specialty flows.

Another embodiment of the present disclosure relates to a plumbing fixture. The plumbing fixture includes a fluid diverter. The fluid diverter includes an input channel, a first output channel, a second output channel, and a plurality of control ports. The input channel is fluidly coupled to one of the first output channel and the second output channel by pulsing flow through one of the plurality of control ports.

Another embodiment of the present disclosure relates to a plumbing fixture. The plumbing fixture includes a fluidic oscillator including an input channel, a first output channel, a second output channel, and a resonant chamber. The plumbing fixture includes a venturi fluidly coupled to at least one of the first output channel and the second output channel.

In some embodiments, the plumbing fixture includes a shower head including a plurality of jets and a plurality of venturis. Each jet of the shower head is fluidly coupled to one of the first output channel and the second output channel and a corresponding one of the plurality of venturis.

According to an exemplary embodiment, the plumbing fixture includes a toilet including a fluidic oscillator. The toilet may be a line pressure toilet or a gravity-fed siphonic toilet. The toilet includes a toilet bowl including a rim area along an upper perimeter of the toilet bowl and a sump at a base of the toilet bowl. The toilet includes at least one of a rim jet disposed in the rim area of the toilet and a sump jet disposed in the sump of the toilet. The fluidic oscillator is fluidly coupled to each of the rim jet and the sump jet and configured to coordinate the release of water through each jet during a flushing cycle. More specifically, the fluidic oscillator is configured to quickly switch the flow between the rim jet and the sump jet. Among other benefits, the fluidic oscillator reduces flow losses as compared with a toilet where a continuous stream of water is split evenly between the rim jet and the sump jet. In some embodiments, the toilet includes a plurality of fluidic oscillators coupled together (e.g., arranged in a series and/or parallel flow arrangement).

According to an exemplary embodiment, the toilet includes a fluidic diverter valve that controls the flow of water from an inlet channel (e.g., leg, passage, etc.) of the fluidic diverter valve to one of two outlet channels of the fluidic diverter valve. The direction of flow leaving the inlet channel, to one of the two outlet channels, may be controlled by pulsing flow through one of two control ports of the fluidic diverter valve.

According to an exemplary embodiment, the toilet includes a fluid control circuit configured to control an operating sequence of each of the rim jet and the sump jet. The fluid control circuit includes a plurality of interconnected fluidics devices. The fluid control circuit may include the fluidic oscillator configured to switch the direction of fluid flow between two or more channels and/or the fluidic diverter valve. Alternatively, or in combination, the fluid control circuit may include a flow restrictor configured to delay the delivery of water to different parts of the fluid control circuit (e.g., to one or more openings and/or channels within the fluid control circuit, etc.). The fluid control circuit may include a combination of curved and straight walls and utilize the coanda effect (e.g., the tendency of a fluid to remain attached to a curved or convex surface) to facilitate flow switching between channels of the fluid control circuit. Among other benefits, the fluid control circuit includes no moving parts and eliminates the need for complex flow switching valves in order to control jets in the toilet during a flush cycle.

According to an exemplary embodiment, the toilet includes a trapway that fluidly couples the sump to a drain of the toilet. The toilet also includes a priming jet disposed within an upward leg of the trapway. The fluid control circuit may be configured to coordinate operation of the priming jet and the sump jet during a flush cycle which, advantageously, reduces the amount of water required to trigger a siphon and increases the waste removal performance of the toilet.

The fluidic oscillator may also be utilized within the plumbing fixture to generate specialty jets (e.g., flow structures resulting from pulse jets, etc.). For example, the fluidic oscillator may be configured to generate toroidal jets or other jet types, which for the same mass flux of water, generate greater momentum and material removal performance than a continuously flowing jet (e.g., a jet configured to eject a continuous stream of water). As a result of their effectiveness, specialty jets require less fluid to operate, which minimizes audible noise generated by the jet. The fluidic oscillator may be disposed at least partially within an inlet conduit upstream of the sump jet or integrally formed with the sump jet in order to improve waste removal performance (e.g., the removal of stuck-on waste from the surfaces of the sump, trapway, etc.) during the flush cycle.

According to an exemplary embodiment, the fluidics devices of the present disclosure are machined, molded, or otherwise formed into a fluidic valve body (e.g., a modular insert). The fluidic valve body may be removably coupled to the toilet or suspended within an inner cavity of the toilet to improve the aesthetic of the toilet. The fluidic valve body may be fluidly coupled to the one or more jets using hoses. Alternatively, the fluidic devices may be at least partially molded (e.g., cast, etc.) into the toilet from one or more pieces of vitreous clay.

The fluidic devices of the present disclosure may also be integrated into a variety of other plumbing fixtures to improve cleaning performance, reduce water consumption, and/or to improve overall user experience. According to an exemplary embodiment, the plumbing fixture includes a shower head including a plurality of jets. Each jet of the shower head includes a venturi fluidly coupled to a fluidic oscillator. A pulsating flow of water is provided to each jet by the fluidic oscillator, which causes air to be injected by the venturi into the fluid stream. A "bubble" of air is injected into the flow as water pulses through the venturi, breaking up the flow into discrete packets (e.g., droplets, etc.) that are ejected from the jet. Among other benefits, injecting these discrete packets of air into the flow stream minimizes water consumption while maintaining the perception of continuous flow through the jet.

According to an exemplary embodiment, the fluidic oscillator for the shower head includes a resonant chamber, the volume of which sets a frequency of the flow pulses from each jet. The shower head includes an actuator that may be used to modify the volume of the resonant chamber and thereby modify the frequency of the flow pulses depending on user preferences. For example, the frequency of flow pulses may be adjusted to improve cleaning capability of the shower head or to give a user the perception of a continuously flowing stream of water by increasing the frequency of the flow pulses.

According to an exemplary embodiment, the plumbing fixture is a bath (e.g., a whirlpool bath, etc.). The bath includes a plurality of whirlpool jets. Similar to the toilet application, each jet of the bath may be fluidly coupled to a fluidic oscillator or a plurality of fluidic oscillators (e.g., arranged in a series and/or parallel flow configuration). The frequency of the water pulses provided by the jets may be dynamically controlled using an actuator as described with reference to the shower head application. The fluidic oscillator may also be configured to generate specialty flow jets (e.g., toroidal jets, etc.) as described with reference to the sump jet for the toilet application. Among other benefits, specialty jets such as toroidal jets may improve flow penetration into a volume of water relative to a jet producing a continuously flowing stream of water.

According to an exemplary embodiment, the bath includes a fluidic oscillator configured to generate microbubbles within the bath. The bath includes a porous material beneath a water line (e.g., fill line, etc.) of the bath. An inlet of the fluidic oscillator is fluidly coupled to a source of air (e.g., an environment surrounding the bath). An outlet channel (e.g., leg, passage, etc.) of the fluidic oscillator is fluidly coupled to the porous material. The fluidic oscillator injects pulses of air through the porous material to generate small bubbles in the tub fill. The fluidic oscillator is capable of generating billions of bubbles per second in a variety of sizes depending on its geometry and the geometry of the porous material. Among other benefits, the bubbles are generated without the use of perforations or holes in the wall of the bath, which advantageously reduces the effort required to clean and maintain the bath between uses.

According to an exemplary embodiment, the plumbing fixture includes a faucet (e.g., a kitchen or bathroom faucet) including a fluidic oscillator disposed thereon. The fluidic oscillator may be included as part of a nozzle insert (e.g., channels, passageways, etc. of the fluidic oscillator may be machined or otherwise formed onto the surfaces of the insert), which may be retrofit onto existing faucets in order to reduce water consumption and improve the cleaning capabilities of the faucet.

In any of the above embodiments, a fluidic oscillator may be coupled to one or more surfaces of the plumbing fixture to improve flow distribution and cleaning of the plumbing fixture. The fluidic oscillator may be configured to continuously vary the flow direction of water leaving the jets to more uniformly distribute water over a surface of the plumbing fixture (e.g., an inner surface of a toilet bowl, a shower wall, an interior wall of a bath, a sink basin, etc.). The fluidic oscillator may be coupled to a pulsating-flow type fluidic oscillator in order to improve its cleaning capability for a fixed flow rate of water. These and other advantageous features will become apparent to those reviewing the present disclosure and figures.

Toilet

Figure 2:
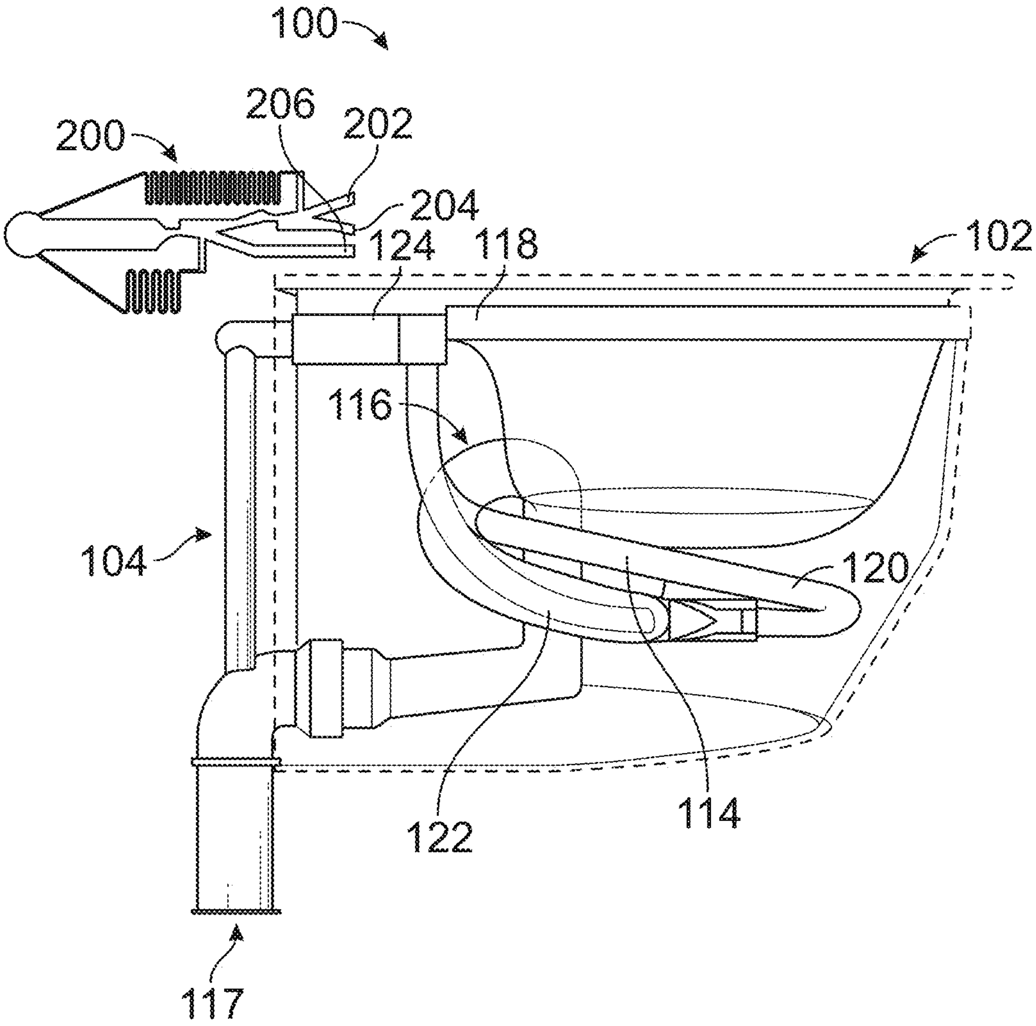
FIG. 2 is a side view of the line pressure toilet of FIG. 1.

Referring to FIGS. 1-2, a line pressure toilet 100 is shown, according to an exemplary embodiment. The line pressure toilet 100 includes a toilet body 102. As shown in FIG. 1, the toilet body 102 is a tankless toilet configured to receive water from a water supply conduit 104. The water supply conduit 104 may be a water supply line inside a household, a commercial property, or another type of building. The water supply conduit 104 may be configured to supply water at a city water pressure or a well pump pressure. The water supply conduit 104 may be a pipe, tube, or other water delivery mechanism extending from a wall of the building. As shown in FIGS. 1-2, the toilet body 102 includes a toilet bowl 106. The toilet bowl 106 includes a surface 108 (e.g., an inner surface, an interior surface, etc.) defining a cavity into which solid or liquid waste may be deposited. The toilet bowl 106 includes a rim 112 proximate to an upper edge of the toilet bowl 106. The rim 112 may extend inward from an outer edge of the toilet bowl 106. In some embodiments, the toilet body 102 is made (e.g., cast or otherwise formed) from a single piece of vitreous material such as clay. The toilet body 102 may include one or more openings (e.g., slots, holes, etc.) configured to receive trim, tubing, and/or other components/hardware to facilitate operation of the line pressure toilet 100.

As shown in FIGS. 1-2, the toilet 100 includes a sump 114 disposed at a base (e.g., lower end, etc.) of the toilet bowl 106. The toilet 100 also includes a trapway 116 (e.g., siphon, etc.) extending between the sump 114 and a drain 117 of the toilet 100, and fluidly coupling the sump 114 to the drain 117. The toilet 100 further includes a plurality of jets configured to facilitate flushing operations for the toilet 100 including a rim jet 118 disposed proximate the rim 112 of the toilet bowl 106, a sump jet 120 disposed proximate the sump 114 of the toilet bowl 106, and a priming jet 122 disposed in an upward leg of the trapway 116. The rim jet 118 is configured to dispense water from the rim 112 into the toilet bowl 106 along the surface 108 (e.g., inner surface, interior surface, etc.) of the toilet bowl 106. The rim jet 118 cleans the surface 108 and also refills the toilet bowl 106 with water at the end of a flush. The sump jet 120 is configured to dispense water from a forward wall of the sump 114 toward the trapway 116. In some embodiments, the sump jet 120 may be used to trigger (e.g., initiate, etc.) a siphon by pushing water out through the upward leg of the trapway 116. In other embodiments, operation of the sump jet 120 is augmented by the priming jet 122. Similar to the sump jet 120, the priming jet 122 is oriented within the trapway 116 and is configured to push water along the upward leg of the trapway 116 (e.g., through the trapway 116 toward the drain 117). According to an exemplary embodiment, the toilet 100 is configured to coordinate operation of the sump jet 120 and the priming jet 122 to improve momentum transfer of water from the toilet bowl 106 through the upward leg of the trapway 116, thereby improving waste removal (e.g., the removal of skid marks and other waste from the toilet bowl 106) and minimizing water consumption during a flush.

As shown in FIGS. 1-2, the line pressure toilet 100 includes a fluid control circuit 200 configured to drive two or more jets such as rim jet 118, sump jet 120, and priming jet 122. The fluid control circuit 200 includes a fluidics device configured to control the activation and timing of the jets. According to an exemplary embodiment, the fluid control circuit 200 is coupled to the toilet 100 beneath an upper surface of the toilet 100, in-between the toilet bowl 106 and a back wall of the toilet 100 (e.g., a mounting surface of the toilet configured to engage with a wall in a building). In other embodiments, the placement of the fluid control circuit 200 may be different. As shown in FIGS. 1-2, the fluid control circuit 200 is disposed above a water line of the toilet bowl 106 to allow water to drain from the fluid control circuit 200 in between flushes. As shown in FIG. 1, the fluid control circuit 200 is at least partially disposed within an inlet channel of the toilet 100 and extends between the inlet channel and a flow control manifold 124 of the toilet 100. The flow control manifold 124 is configured to selectively couple each outlet (e.g., first outlet 202, second outlet 204, and third outlet 206) of the flow control circuit 200 to a corresponding one of the jets. In some embodiments, the flow control circuit 200 is integrally formed with the toilet body 102 (e.g., from vitreous clay, etc.). In other embodiments, the flow control circuit 200 is machined, molded, or otherwise formed as a fluidic valve body that is removably (e.g., detachably) coupled to the toilet body 102.

The flow control circuit 200 may be made from a variety of materials including plastics, metals, etc. The fluidic valve body may be fluidly coupled to the inlet channel and jets (e.g., rim jet 118, sump jet 120, and priming jet 122) using hoses, tubes, or other flow conduit. Among other benefits, using a removable fluidic valve body simplifies replacement of the fluid control circuit 200 during maintenance events. The fluidic valve body may also be used to retrofit complex and expensive electronic valve assemblies used in existing toilets.

The fluidics device includes at least one of a fluidic oscillator configured to switch the flow between two different flow channels (e.g., a bi-stable fluidic oscillator) or a direction of the flow (e.g., a mono-stable fluidic oscillator), and a flow restrictor configured control timing of flow delivery to one or more channels or openings of the fluid control circuit 200. As shown in FIGS. 1-2, the fluid control circuit 200 includes an inlet 208, a first outlet 202, a second outlet 204, and a third outlet 206. In other embodiments, the fluid control circuit 200 may include additional or fewer inlet/outlet channels. According to an exemplary embodiment, the first outlet 202 of the fluid control circuit 200 is fluidly coupled to the sump jet 120, the second outlet 204 of the fluid control circuit 200 is fluidly coupled to the rim jet 118, and the third outlet 206 of the fluid control circuit 200 is fluidly coupled to the priming jet 122.

Figure 3:
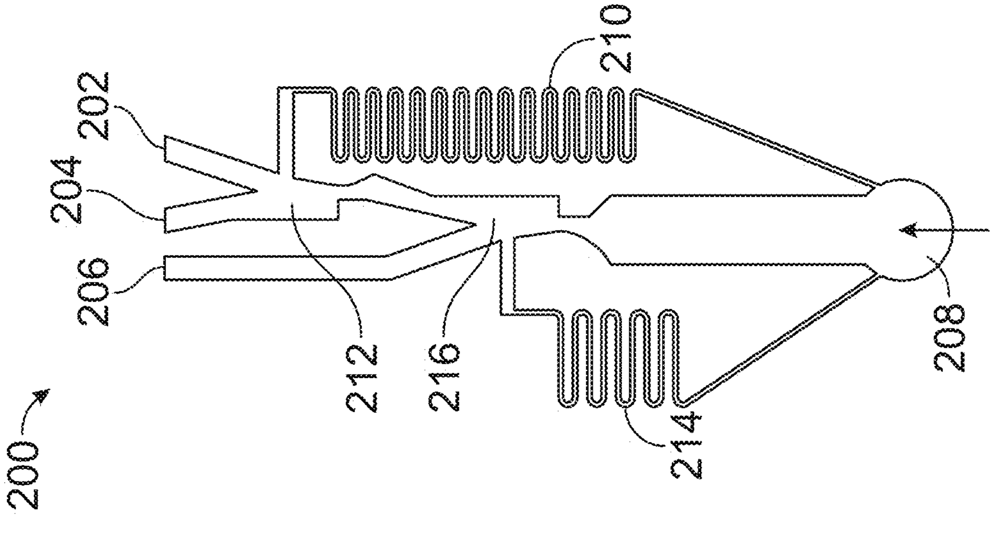
FIG. 3 is a top view of a fluid control circuit for a line-pressure toilet, according to an exemplary embodiment.

The fluid control circuit 200 uses the coanda effect (e.g., the tendency of a fluid to remain attached to a curved or convex surface) to facilitate flow switching between the outlets of the fluid control circuit 200. Among other benefits, the geometry of the channels in the fluid control circuit 200 allows timing and switching functions to be performed without moving parts and without a power source. FIG. 3 shows a cross-section through the fluid control circuit 200, according to an exemplary embodiment. As shown in FIG. 3, the fluid control circuit 200 includes a plurality of flow restrictors, a first flow restrictor 210 disposed upstream of where the first outlet 202 splits off from the second outlet 204, and a second flow restrictor 214 disposed upstream of where a first intermediate channel 212 splits off from the third outlet 206. In the embodiment of FIG. 3, the first flow restrictor 210 fluidly couples the inlet 208 to a first intermediate channel 212, while the second flow restrictor 214 fluidly couples the inlet 208 to a second intermediate channel 216. In other embodiments, the number and/or arrangement of flow restrictors may be different. The geometry of the intermediate channels, upstream of a discharge end of each flow restrictor, causes the water to flow preferentially to only one of the three outlets.

According to an exemplary embodiment, the flow restrictors (e.g., first flow restrictor 210 and second flow restrictor 214) include a series of serpentine channels that constrict the flow. The pressure drop through the flow restrictors is greater than the pressure drop through either of the intermediate channels (e.g., first intermediate channel 212 and second intermediate channel 216). The difference in pressure drop causes a time delay of flow, which may be tuned or adjusted by varying the geometry and length of the flow restrictors.

Figure 4:
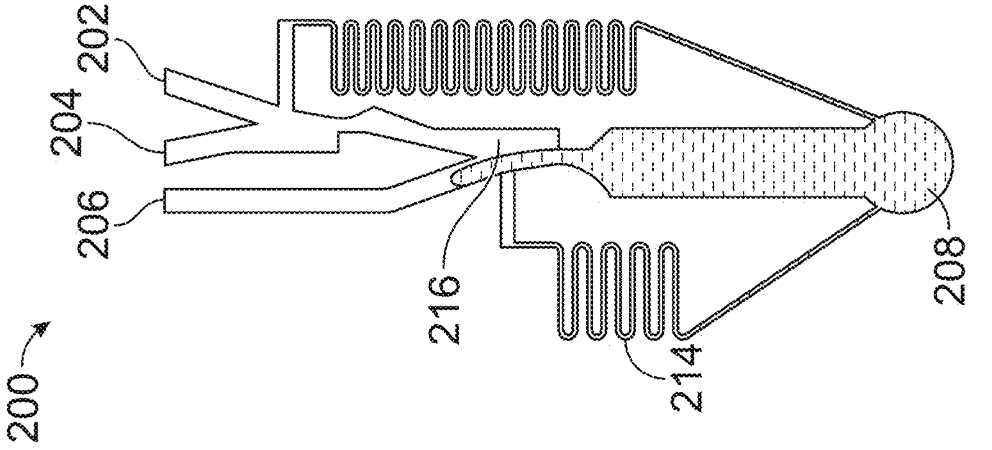

FIGS. 4-7 illustrate operation of the fluid control circuit 200 during a flush, according to an exemplary embodiment. As shown in FIG. 4, water introduced through the inlet 208 splits off in three different directions, through both flow restrictors and the second intermediate channel 216. According to an exemplary embodiment, water is delivered from an inlet passage to the inlet 208 through a valve or fluid actuator that is triggered by a user (e.g., in response to manipulating a flush lever or button). The valve or actuator remains open throughout the flush cycle (e.g., 30 s). In some embodiments, the toilet 100 includes a restrictor (e.g., a throttle valve, etc.) between the inlet passage and the fluid control circuit 200 to ensure consistent water delivery pressure to the fluid control circuit 200 regardless of where the toilet 100 is installed.

Figure 5:
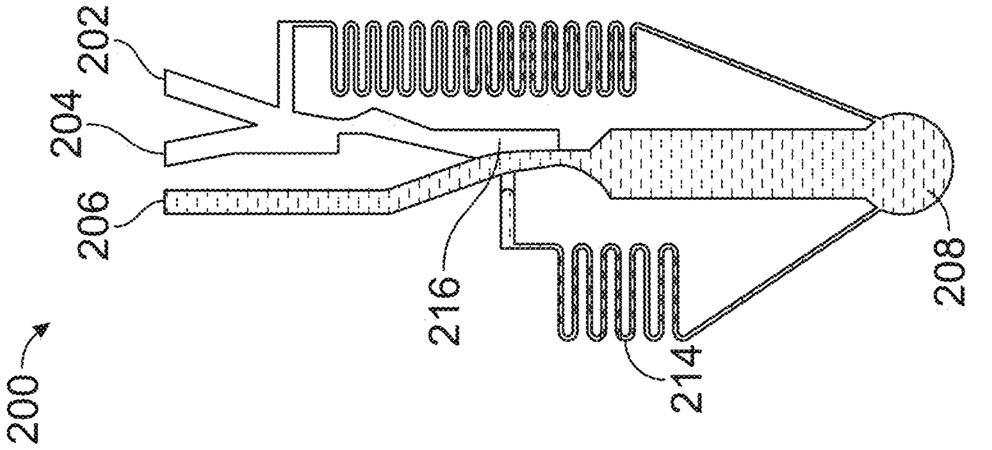
FIGS. 4-7 are top views of the fluid control circuit of FIG. 3, showing various states of operation, according to an exemplary embodiment.
Figure 6:
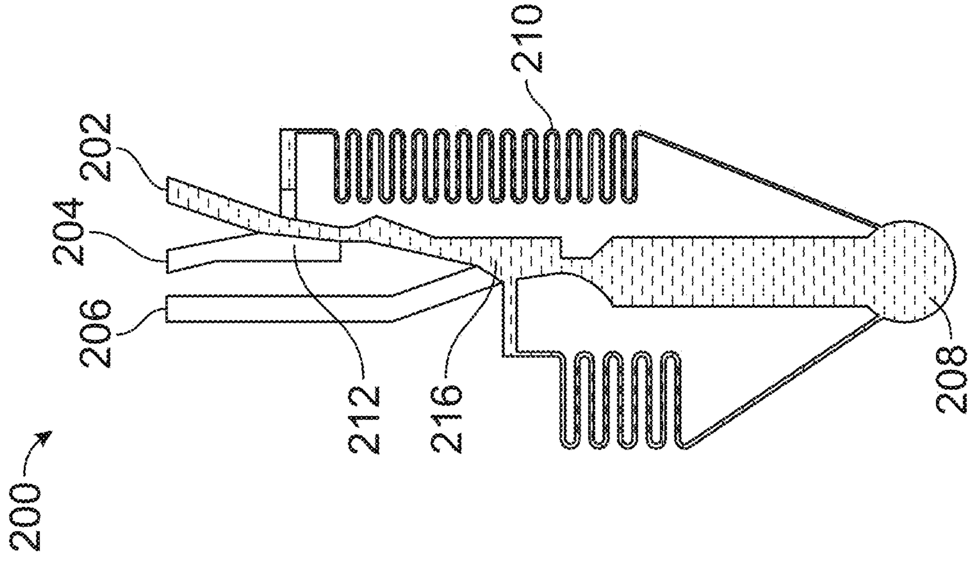

As shown in FIG. 4, water continues through the second intermediate channel 216, along a curved portion (e.g., convex wall) of the second intermediate channel 216 to the third outlet 206 and, correspondingly, the priming jet 122. This operation continues until a siphon is triggered (e.g., 1-2 s). As shown in FIG. 5, the second flow restrictor 214 is sized to discharge flow into the second intermediate channel 216 once the siphon has been initiated. As shown in FIG. 6, water leaving the second flow restrictor 214 separates the flow from the convex wall of the second intermediate channel 216, which redirects the flow from the third outlet 206 to the first intermediate channel 212.

Figure 7:
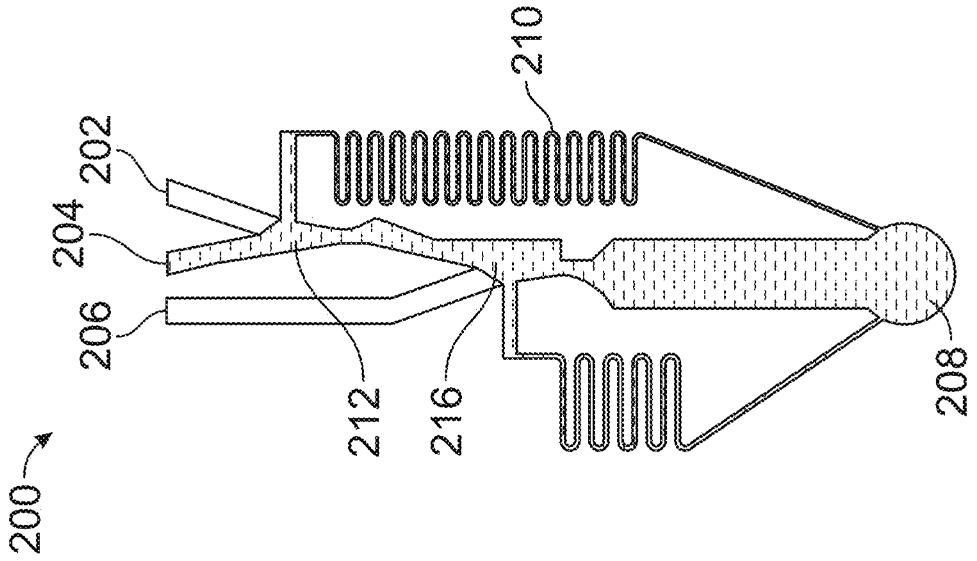

As shown in FIG. 6, water entering the first intermediate channel 212 is directed along a curved portion of the first intermediate channel 212 to the first outlet 202 and, correspondingly, the sump jet 120. Water continues to flow through the first outlet 202 and the sump jet 120 until siphon break (e.g., an additional 5-6 s), at which point a majority of water has been removed from the toilet bowl 106. As shown in FIG. 6, the first flow restrictor 210 is sized to coordinate the discharge of flow into the first intermediate channel 212 with the siphon break. As shown in FIG. 7, water leaving the first flow restrictor 210 redirects flow from the first outlet 202 to the second outlet 204 and into the rim jet 118. The fluid control circuit 200 continues delivery of water to the rim jet 118 and the toilet bowl 106 until the end of the flush cycle (e.g., 30 s or until the toilet bowl 106 has been refilled in preparation for the next flush cycle).

The number, type, and arrangement of fluidic devices within the fluid control circuit 200 of FIG. 3 should not be considered limiting. May alternatives are possible without departing from the inventive concepts described herein. For example, FIG. 8A shows a fluid control circuit 300 including a fluidic oscillator that is configured to switch the flow of water continuously between two of three outlets, shown as first outlet 302, second outlet 304, and third outlet 306 throughout a flush cycle. As shown in FIG. 8, a first outlet 302 of the fluid control circuit 300 is coupled to the sump jet 120, a second outlet 304 of the fluid control circuit 300 is coupled to the priming jet 122, and a third outlet of the fluid control circuit 300 is coupled to the rim jet 118. The fluidic oscillator includes a pair of resonant chambers, shown as first resonant chamber 310, and second resonant chamber 312 (e.g., cavities, feedback tubes, etc.) fluidly coupled to a first intermediate channel 314 of the fluid control circuit 300.

As shown in FIG. 8A, once activated, fluid received at an inlet 308 of the fluid control circuit 300 enters the first intermediate channel 314 and a flow restrictor 316. The fluidic oscillator periodically switches the flow (e.g., back and forth) between the first outlet 302 and a second intermediate channel 318, which is further coupled to both the second outlet 304 and third outlet 306 of the fluid control circuit 300. During a period of time after startup (e.g., just after water has been introduced to the fluid control circuit 300 through the inlet 308), water is released from each of the sump jet 120 and the priming jet 122 in alternating pulses. The volume of water released during each pulse varies depending on the geometry of the flow channels in the fluid control circuit 300. Among other benefits, coordinating the release of water between the sump jet 120 and the priming jet 122 improves momentum transfer of water through the trapway 116, which improves the removal of waste from the toilet bowl 106 during the flush cycle. Moreover, the pulsating flow of water through each jet (e.g., sump jet 120 and priming jet 122) can be used to drive specialty jet structures, which improve bulk material removal from surfaces of the toilet while also minimizing water consumption and noise. A variety of specialty jets (e.g., flow structures, etc.) may be produced using the fluidic oscillators, as will be described in more detail with reference to FIGS. 31-42.

Referring still to FIG. 8A, an operating frequency (e.g., a switching frequency, etc.) of the fluidic oscillator is determined, in part, based on a volume of the first resonant chamber 310 and the second resonant chamber 312 of the fluidic oscillator. In some embodiments, the frequency may vary within a range between approximately 0.5 Hz and 100 Hz. According to an exemplary embodiment, the toilet 100 includes an actuator (not shown) configured to vary the volume of each chamber and thereby control the operating frequency. The actuator may be adjusted in order to maximize flushing performance (e.g., increase waste removal performance, minimize water consumption, and/or reduce acoustic noise generated by the rim jet 118, the sump jet 120, and the priming jet 122). In some embodiments, the actuator may be a lever coupled to a wall of the chamber, which may be manipulated manually in order to modify the position of the wall. In other embodiments, the actuator may be a switch or valve configured to fluidly couple the first chamber 310 and the second chamber 312 to different volumes (e.g., closed tubes of different length, etc.). In yet other embodiments, the actuator may be some other chamber volume adjustment mechanism.

As shown in FIG. 8A, the flow restrictor 316 is configured to redirect the flow from the second outlet 304 (e.g., the priming jet 122) to the third outlet 306 (e.g., the rim jet 118) after a given period of time has elapsed. For example, the flow restrictor 316 may be sized to redirect flow to the rim jet 118 at siphon break or just before or after siphon break. The sump jet 120 and rim jet 118 continue to operate until the toilet bowl 106 is refilled. The number, type, and arrangement of fluidic devices within the fluid control circuit 300 may be modified as needed to elicit a desired operating sequence of the rim jet 118, the sump jet 120, and the priming jet 122 (e.g., to modify activation/deactivation timing, etc.).

Figure 8C:
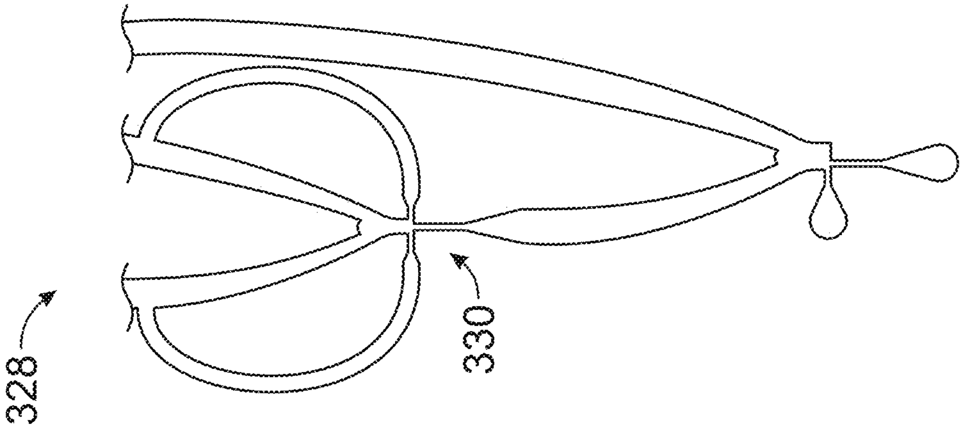
FIGS. 8A-8K are fluid control circuits that may be used in a line pressure toilet, according to various exemplary embodiments.
Figure 8B:
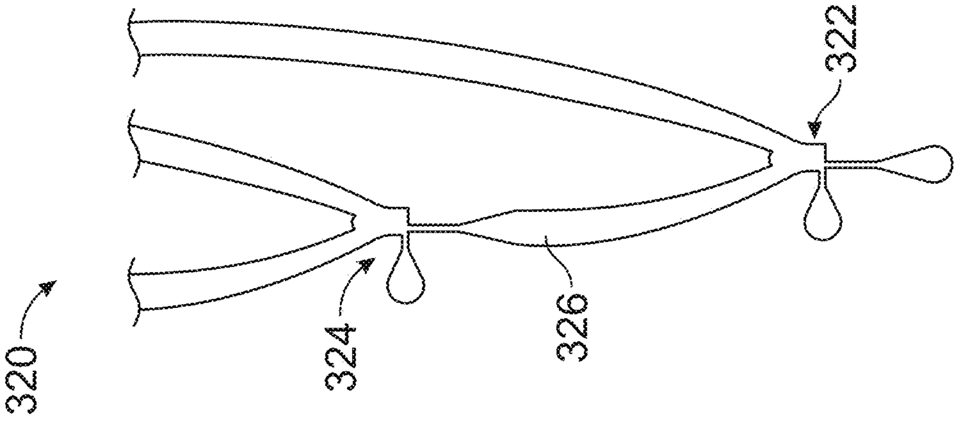
Figure 8A:
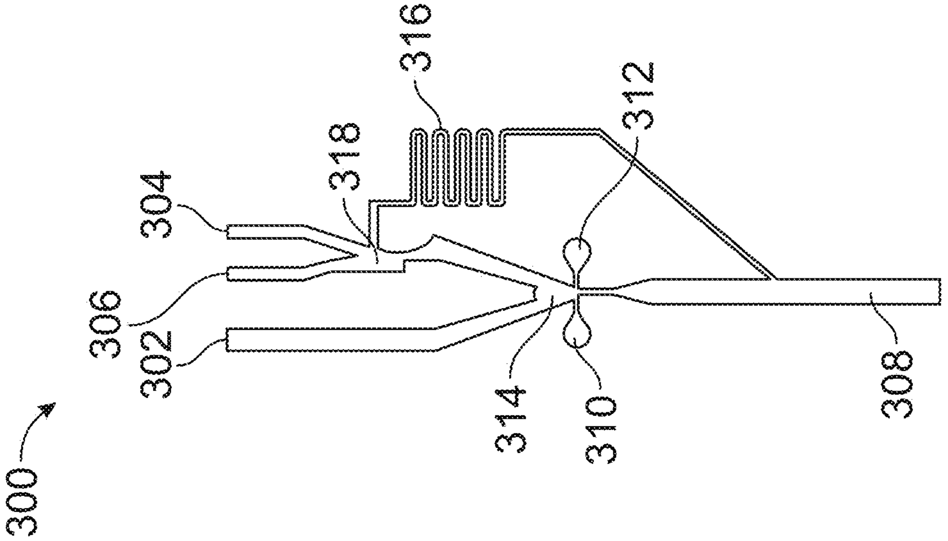
Figure 8D:
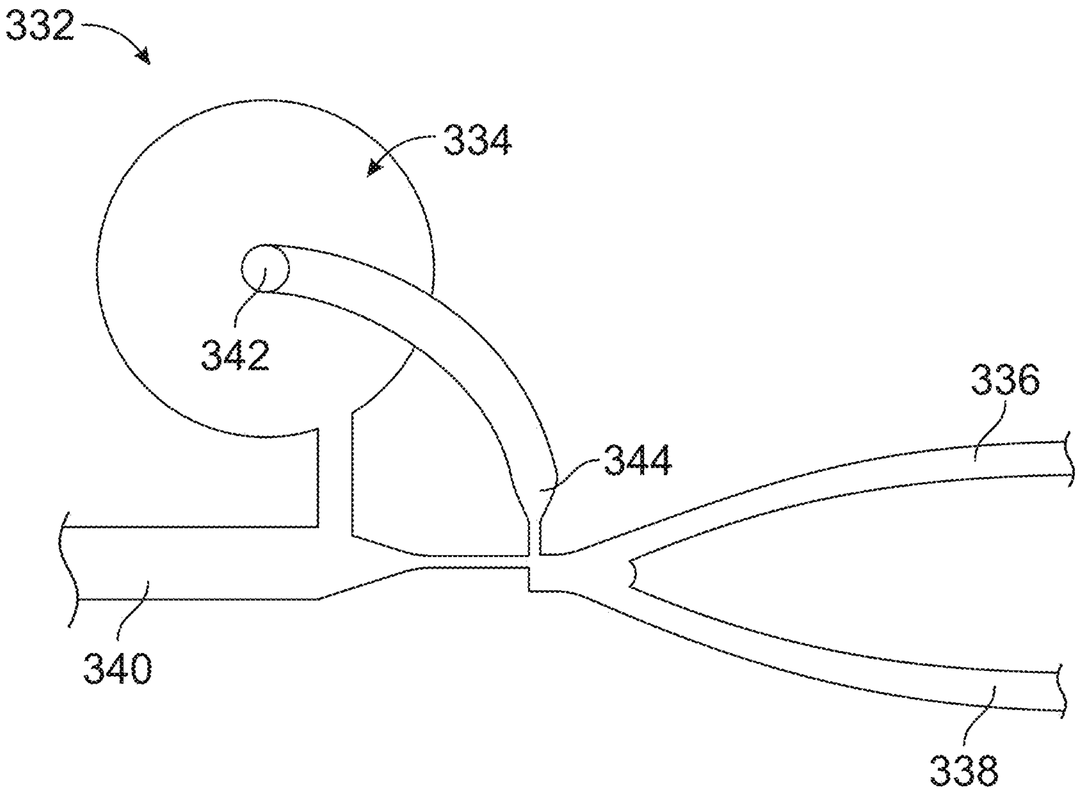

FIGS. 8B-8I show various additional examples of fluid control circuits that may be used to divert the flow to one or more jets within a toilet. FIG. 8B shows a fluid control circuit 320 that includes two mono-stable fluidic oscillators in series, a first mono-stable fluidic oscillator 322, and a second mono-stable fluidic oscillator 324 structured to receive flow from a first leg 326 of the first mono-stable fluidic oscillator 322. FIG. 8C shows a fluid control device 328 that includes a mono-stable fluidic oscillator, similar to the mono-stable fluidic oscillator of FIG. 8B, in series with a bi-stable fluidic oscillator 330. FIG. 8D shows a fluid control circuit 332 that includes a fluid capacitor 334. The fluid capacitor 334 provides timed control of the release of fluid through one of two outlet passages, shown as upper passage 336 and lower passage 338. In some embodiments, the upper passage 336 is coupled to a sump jet of a toilet and the lower passage 338 is coupled to a rim jet of a toilet. In other embodiments, the arrangement of passages 336, 338 may be different. Flow received through an inlet 340 of the fluid control circuit 332 is directed to both the fluid capacitor 334 and the upper flow passage 336 (via the coanda effect). A port 342 along an upper surface of the fluid capacitor 334 fluidly connects the capacitor with a control port 344 of the fluid control circuit 332. Once the fluid capacitor 334 is filled with fluid, the fluid is redirected toward the control port 344 to redirect flow through the lower passage 338 (e.g., toward the rim jet). In the exemplary embodiment of FIG. 8D, the fluid capacitor 334 is an enclosed hollow cylinder. The size and/or shape of the fluid capacitor 334 may different in various exemplary embodiments depending on the desired flow characteristics (e.g., switching times) of the fluid control circuit 332.

Figure 8E:
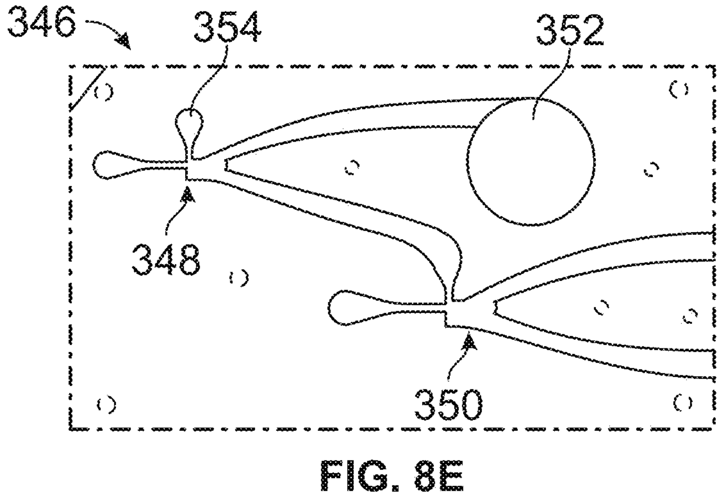
Figure 8F:
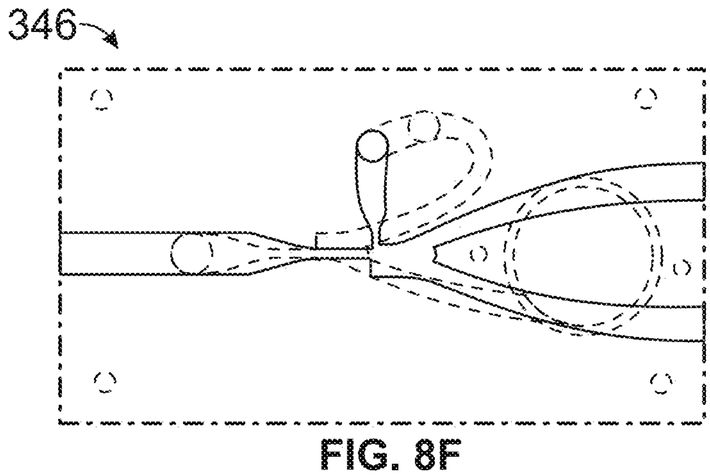

FIG. 8E shows a fluid control circuit 346 that is similar to the fluid control circuit 332 of FIG. 8D. The fluid control circuit 346 of FIG. 8E includes two mono-stable fluidic oscillators in series. Flow is provided in parallel to both an upper stage fluidic oscillator 348 and a lower stage fluidic oscillator 350 downstream of the upper stage fluidic oscillator 348. Initially, the upper stage fluidic oscillator 348 diverts flow toward a fluid capacitor 352. Once the fluid capacitor 352 is filled, flow from the fluid capacitor 352 is directed to a control port 354 on the upper stage fluidic oscillator 348. The change in flow direction through the upper stage fluidic oscillator 348 causes a change in the flow direction through the lower stage fluidic oscillator 350 (e.g., redirecting the flow from A to B as shown in FIG. 8E). FIG. 8F shows a more compact version of the fluid control circuit 346 of FIG. 8E. The fluid control circuit 346 is folded over into two layers to fluidly couple (e.g., connect) the inlets of each one of the fluidic oscillators 348, 350.

Figure 8G:
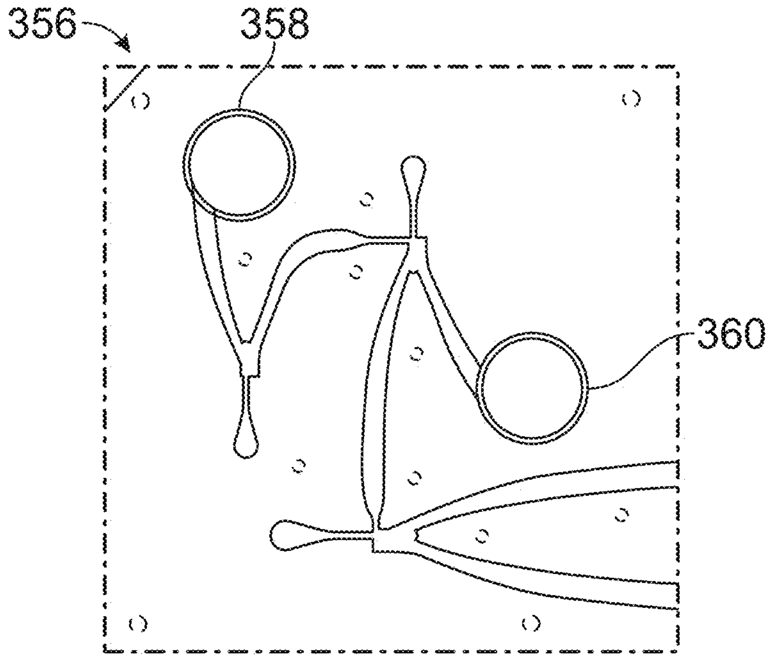
Figure 8H:
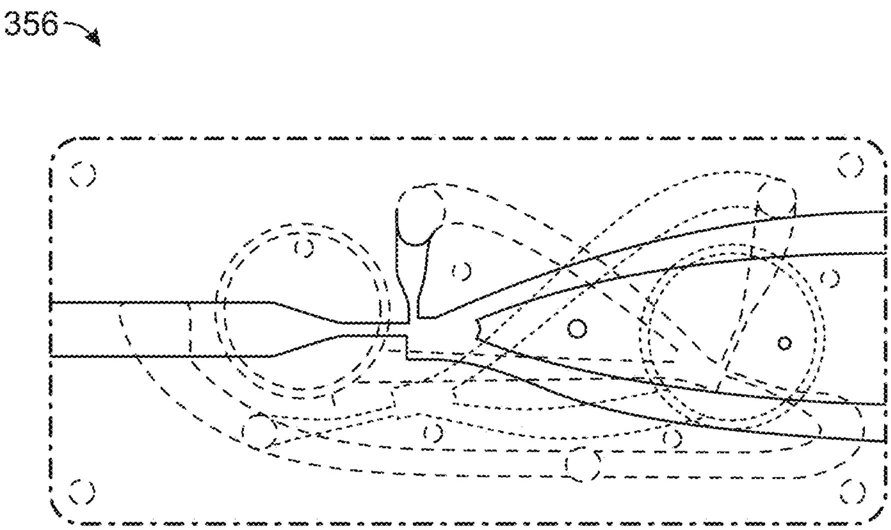
Figure 8I:
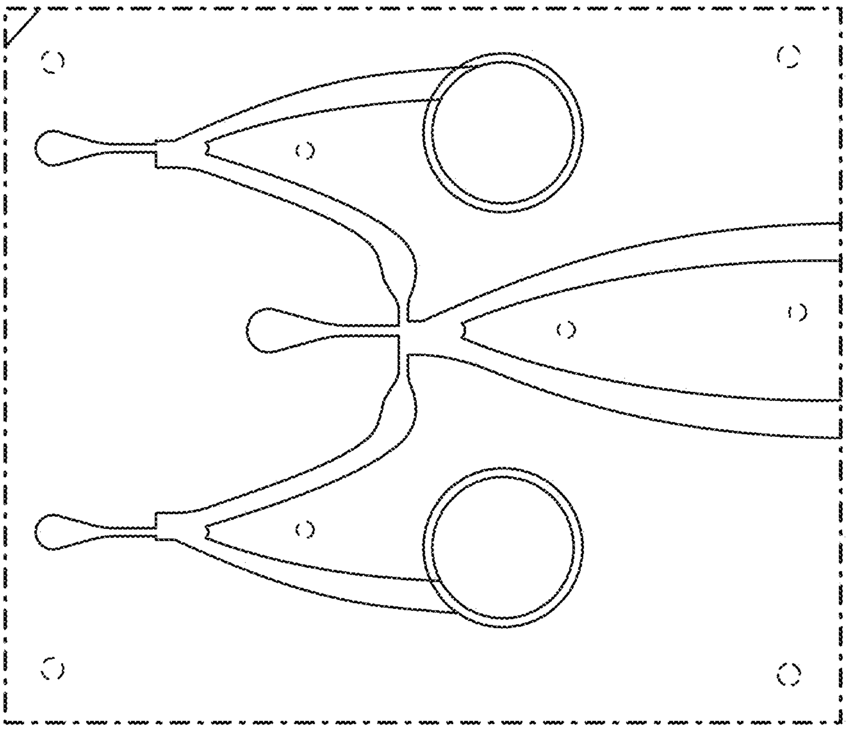

FIG. 8G shows a fluid control circuit 356 that includes a plurality of fluid capacitors, which are used to switch the flow direction back and forth between two outlets (e.g., from A to B to A as shown in FIG. 8G). The plurality of fluid capacitors includes a first fluid capacitor 358 having a first internal volume and a second fluid capacitor 360 having a second internal volume that is greater than the first internal volume. In some embodiments, the difference in volume may be achieved by varying a height (e.g., into and out of the page as shown in FIG. 8G) of each of the fluid capacitors 358, 360 or any other suitable dimension (e.g., a diameter, etc.). In the exemplary embodiment of FIG. 8G, the flow is redirected from outlet "A" to outlet "B" when the first fluid capacitor 358 is filled. Once the second fluid capacitor 360 is filled, the flow is redirected back from outlet "B" to outlet "A." FIG. 8H shows a compacted version of the fluid control circuit 356 of FIG. 8G, in which the inlets for each of the fluidic oscillators are fluidly coupled to one another. The compact version of the fluid control circuit 356 shown in FIG. 8H is folded into three layers (e.g., trifolded into three layers of fluidic devices). FIG. 8I shows an alternate version of the fluid control circuit 362 of FIG. 8G, shown as fluid control circuit 362', in which two fluidic oscillators are positioned in a parallel flow arrangement rather than in series.

Figure 8J:
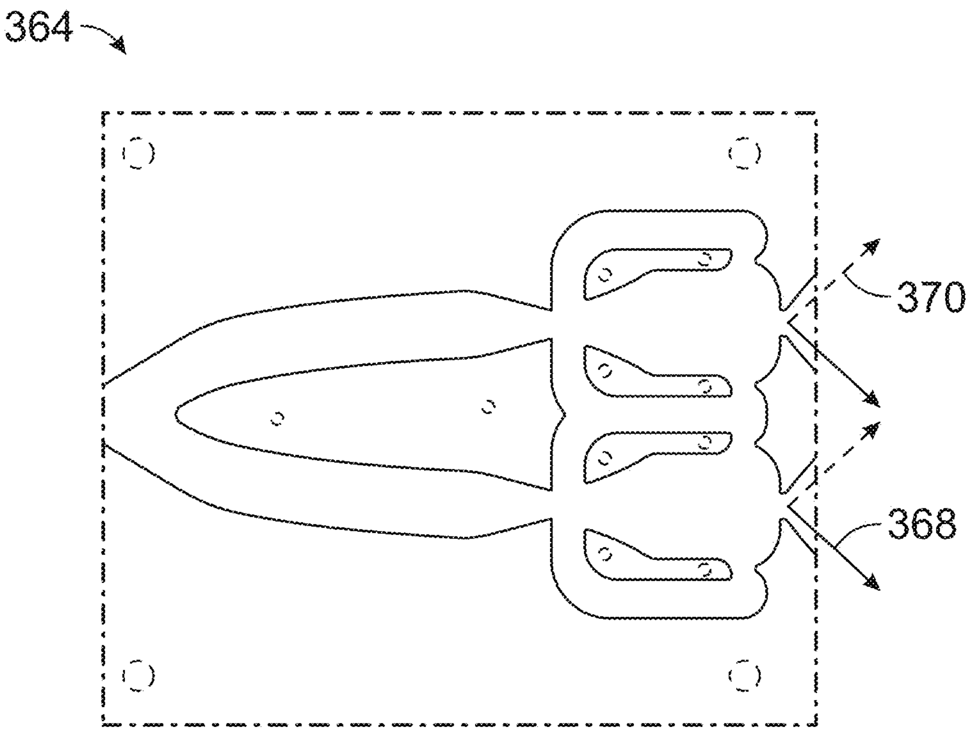
Figure 8K:
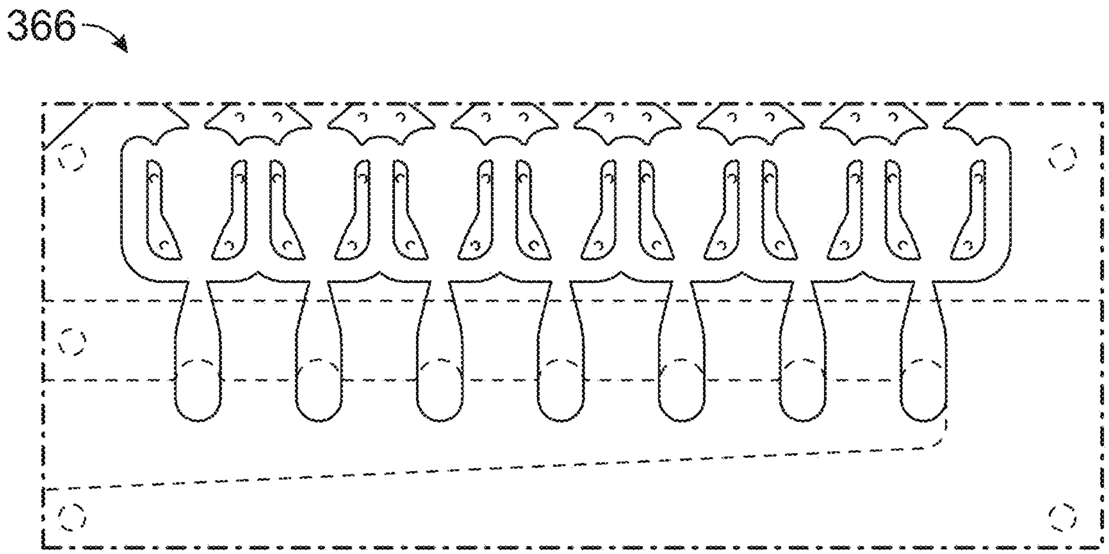

FIGS. 8J-8K show fluid control circuits 364, 366 that each include a plurality of fluidic (e.g., fan) oscillators in a substantially parallel flow arrangement. As shown in FIG.

8J, the fluidic oscillators are arranged to direct flow in the same direction (e.g., in phase, both directing flow downwards 368 or both directing flow upwards 370 as shown in FIG. 8J, etc.). The fluidic oscillators may be bi-stable fluidic oscillators and/or may be configured to "sweep" the flow stream/jet back and forth (e.g., side-to-side) continuously (e.g., periodically, etc.). In other words, the fluidic oscillators may be structured to continuously redirect the flow stream leaving the fluidic oscillators between two direction (e.g., between a first direction and a second direction, along an arc between the first direction and the second direction).

Figure 9:
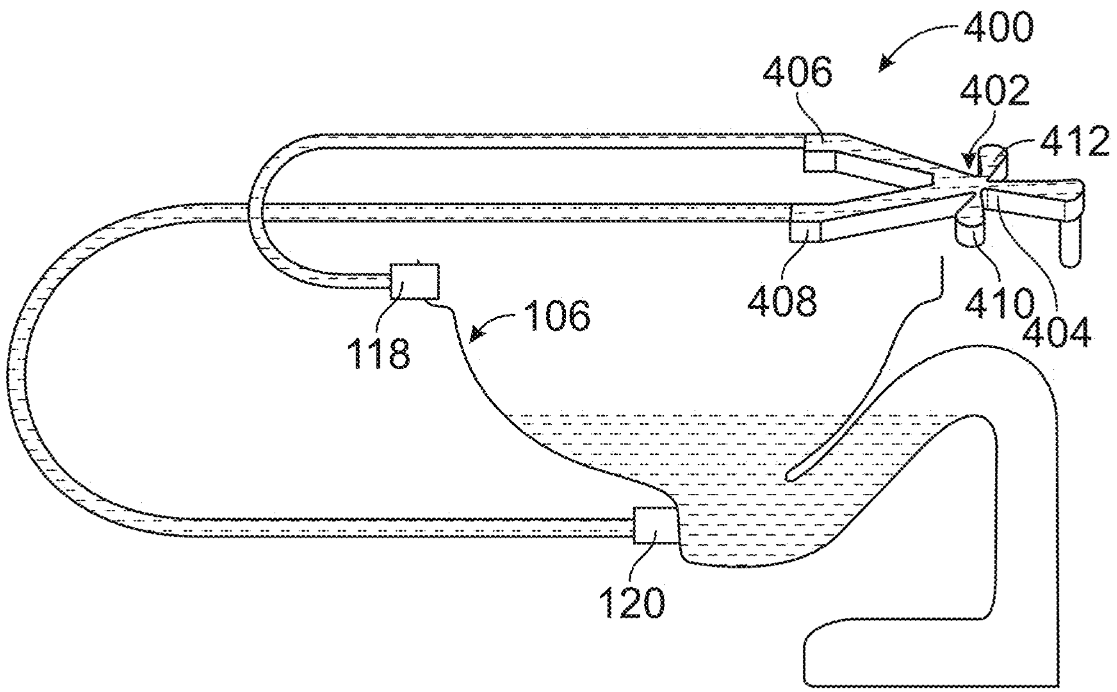
FIG. 9 is a side sectional view of a line pressure toilet including a fluidic oscillator, according to an exemplary embodiment.
Figure 10:
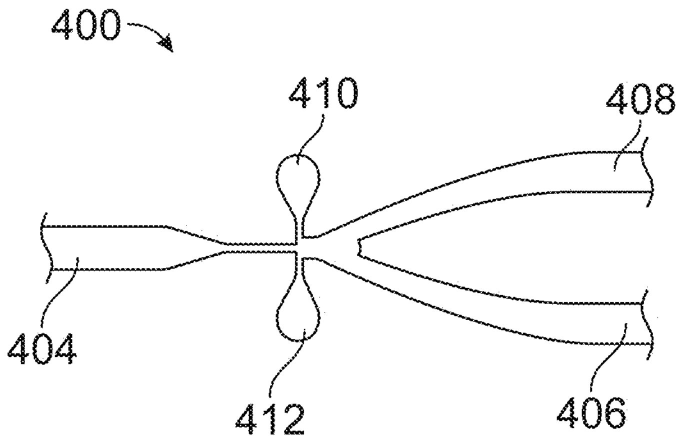
FIG. 10 is a sectional view of a fluidic oscillator, according to an exemplary embodiment.

FIG. 9 shows a fluid control circuit 400 for a line pressure toilet including a single bi-stable fluidic oscillator 402. The construction of the line pressure toilet may be the same or substantially similar to the line pressure toilet 100 of FIGS. 1-2. In other embodiments, the construction of the line pressure toilet may be different. For simplicity, similar numbering has been used to represent similar components. As shown in FIG. 10, the fluidic oscillator 402 includes an inlet channel 404, two outlet channels 406, 408, and two resonant chambers 410, 412. As shown in FIG. 9, a first outlet channels 406 is coupled to the rim jet 118. A second outlet channel 408 is coupled to the sump jet 120. The fluidic oscillator 402 is configured to generate pulsed flow at each of the rim jet 118 and the sump jet 120 by periodically switching the flow of water between the two outlet channels 406, 408. Among other benefits, the fluidic oscillator 402 coordinates operation of the rim jet 118 and the sump jet 120 throughout the flush cycle using less water than simply splitting the flow 50-50 between the two jets 118, 120.

Figure 11:
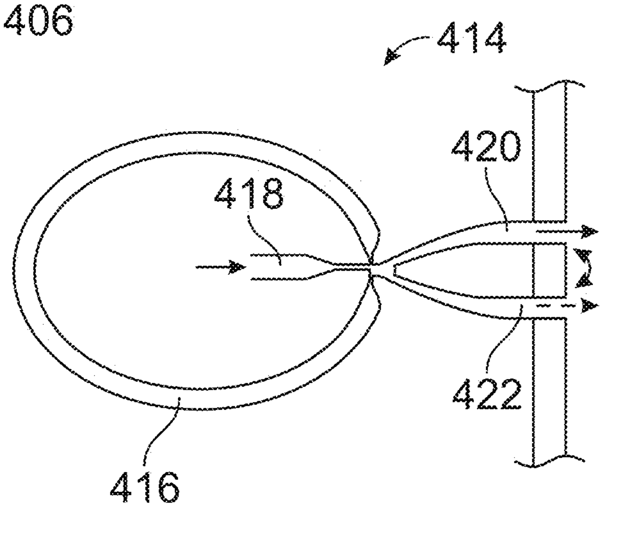
FIG. 11 is a sectional view of a fluidic oscillator, according to another exemplary embodiment.

The geometry of any of the fluidics devices described herein may vary depending on the desired flow characteristics of the jets 118, 120. For example, FIG. 11 shows an alternative embodiment of a bi-stable fluidic oscillator 414. Like the fluidic oscillator 402 of FIG. 10, the fluidic oscillator 414 of FIG. 11 provides flow switching capability between two outlet channels 420, 422. As shown in FIG. 11, the fluidic oscillator 414 includes a single symmetric resonant chamber 416 that is coupled to an inlet channel 418 of the fluidic oscillator, at a location upstream of the two outlet channels 420, 422. The resonant chamber 416 includes a tube (e.g., a channel, flow passage, etc.). In other embodiments, the geometry of the resonant chamber 416 may be different.

Figure 12A:
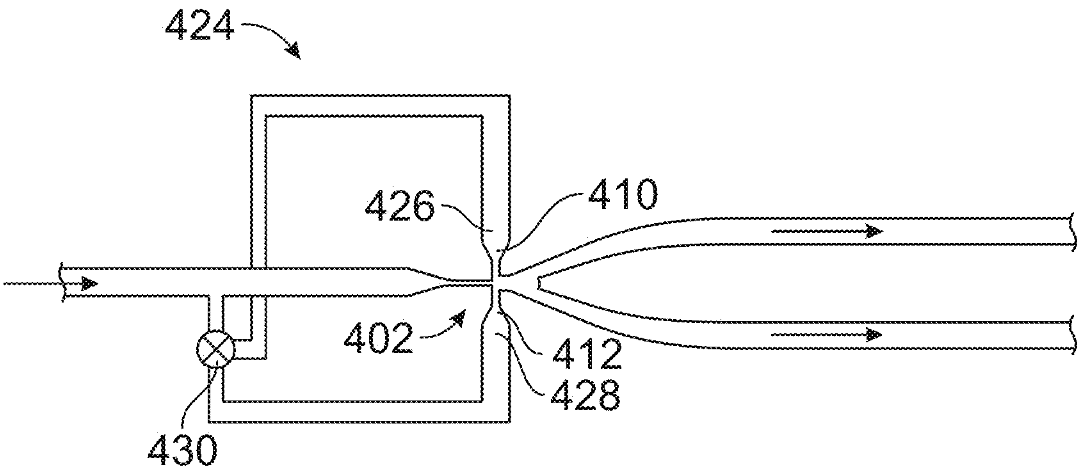
FIG. 12A is a sectional view of a fluid diverter, according to an exemplary embodiment.

In some embodiments, the fluidic device may be reconfigured to direct the entire flow to one of the rim jet 118 and the sump jet 120, rather than providing pulsating flow to both jets 118, 120 simultaneously. FIG. 12A shows a bi-stable fluidic oscillator 402 that has been modified to serve as a fluidic diverter valve 424 (e.g., a mono-stable fluidic oscillator including two outlets, a fluidic amplifier, a fluidic switch, etc.), according to an exemplary embodiment. As shown in FIG. 12A, the fluidic diverter valve 424 includes two control ports, a first control port 426 fluidly coupled to the first resonant chamber 410, and a second control port 428 fluidly coupled to the second resonant chamber 412. Both control ports 426, 428 are also coupled to an inlet channel upstream of the fluidic diverter valve 424. According to an exemplary embodiment, the fluidic diverter valve 424 includes a control switch 430 (e.g., electronic valve or actuator) configured to fluidly couple one of the two control ports 426, 428 to the inlet channel. The percentage of total flow passing through each outlet channel 406, 408 is determined based on the position of the control switch 430 and the resulting amount of flow diverted to each of the first control port 426 and the second control port 428. An amount of water required to control the direction of flow through the fluidic diverter valve 424 (e.g., the total amount of water required through the control switch 430) is small compared to a primary flow rate of the fluidic diverter valve 424 (e.g., a flow rate of water entering the fluidic diverter valve 424). In the exemplary embodiment of FIG. 12A, the amount of water required to control the direction of flow through the fluidic diverter valve 424 (e.g., a control flow rate) is approximately 1/10th of the primary flow rate.

Figure 12B:
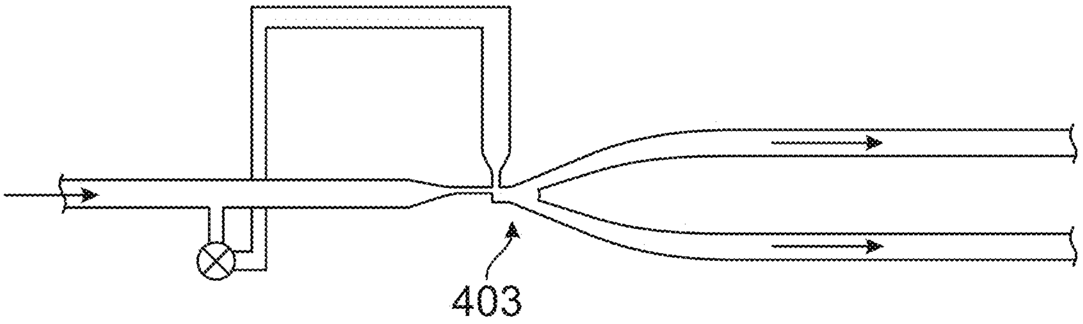
FIG. 12B is a sectional view of a fluidic diverter, according to another exemplary embodiment.

In some embodiments, the control switch 430 is a push button valve that diverts all of the flow to one of the first control port 426 and the second control port 428. In other embodiments, the control switch 430 is a turning valve (e.g., ball valve, etc.) that allows a fraction of the total flow to be diverted to each of the control ports 426, 428 simultaneously. The fluidic diverter valve 424 may also be used in other applications in place of where a conventional diverter valve is used. For example, the fluidic diverter valve 424 may be used in a bath, a shower unit including a single shower head, or a shower unit including multiple shower heads. The fluidic diverter valve 424 could also be used as part of a sink/kitchen hand sprayer (e.g., to selectively divert the flow to a subset of nozzles on the spray head, etc.), or a bathroom hand sprayer. FIG. 12B shows an alternate version of the fluidic diverter valve 424 of FIG. 12A in which a mono-stable fluidic oscillator 403 is used in place of the bi-stable fluidic oscillator 402. Among other benefits, using a mono-stable fluidic oscillator 403 reduce the number of flow lines needed for the fluidic diverter valve 424.

Figure 13:
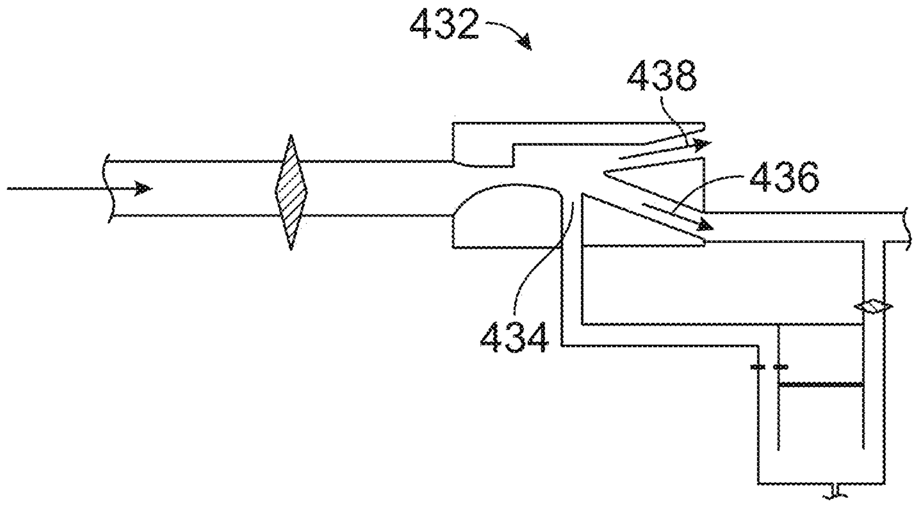
FIG. 13 is a sectional view of a fluid diverter, according to another exemplary embodiment.
Figure 14:
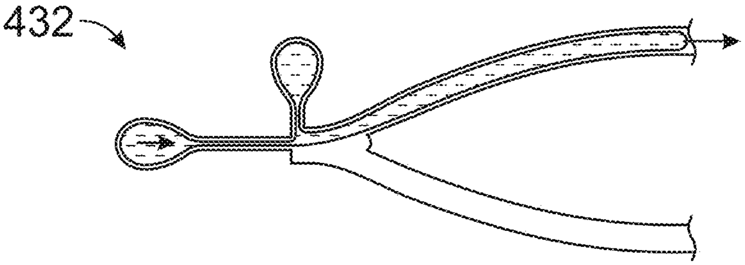
FIGS. 14-16 are sectional views of the fluid diverter of FIG. 13, showing various states of operation, according to an exemplary embodiment.
Figure 15:
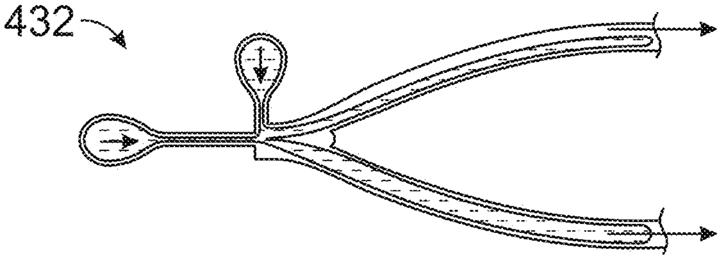
Figure 16:
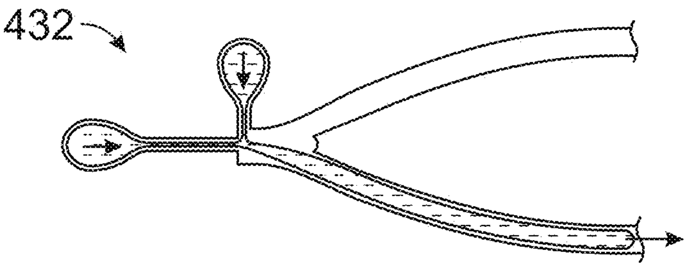

FIG. 13 shows a fluidic diverter valve 432 including a single control port 434, according to an exemplary embodiment. FIGS. 14-16 illustrate the operation of the fluidic diverter valve 432 of FIG. 13. As shown in FIGS. 14-16, the fraction of total flow exiting the diverter valve 432 through either one of the two output channels 436, 438 is determined based on a flow rate of water entering the fluidic diverter valve 432 through the control port 434. As the flow rate of water through the control port 434 increases, a larger fraction of water is ejected through a lower (e.g., jet) output channel 436. Although a single fluidic diverter valve 432 is shown in FIG. 13, it will be appreciated that multiple fluidic diverter valves may be controlled simultaneously using the operating principle described herein, for example, by using a single flow control valve to provide flow to control ports in different fluidic diverter valves at the same time.

Figure 17A:
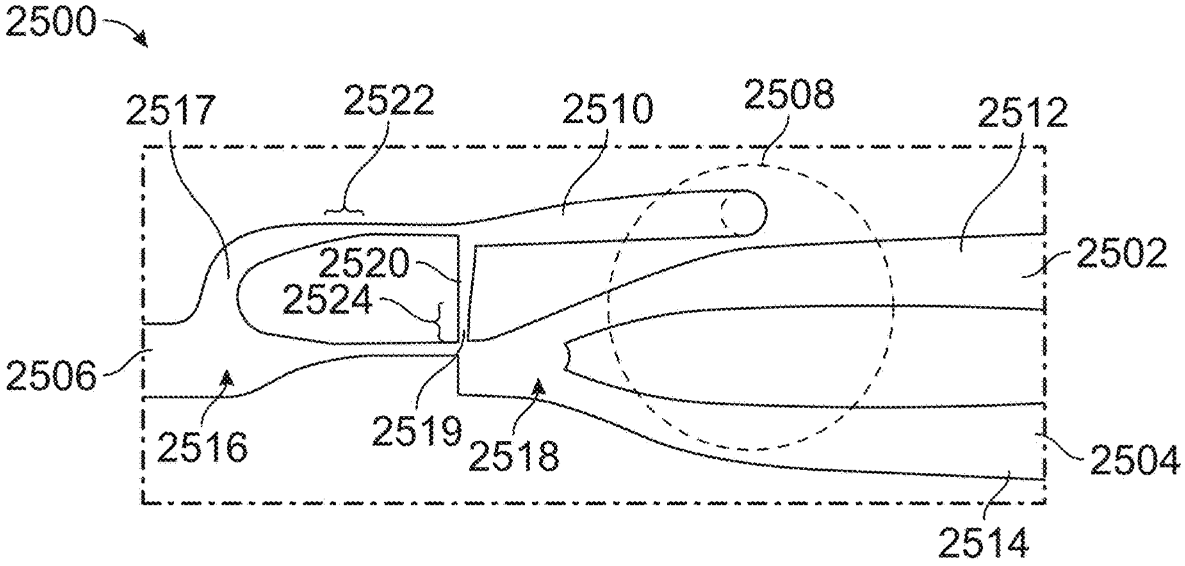
FIG. 17A is a flow schematic for a fluidic switching device, according to an exemplary embodiment.

FIG. 17A shows a flow schematic of a fluidic switching device, shown as switching device 2500 that is configured to automatically switch the flow from a first outlet port 2502 to a second outlet port 2504 after a predefined time period. The switching device 2500 includes an inlet port 2506, a fluid capacitor 2508, a side channel 2510, a first outlet leg 2512, and a second outlet leg 2514, a first splitter portion 2516, a second splitter portion 2518, and a cross-channel 2520. The first splitter portion 2516 is fluidly connected to the side channel 2510 and the second splitter portion 2518 and is configured to deliver water from the inlet port 2506 to the side channel 2510 and the second splitter portion 2518. The side channel 2510 fluidly connects the first splitter portion 2516 with the fluid capacitor 2508. The fluid capacitor 2508 may be any fluid reservoir sized to retain a predefined volume of fluid. In the exemplary embodiment of FIG. 17A, the fluid capacitor 2508 is a hollow cylindrical tube.

As shown in FIG. 17A, the second splitter portion 2518 fluidly connects the first splitter portion 2516 to the first outlet leg 2512 and the second outlet leg 2514, which are each connected to a respective one of the outlet ports. Fluid entering the second splitter portion 2518 from the first splitter portion 2516 is directed via the coanda effect to the first outlet leg 2512. This first stage of operation continues for a predefined time period until the fluid capacitor 2508 has filled with fluid and/or until sufficient fluid pressure (e.g., hydrodynamic head, etc.) has developed in the fluid capacitor 2508. At this point, water entering the side channel 2510 is redirected through the cross-channel 2520, which fluidly connects the side channel 2510 to the second splitter portion 2518. As shown in FIG. 17A, the side channel 2510 is fluidly connected to the inlet port 2506 in two different locations upstream from the first outlet port 2502 and the second outlet port 2504 (e.g., a first location 2517 upstream of the second splitter portion 2518 in fluid receiving communication with the inlet port 2506, and a second location 2519 at the second splitter portion 2518 near an inlet of the second splitter portion 2518). As shown in FIG. 17A, the side channel 2510 includes a converging portion 2522 immediately upstream of the side channel 2510 to prevent fluid from entering the cross-channel 2520 before the fluid capacitor 2508 has filled with fluid. The cross-channel 2520 also includes a converging portion 2524, which forms a nozzle at the inlet to the second splitter portion (second location 2519), to help redirect (e.g., switch, etc.) the flow of fluid from the first outlet leg 2512 to the second outlet leg 2514.

According to an exemplary embodiment, the flow of fluid through the first outlet leg 2512 is completely shut off after the predefined time period. In other embodiments, a portion of the fluid may continue to flow through the first outlet leg 2512 after the predefined time period. The flow of fluid through the second outlet leg 2514 continues until the supply of water to the inlet port 2506 is shut off and/or the fluid capacitor 2508 is drained.

Among other benefits, the switching device 2500 of FIG. 17A provides a timed switching of the flow between multiple outlets that does not require any interaction from a user or valve, thereby eliminating the need for moving parts (i.e., the switching device includes only stationary components). The switching device 2500 redirects a single stream of pressurized fluid between two channels (e.g., the first outlet leg 2512 and the second outlet leg 2514) without a separate flow of fluid and without independent pressure control at the outlet ports.

The relative size and geometry of the channels in FIG. 17A is shown for illustrative purposes only. It will be appreciated that the flow characteristics through the device may be manipulated by varying the design of the switching device 2500. For example, the predefined time period before switching occurs may be modified by changing the size and/or shape of the fluid capacitor 2508. Additionally, the maximum allowable back pressure (e.g., flow pressure, etc.) that can be sustained at either the first outlet port 2502 or the second outlet port 2504 will vary depending on the geometry of the channels, and fluid pressure at the inlet port 2506.

Figure 17B:
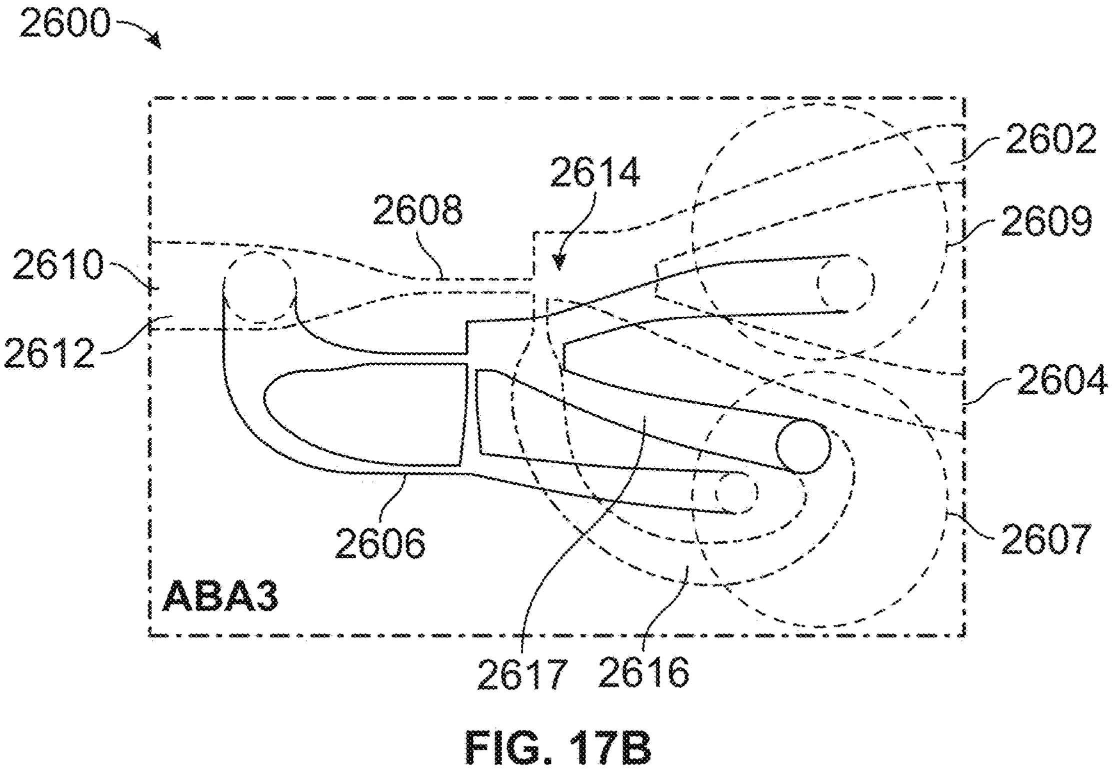
FIG. 17B is a flow schematic for a fluidic switching device, according to another exemplary embodiment.

FIG. 17B shows a flow schematic of a fluidic switching device, shown as switching device 2600 that builds on the fluidic switching device 2500 of FIG. 17B. The switching device 2600 is configured to perform two separate switching operations, a first operation to switch the flow from a first outlet port 2602 to a second outlet port 2604, and a second operation to switch the flow from the second outlet port 2604 back to the first outlet port 2602. In the embodiment of FIG. 17B, the switching device 2600 includes fluid channels in two separate layers that are stacked or otherwise formed on top of one another. A first layer 2606 of the switching device 2600 is the same as or similar to the switching device 2500 of FIG. 17A. The first layer 2606 is fluidly coupled to fluid capacitors, shown as first capacitor 2607 and second capacitor 2609, which are used to control the timing of the switching operations.

A second layer 2608 of the switching device 2600 includes an inlet port 2610 and the two outlet ports (e.g., first outlet port 2602 and second outlet port 2604). The second layer 2608 also includes an inlet channel 2612, a splitter portion 2614, and a return channel 2616. As shown in FIG. 17B, the inlet channel 2612 fluidly couples the inlet port 2610 with the splitter portion 2614 and also an inlet port 2618 of the first layer 2606. The splitter portion 2614 fluidly connects the inlet port 2610 with the first outlet port 2602 and the second outlet port 2604. The return channel 2616 fluidly connects the splitter portion 2614 with an outlet channel 2617 of the first layer 2606.

In operation, fluid received through the inlet port 2610 is split between the inlet port 2618 of the first layer 2606 and a converging portion of the inlet channel 2612. The first layer 2606 redirects fluid to both the return channel 2616 and to the first capacitor 2607. Fluid discharges from the return channel 2616 into the splitter portion 2614, which causes the fluid in the second layer 2608 to exit through the first outlet port 2602. Flow through the first outlet port 2602 continues for a first predefined time period until sufficient backpressure has developed in the first capacitor 2607 (e.g., until the first capacitor 2607 has filled with fluid), which activates (e.g., triggers, etc.) the first switching operation. At this point, fluid in the first layer 2606 is redirected (e.g., switched) to the second capacitor 2609 and away from the first capacitor 2607 and the return channel 2616. Because the flow of fluid through the return channel 2616 is shut off, fluid entering the splitter portion 2614 in the second later 2608 is redirected by the coanda effect away from the first outlet port 2602 and toward the second outlet port 2604.

Flow through the second outlet port 2604 continues for a second predefined time period that is based on the volume of the second capacitor 2609. Once sufficient backpressure has been established in the second capacitor 2609, the fluid is redirected in a second switching operation from the first layer 2606 back to the return channel 2616, which once again switches the flow within the splitter portion 2614 back toward the first outlet port 2602 (flow through the second outlet port 2604 will stop). Flow through the first outlet port 2602 continues until the supply of fluid to the inlet port 2610 is shut off, and/or the first capacitor 2607 and the second capacitor 2609 are drained of fluid.

Figure 18:
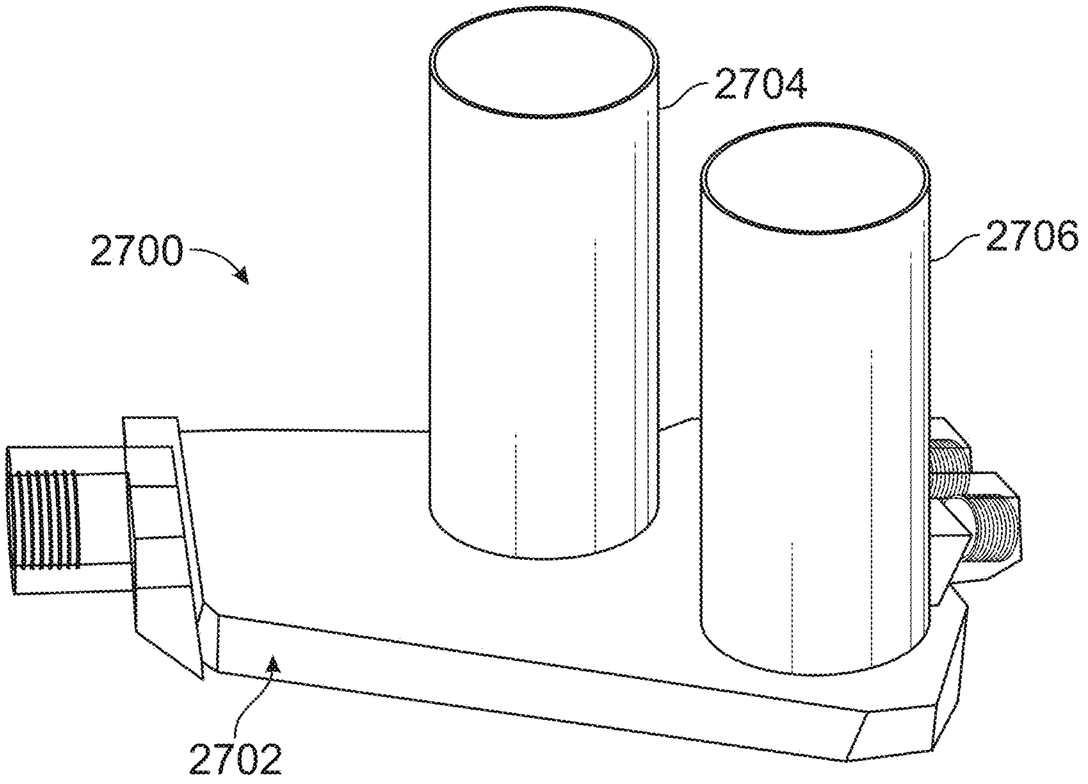
FIG. 18 is a perspective view of a fluidic switching device, according to an exemplary embodiment.
Figure 19:
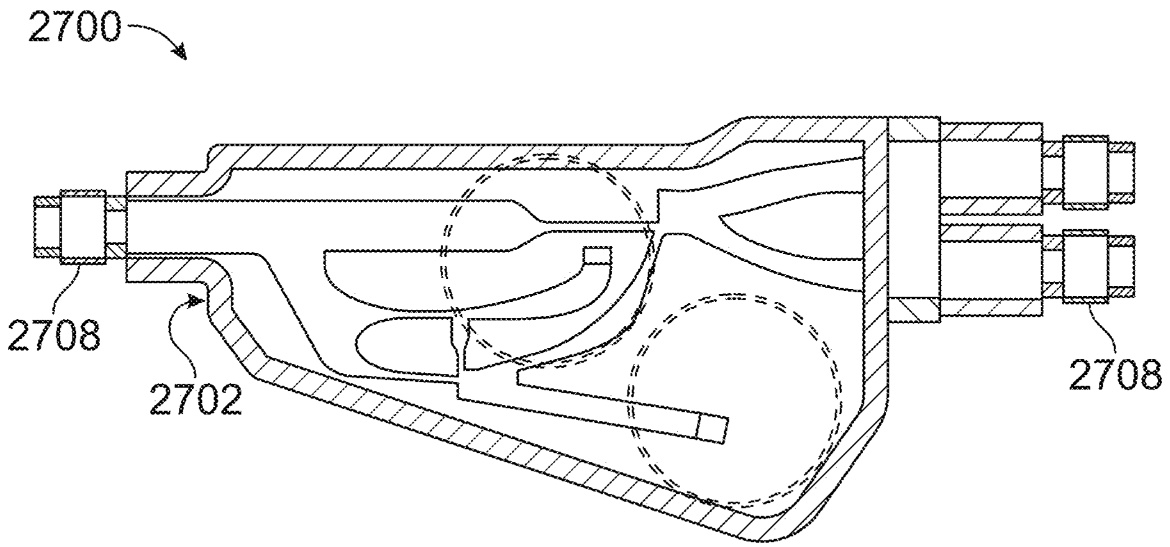
FIG. 19 is a top cross-sectional view of a base portion of the fluidic switching device of FIG. 18.
Figure 20:
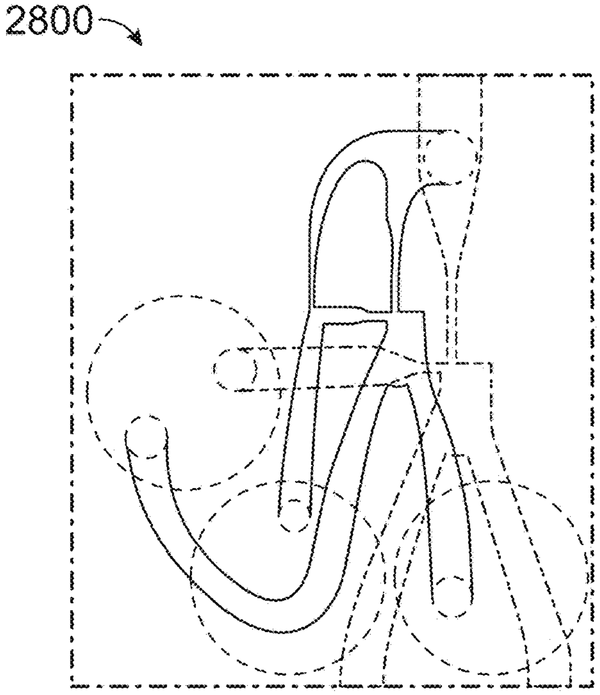
FIG. 20 is a flow schematic for a fluidic switching device, according to another exemplary embodiment.

The stacked (e.g., layered) fluid channel arrangement shown in FIG. 17B should not be considered limiting. FIGS. 18-19 show a fluidic switching device, shown as switching device 2700, that incorporates the multiple layers in FIG. 17B into a single level (e.g., layer, etc.). The switching device 2700 operates in a similar manner as described with reference to FIG. 17B. The switching device 2700 includes a (i) valve body 2702, (ii) a plurality of fluid capacitors, shown as first capacitor 2704 and second capacitor 2706, and (iii) a plurality of fluid connectors, shown as fittings 2708. As shown in FIG. 19, the valve body 2702 includes the various fluid passages/channels that were described with reference to FIG. 17B. The valve body 2702 is integrally formed as a single unitary body. In other embodiments, the valve body 2702 may be formed from multiple pieces that are connected using fasteners (and sealing members such as o-rings, gaskets, etc.) or an adhesive product. In yet other embodiments, the valve body 2702 may be made from multiple pieces that are connected via welding or another suitable watertight bonding operation. As shown in FIGS. 18-19, the fluid capacitors and the fittings 2708 are mechanically connected to the valve body 2702. The first capacitor 2704 and the second capacitor 2706 are affixed to an upper surface of the valve body 2702 and are fluidly coupled to outlet ports of the switching device 2700. According to an exemplary embodiment, the fluid capacitors are hollow cylindrical tubes. In other embodiments, the fluid capacitors may be another suitable shape. As shown in FIG. 18, the fluid capacitors may be completely enclosed from an environment surrounding the switching device 2700. In other embodiments, one and/or both fluid capacitors may include an upper opening configured to allow air to vent from the capacitors when the capacitors are filling with fluid. A size (e.g., height, diameter, etc.) of each of the first capacitor 2704 and the second capacitor 2706 may be varied to modify the duration of the first and second predefined time periods.

Figure 21:
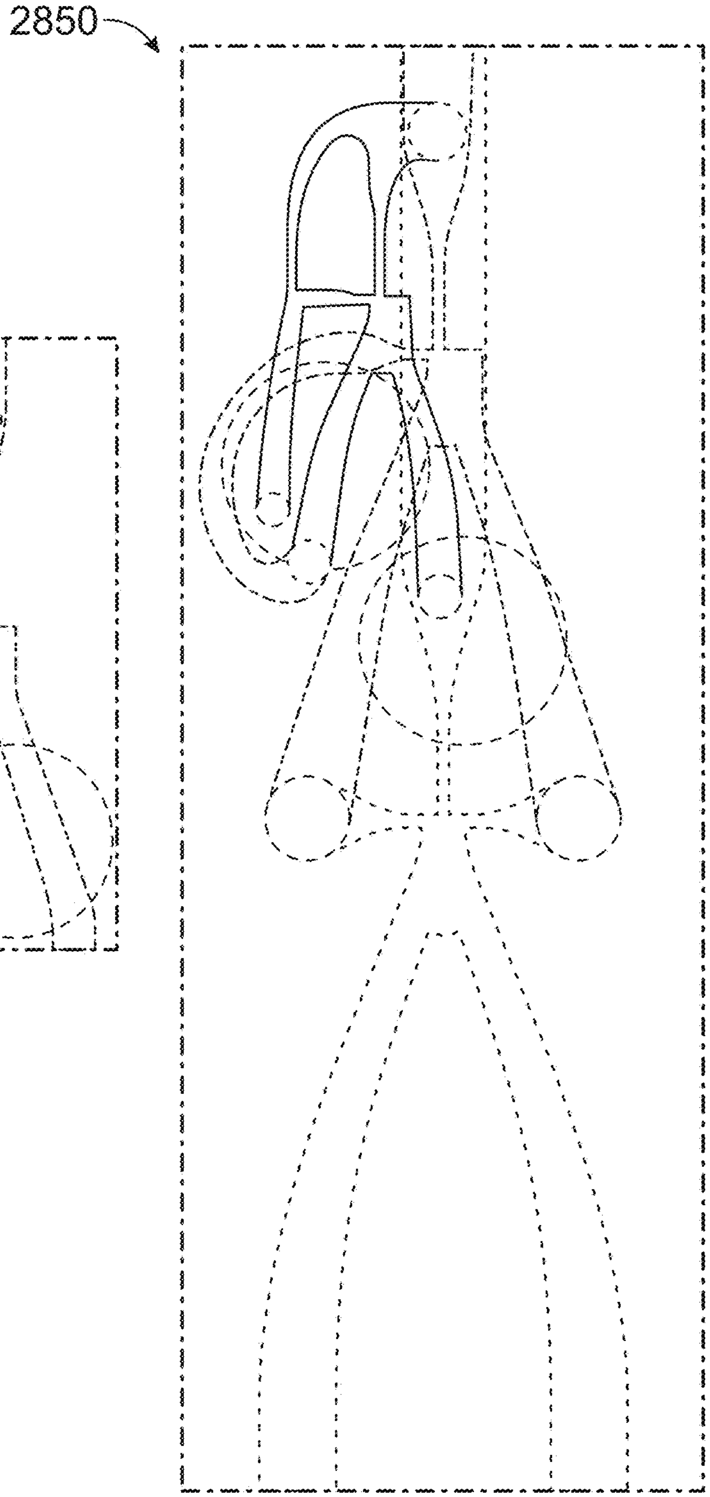
FIG. 21 is a flow schematic for a fluidic switching device, according to another exemplary embodiment.
Figure 22:
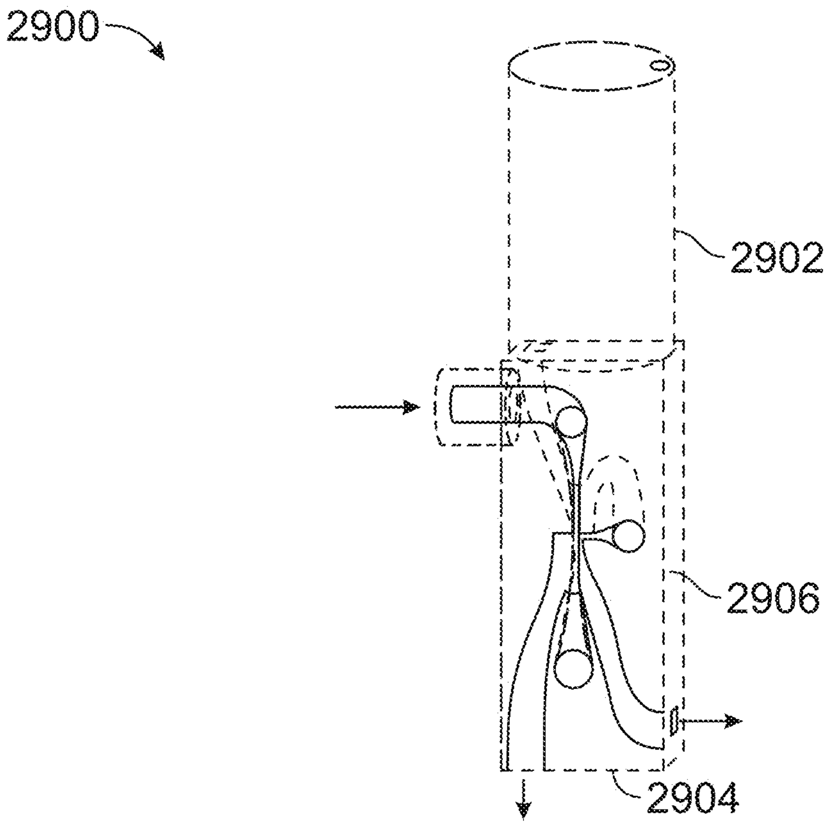
FIG. 22 is a fluidic switching device and flow schematic, according to another exemplary embodiment.
Figure 23:
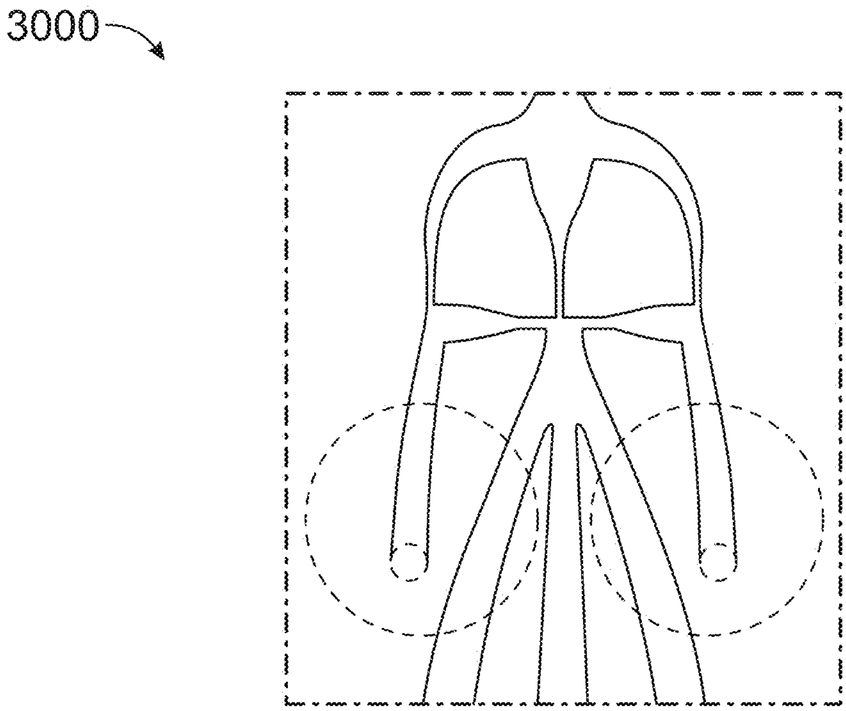
FIG. 23 is a flow schematic for a fluidic switching device, according to another exemplary embodiment.

FIGS. 20-23 show various alternative flow schematics that may be used in the design of automatic fluidic switching devices. The switching device 2800 of FIG. 20 includes three separate fluid capacitors to allow for a third switching operation rather than two. FIG. 21 shows a switching device 2850 that incorporates a bi-stable fluidic oscillator in a third layer of the fluidic switching device. The switching device 2600 of FIG. 17B is a control circuit for the bi-stable fluidic oscillator of FIG. 21 and is used to direct fluid flow through the bi-stable fluidic oscillator. In this way, the switching device 2600 can be used to direct a larger flow rate of fluid through the switching device 2850 of FIG. 21 as compared to the switching device 2600 on its own (e.g., the maximum flow rate of fluid through the switching device 2850 of FIG. 21 is greater than the maximum flow rate of fluid through the channels of the control circuit). In other embodiments, the control circuit may be replaced with the switching device 2800 described with reference to FIG. 20, or another switching device. FIG. 22 shows a switching device 2900 that operates in a similar manner as the fluidic switching device 2500 of FIG. 17A, but that is arranged in a vertical orientation. As shown in FIG. 22, a fluid capacitor 2902 is coupled to an end surface of the switching device 2900 rather than an upper surface that extends parallel to the flow channels. Additionally, the outlet ports of the switching device 2900 are disposed on different surfaces of the valve body (e.g., a lower surface 2904 and a side surface 2906 that is substantially perpendicular to the lower surface 2904). FIG. 23 shows a switching device 3000 that is configured to switch the flow between three separate outlet ports rather than two. The active outlet channel of switching device 3000 (e.g., the outlet channel that is turned on) is determined based on which fluid capacitor is filled. If both of the fluid capacitors are filled, than flow will pass through the centermost outlet channel.

Figure 24:
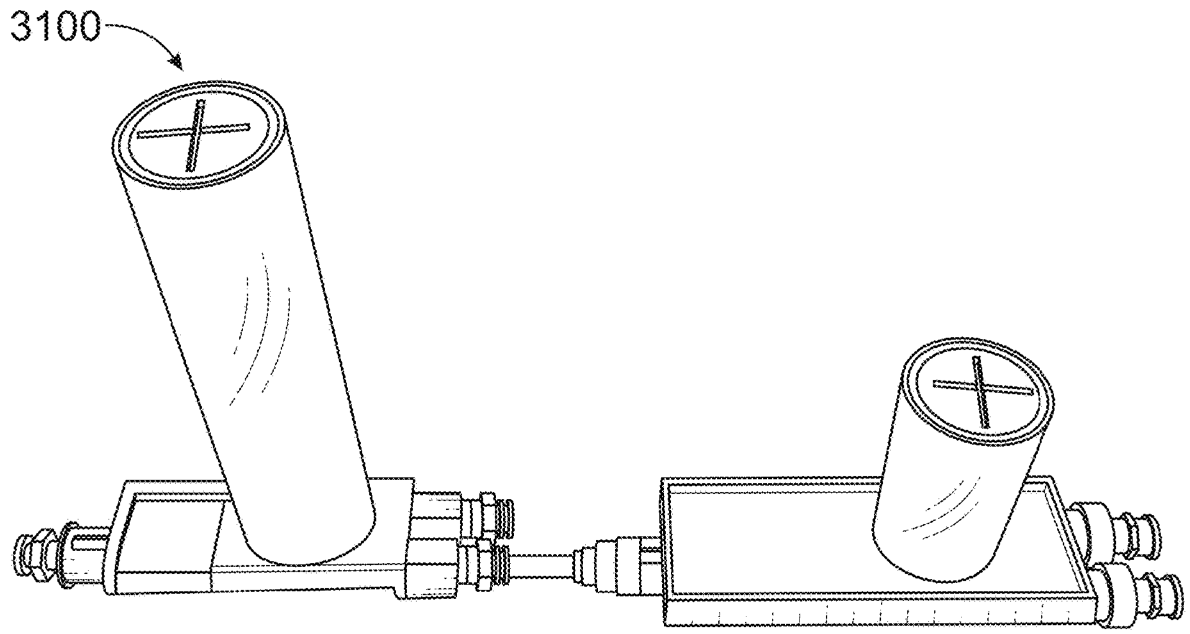
FIG. 24 is a chained fluidic switching assembly that implements the flow schematic of FIG. 23.

FIG. 24 shows a switching device 3100 that includes multiple individual switching devices that are chained together in series. Similar to the switching device 3000 of FIG. 23, the switching device 3100 of FIG. 24 is configured to switch the flow between three separate outlet ports rather than two. In the embodiment of FIG. 23, each individual switching device implements the flow channel design that was described with reference to FIG. 17A. In other embodiments, the design of the flow passages may be different. Among other benefits, the switching device 3100 drains faster than other, single piece fluidic switch designs as a result of arranging the capacitors in series (and because more than two outlets are available to facilitate draining operations). In the exemplary embodiment of FIG. 24, the size of the flow channels in the second individual switching device (downstream of the first individual switching device) is larger than the size of the flow channels in the first individual switching device, which, advantageously, improves the flow characteristics through the switching device 3100. In other embodiments, the size of the channels between individual switching devices may be the same or the second individual switching device may have channels that are smaller in size that the first individual switching device.

Figure 25:
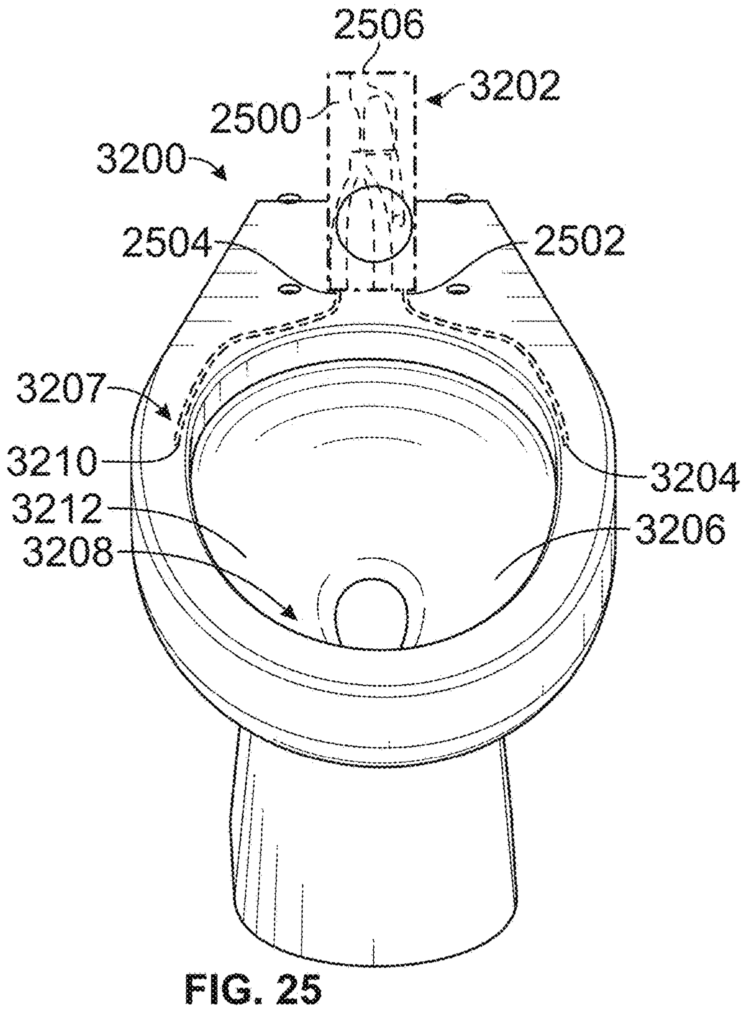
FIG. 25 is a swirl flush toilet assembly, according to an exemplary embodiment.

Among other benefits, the automatic fluidic switching devices of FIGS. 17A-24 may be utilized to facilitate flushing operations in a toilet without the need for moving components and/or electronic circuits. Referring to FIG. 25, a swirl flush toilet assembly is shown as toilet 3200, according to an exemplary embodiment. The toilet 3200 includes a rim jet sub-assembly 3202 that is configured to alternatively inject fluid (e.g., water) onto a (i) right surface 3206 of the toilet bowl 3208 via a first nozzle 3204 and onto (ii) a left surface 3212 of the toilet bowl 3208 opposite the left surface 3212 via a second nozzle 3210 (e.g., spaced 120° from the left surface 3212). As shown in FIG. 25, each of the first nozzle 3204 and the second nozzle 3210 are disposed in a rim area 3207 of the toilet bowl 3208 and are positioned to direct fluid in a direction that is substantially tangential to one of the right surface 3206 or the left surface 3212. The rim jet sub-assembly 3202 also includes a fluidic switching device, which may be the same as or similar to the switching device 2500 of FIG. 17A. In other embodiments, the design of the fluidic switching device may be different. As shown in FIG. 25, the first nozzle 3204 is fluidly connected to the first outlet port 2502 of the switching device 2500 and the second nozzle 3210 is fluidly connected to the second outlet port 2504. The inlet port 2506 of the switching device 2500 is fluidly connected to a flush valve, which is connected to a fluid supply line (e.g., fluid conduit, flow tube, etc.) at line pressure (e.g., between 40 psi and 60 psi, or another suitable fluid pressure). The switching device 2500 may be disposed within the toilet body or in another suitable location.

During a flush cycle, fluid is initially directed by the switching device 2500 through the first outlet port 2502 and out through the first nozzle 3204. Fluid is directed by the first nozzle 3204 onto the right surface 3206 and around the perimeter of the toilet bowl 3208 in a circumferential direction (e.g., clockwise, etc.). After a predefined time period has elapsed (e.g., after the capacitor has filled with fluid, etc.), the switching device 2500 redirects the flow of fluid toward the second outlet port 2504. Fluid is directed by the second nozzle 3210 onto the left surface 3212 and around the perimeter of the toilet bowl 3208 in a circumferential direction (e.g., counterclockwise, etc.). Because of the relative location of the nozzles, the flow from each nozzle only needs to cover approximately 270° along the perimeter of the toilet bowl 3208 in order to completely cover the toilet bowl 3208 in flushing fluid. This reduces the fluid velocity that is required to completely cover the toilet bowl 3208 as compared to a swirl flush toilet that includes only a single nozzle. The alternating flow direction of fluid in the toilet bowl 3208 may also provide a pleasing aesthetic for a user during a flushing cycle. Among other benefits, the alternating flow direction improves cleaning by scouring the surface of the toilet bowl 3208 in two directions along most of the surface. In other embodiments, the location of the nozzles and/or number of nozzles may be different.

Figure 26:
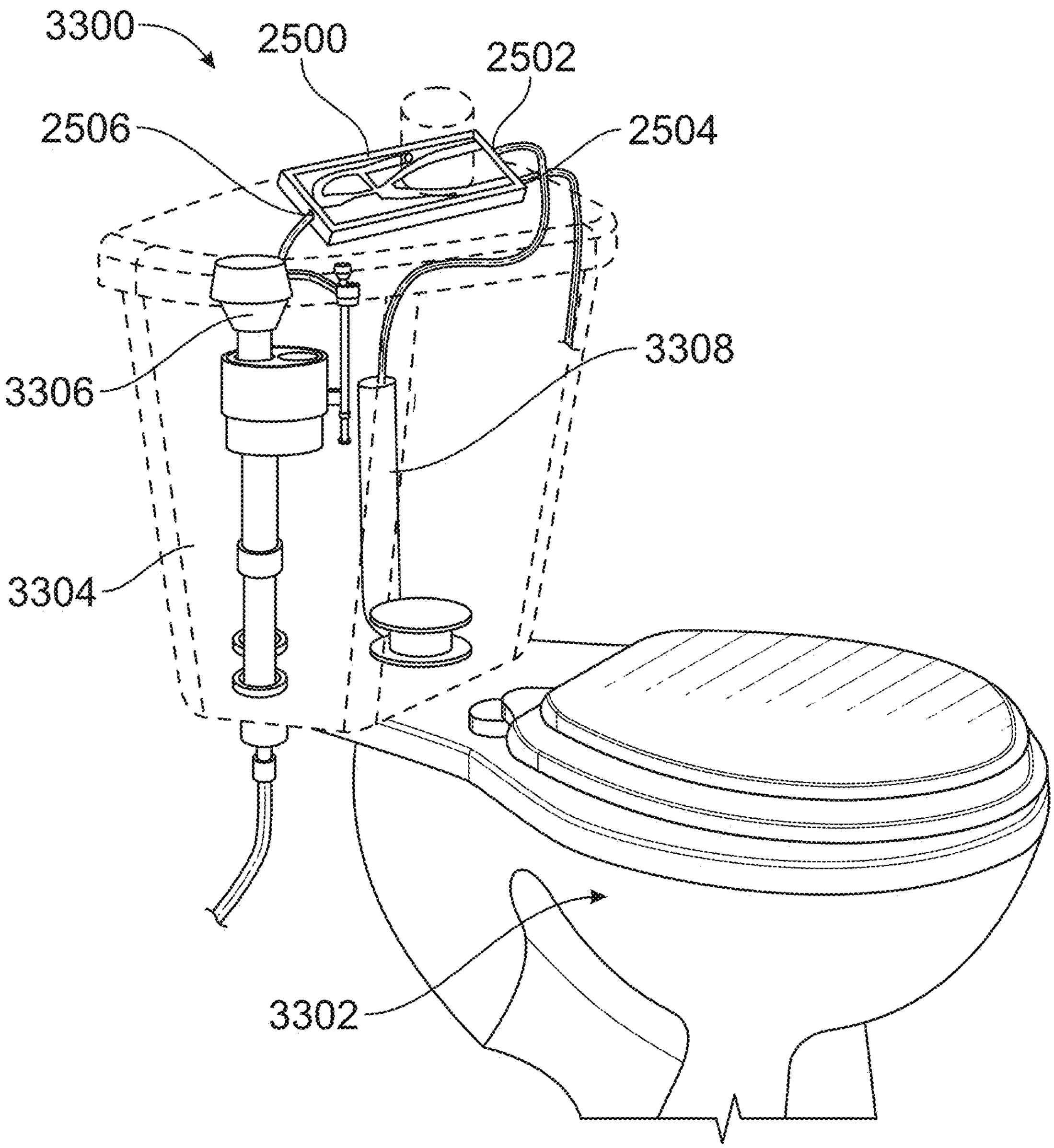
FIG. 26 is a quick-fill toilet assembly, according to an exemplary embodiment.

FIG. 26 shows a toilet assembly 3300 in which a fluidic switching device is included to increase the fill rate of the toilet bowl 3302 after a flushing event (e.g., operation, etc.). In the embodiment of FIG. 26, the switching device is the same as or similar to the switching device 2500 of FIG. 17A. In other embodiments, a different fluidic switching device may be used. The switching device 2500 may be disposed within the flush tank 3304 of the toilet assembly 3300 or at another suitable location (e.g., behind the flush tank, out of view of a user, etc.). The inlet port 2506 of the switching device 2500 is fluidly connected to a fill valve 3306 of the toilet assembly 3300. The first outlet port 2502 is fluidly coupled to a flush valve 3308 in the flush tank 3304.

During a flushing event, fluid (e.g., water) is directed by the switching device 2500 from the fill valve 3306 and directly into the toilet bowl 3302 (via first outlet port 2502). Flow continues into the toilet bowl 3302 from the switching device 2500 until the bowl 3302 is filled with fluid (e.g., for the predefined time period). At this point, the switching device 2500 redirects flow to the flush tank 3304 to prime the tank for the next flushing cycle. Among other benefits, the toilet assembly 3300 of FIG. 26 reduces the amount of time needed to refill the toilet bowl 3302 after a flushing event, so that another person can begin using the toilet. For example, the switching device 2500 can fill the toilet bowl 3302 in approximately 10 seconds as opposed to the 50 seconds that might otherwise be required. The toilet assembly 3300 will also remain cleaner as a result of continuously maintaining the fill level of fluid within the toilet bowl 3302.

Figure 27:
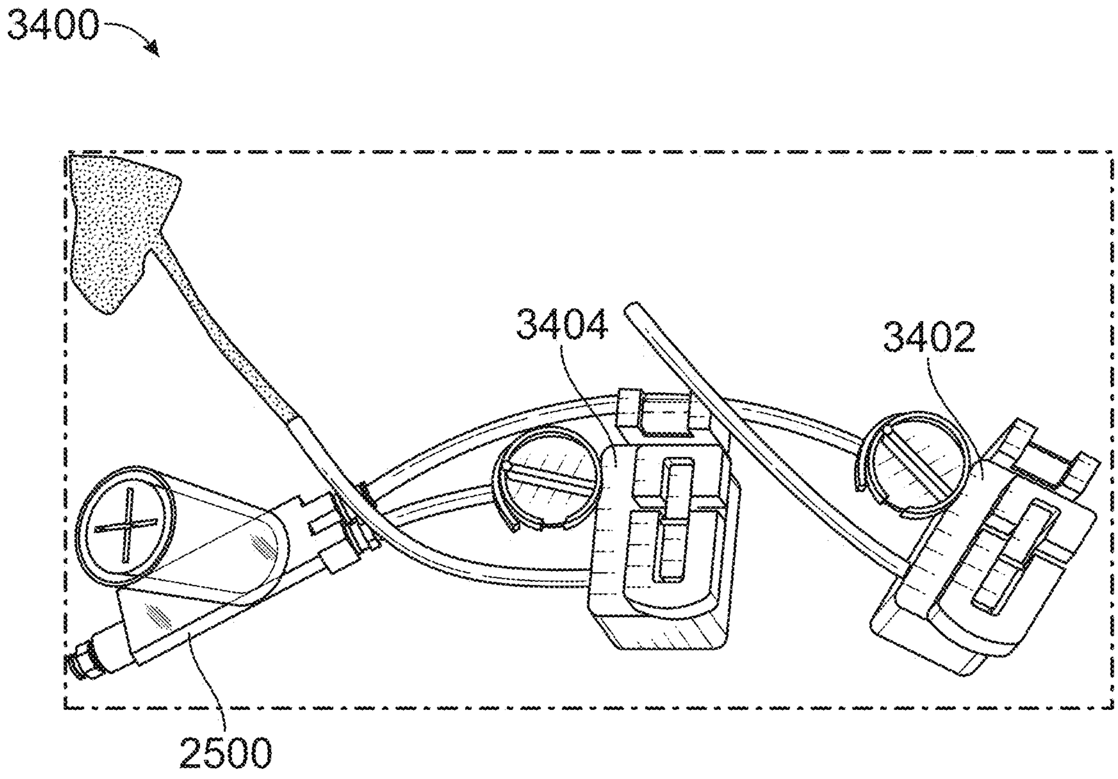
FIG. 27 is a chemical dispensing system, according to an exemplary embodiment.

The fluidic switching devices described with reference to FIGS. 17A-24 may also be utilized to facilitate cleaning operations for a toilet. For example, FIG. 27 shows a chemical dispensing system 3400 for a toilet assembly, according to an exemplary embodiment. The chemical dispensing system 3400 is configured to provide an alternating stream of different fluids to the toilet bowl, including a first fluid and a second fluid. In some embodiments, each of the first fluid and the second fluid are cleaning solutions that are configured to perform different cleaning operations. For example, the first fluid may be an acid and the second fluid may be a base. The first fluid may be formulated to remove organics from the surfaces of the toilet bowl (e.g., the first fluid may be bleach), and the second fluid may be formulated to remove scale from the surfaces of the toilet bowl. As such, the chemical dispensing system 3400 may form part of a biofilm remediation system for the toilet assembly. In other embodiments, the color of the first fluid may be different from the second fluid to provide a pleasing aesthetic to a user during the flush cycle. In other embodiments, the first fluid and the second fluid may be the same, but may be provided to different areas of the toilet assembly (e.g., in a rim area of the toilet bowl, in a sump area of the toilet bowl, in the flush tank, etc.).

As shown in FIG. 27, the chemical dispensing system 3400 includes a fluidic switching device (e.g., switching device 2500 of FIG. 17A, etc.) and a plurality of chemical saturators downstream of the switching device. A first chemical saturator 3402 is fluidly connected to a first outlet port of the switching device. A second chemical saturator 3404 is fluidly connected to a second outlet port of the switching device. In this way, fluid is dispensed from the first chemical saturator 3402 first and then from second chemical saturator 3404 after a predefined time period. In some embodiments, the chemical dispensing system 3400 includes a separate actuator to allow a user to manually initiate cleaning operations, separate from a flush event. Alternatively, or in combination, the actuator may be connected to or form part of the flush valve such that the release of fluid from the chemical dispensing system 3400 is coordinated with a flushing event.

Figure 28:
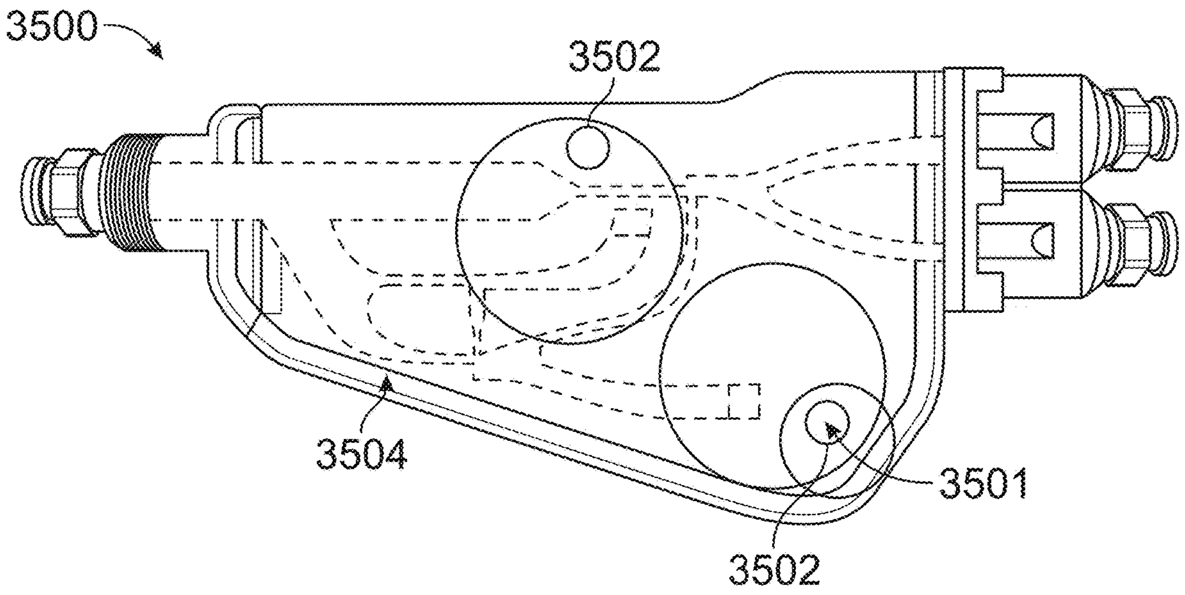
FIG. 28 is a top view of a fluidic switching device with a drain, according to an exemplary embodiment.
Figure 29:
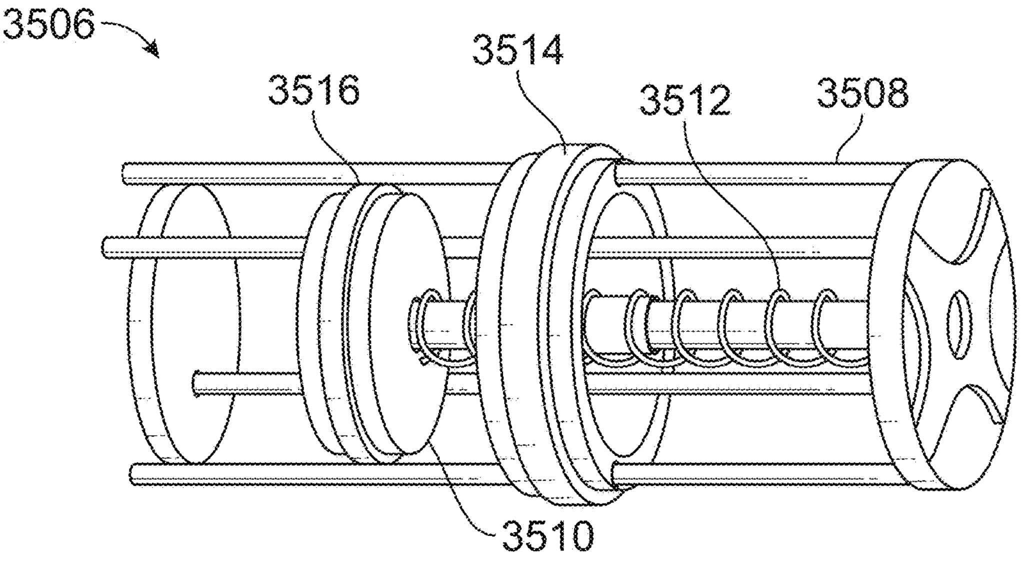
FIG. 29 is a perspective view of a drain valve for a fluidic switching device, according to an exemplary embodiment.

According to an exemplary embodiment, the fluidic switching devices include a drain system to reduce the amount of time that is required to reset the switching device after use. Referring to FIG. 28, a fluidic switching device is shown as switching device 3500, according to an exemplary embodiment. In the exemplary embodiment of FIG. 28, the switching device 3500 is of similar construction as the switching device 2500 described with reference to FIG. 17A. In other embodiments, the switching device may be of a different design (e.g., any one of the fluidic switching devices of FIGS. 17B-24, etc.). As shown in FIGS. 28-29, the drain system 3501 of the switching device 3500 includes a separate drain valve 3506 for each one of the fluid capacitors. Fluid drains from the fluid capacitors through drain openings 3502 disposed in an upper wall of the valve body 3504.

An exemplary drain valve 3506 for the drain system 3501 is shown in FIG. 29. The drain valve 3506 includes a support structure 3508 and a plunger 3510 coupled to and disposed within the support structure 3508. The plunger 3510 is biased into an open position by a spring 3512. The drain valve 3506 also includes a plurality of sealing members, including an outer sealing member 3514 coupled to the support structure 3508, in between the support structure 3508 and the valve body 3504 (see FIG. 28), and a plunger sealing member 3516 coupled to the plunger 3510 in between the plunger 3510 and the support structure 3508.

Figure 30:
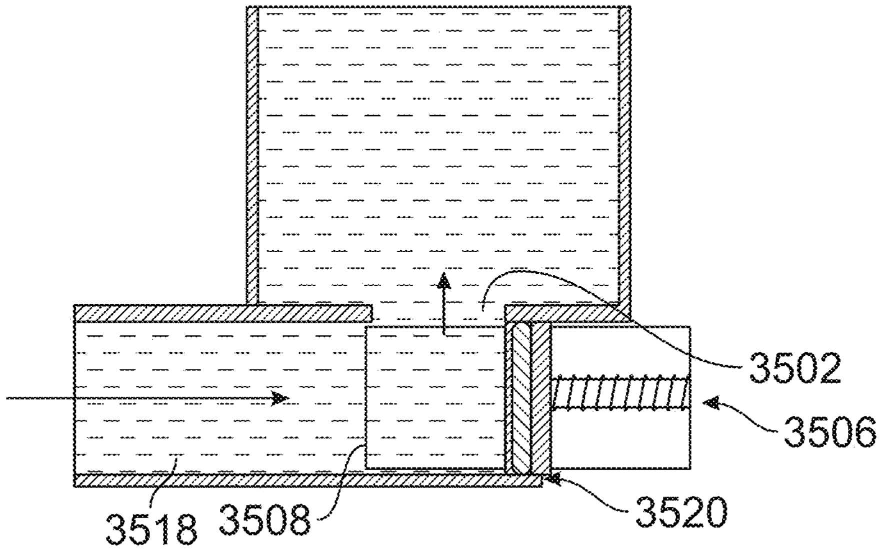
FIG. 30 is a side cross-sectional view of a drain valve portion of the fluidic switching device of FIG. 28 in a first state of operation.
Figure 31:
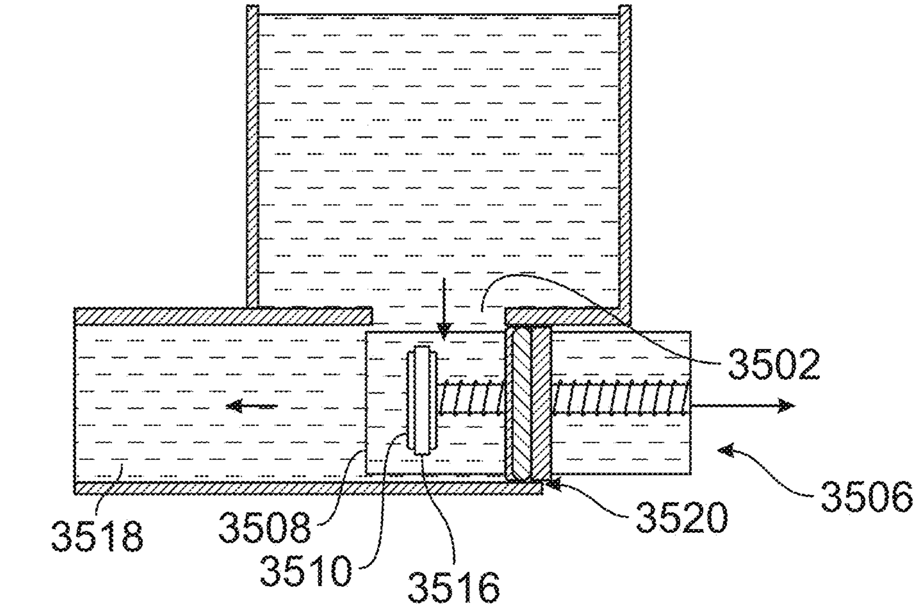
FIG. 31 is a side cross-sectional view of a drain valve portion of the fluidic switching device of FIG. 28 in a second state of operation.

FIGS. 30-31 illustrate the operation of the drain valve 3506. As shown in FIGS. 30-31, the drain valve 3506 is disposed within a drain channel 3518 of the switching device 3500, between the fluid capacitor and a drain outlet port 3520, immediately below the drain openings 3502. In some embodiments, as shown in FIGS. 30-31, the drain valve 3506 may be incorporated into existing flow channels of the switching device (e.g., into channels between the passages of the switching device and the inlet port to the fluid capacitor). In other embodiments, as shown in FIG. 28, the drain valve 3506 may be incorporated into a separate fluid opening at the bottom (e.g., lower end) of the fluid capacitor. As shown in FIGS. 30-31, the position of the drain valve 3506 is determined based on the fluid pressure at the lower end of the capacitor (near the plunger 3510). When the capacitor is being filled, the fluid pressure at the lower end of the fluid capacitor (and/or fluid velocity acting on the face of the plunger 3510) urges the plunger 3510 toward the drain outlet port 3520. The plunger sealing member 3516 engages the support structure 3508 to substantially prevent any fluid from leaving the capacitor. Once the water pressure is removed from the face of the plunger 3510, the plunger 3510 retracts to open the fluid path between the drain opening 3502 and the drain outlet port 3520, so that fluid can drain quickly from the capacitor.

Figure 32:
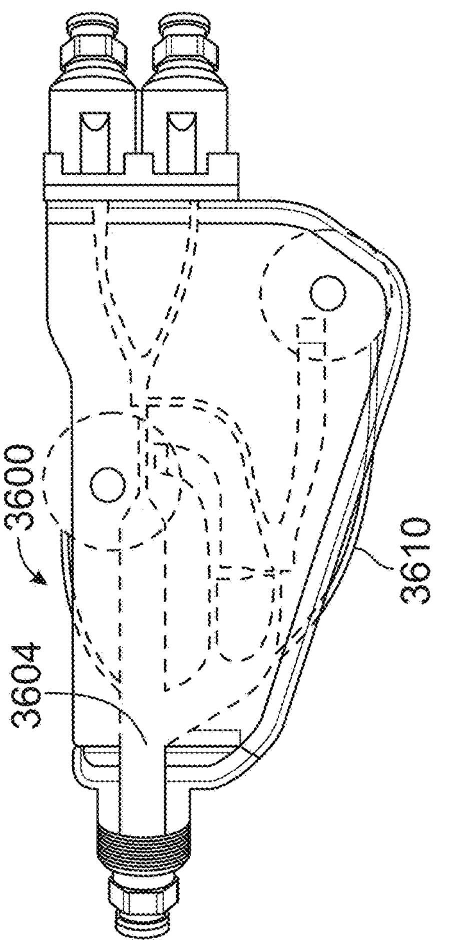
FIG. 32 is a top view of a fluidic switching device with a drain, according to another exemplary embodiment.
Figure 34:
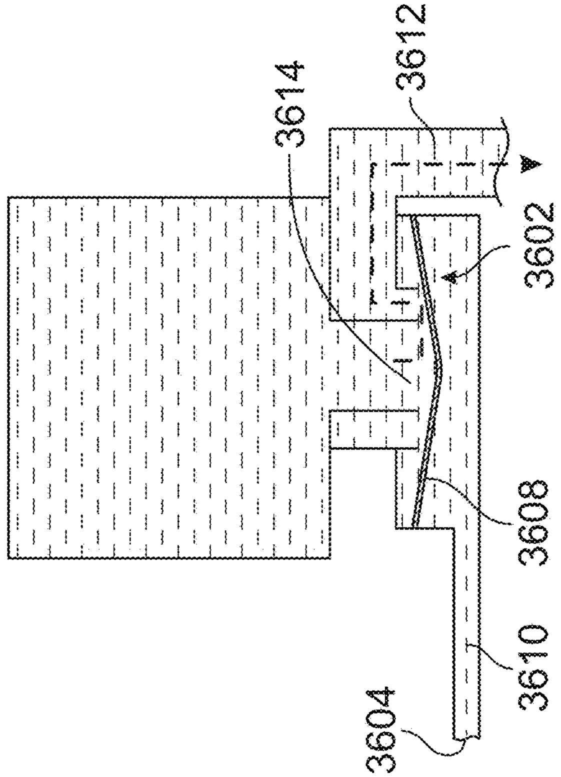
FIG. 34 is a side cross-sectional view of a drain valve portion of the fluidic switching device of FIG. 32 in a second state of operation.
Figure 33:
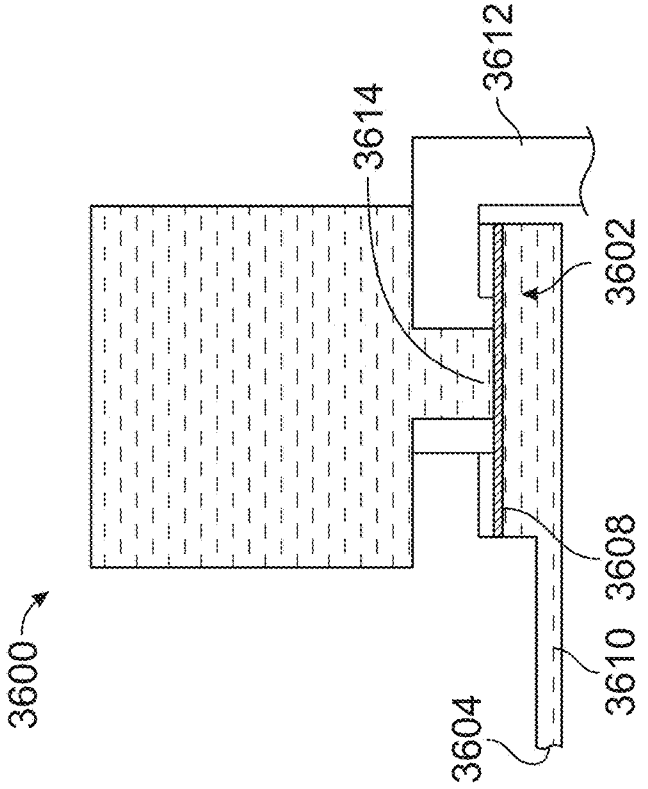
FIG. 33 is a side cross-sectional view of a drain valve portion of the fluidic switching device of FIG. 32 in a first state of operation.

The design of the drain system 3501 described with respect to FIGS. 28-31 should not be considered limiting. Various alterations are possible without departing from the inventive concepts disclosed herein. For example, in some embodiments a single drain valve may be used to selectively control the fluid flow through multiple drain channels. In other embodiments, the drain valve may be at least partly fluidly connected to the inlet port of the switching device such that the plunger is actuated depending on the fluid pressure at the inlet port rather than the fluid pressure near the drain opening in the valve body. For example, FIGS. 32-34 show a drain system 3600 for a switching device in which each drain valve 3602 is fluidly connected to an inlet port 3604 of the switching device. The drain valve 3602 includes a diaphragm 3608 that is disposed in a flow manifold near the lower end of the fluid capacitor. A control conduit 3610 extends between a lower end of the fluid capacitor and the inlet port 3604. As shown in FIGS. 33-34, the diaphragm 3608 fluidly isolates the control conduit 3610 from both a drain channel 3612 and the drain opening 3614 at a lower end of the capacitor.

As shown in FIGS. 33-34, the diaphragm 3608 is configured to selectively fluidly couple the drain opening 3614 and the drain channel 3612 depending on a fluid pressure from the source (e.g., depending on the fluid pressure at the inlet port 3604). When the fluid pressure from the source is high (e.g., when the switching device is activated), the diaphragm 3608 presses upwardly against the drain opening 3614 and an inlet to the drain channel 3612. This allows the fluid capacitor to fill with fluid. When the fluid pressure from the source is low (e.g., after deactivating the switching device), the diaphragm 3608 is allowed to move away from the drain opening 3614 and the inlet to the drain channel 3612, thereby fluidly coupling the drain opening 3614 to the drain channel 3612. In some embodiments, the drain system 3600 also includes a spring to bias the diaphragm 3608 away from the drain opening 3614 and the drain channel 3612 to improve draining performance (e.g., to reduce draining time, etc.).

Figure 35:
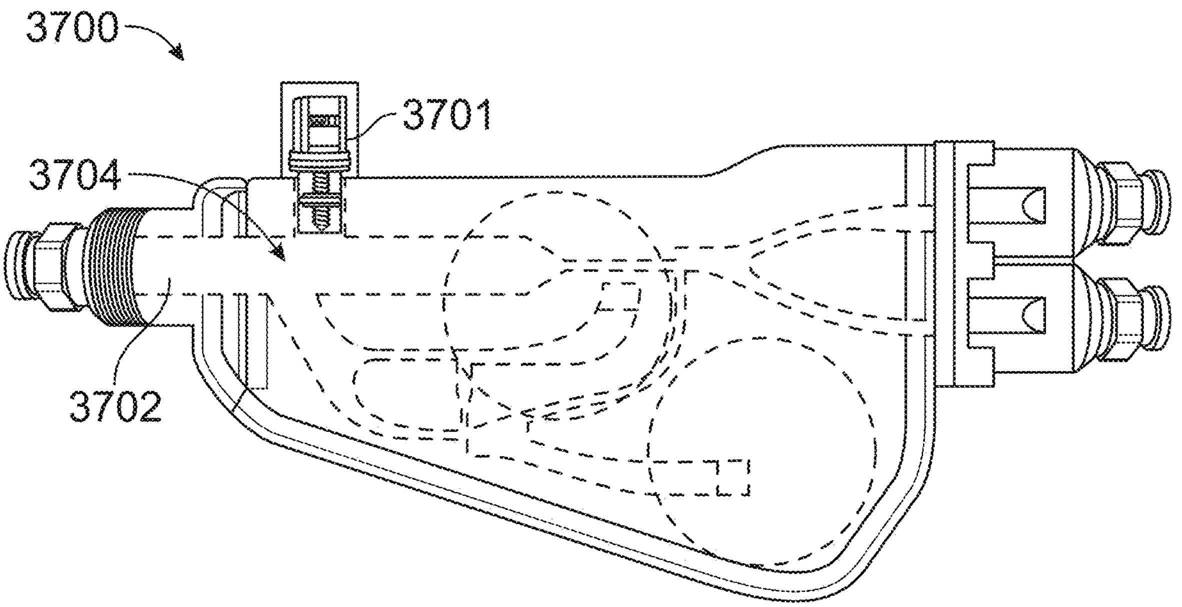
FIG. 35 is a top cross-sectional view of a fluidic switching device with a drain, according to another exemplary embodiment.

The position of the drain valve may differ in various exemplary embodiments. For example, FIG. 35 shows a fluidic switching device 3700 that includes a drain valve 3701 just downstream of the inlet port 3702 (within a first splitter portion 3704). Among other benefits, the drain valve 3701 of FIG. 35 reduces the time required to drain the switching device 3700 relative to a switching device that must drain through either of the outlet ports.

Figure 36:
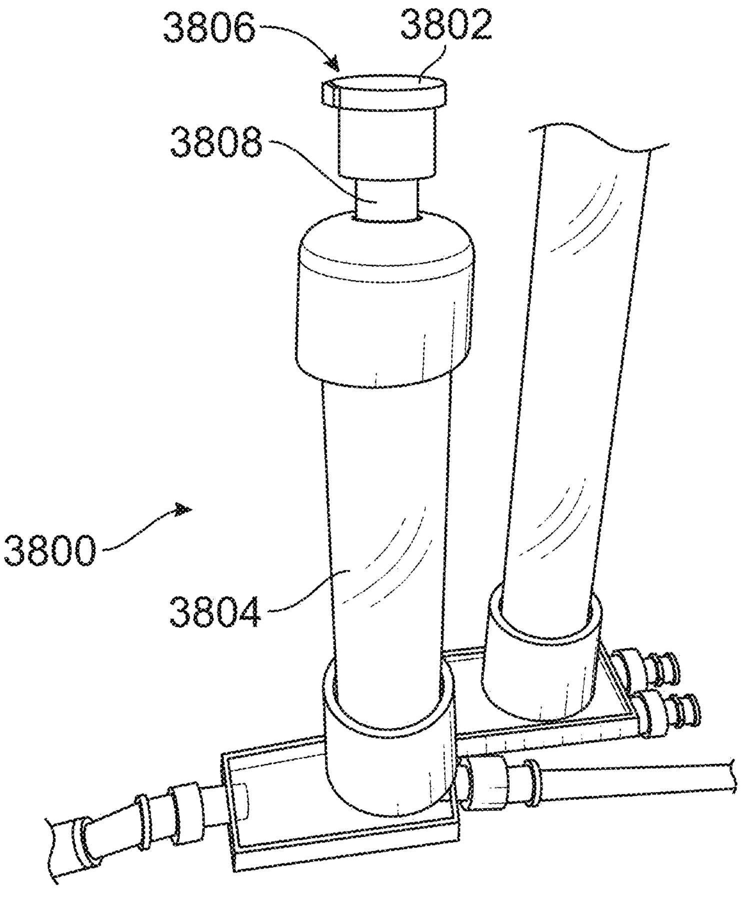
FIG. 36 is a perspective view of a capacitor assembly, according to an exemplary embodiment.

Yet another exemplary embodiment of a drain system 3800 of a fluidic switching device is shown in FIG. 36. The drain system 3800 includes fluid capacitors 3804 having vent openings 3802 that allow air to flow into the fluid capacitors 3804 to reduce draining time. In the exemplary embodiment of FIG. 36, each vent opening 3802 is disposed on a respective one of the fluid capacitors 3804, on an upper end 3806 of the fluid capacitors 3804. The drain system 3800 may also include floats 3808 (e.g., buoyant elements, ball floats, etc.) that selectively block the vent openings 3802 depending on a fill level of fluid within the fluid capacitors 3804. The floats 3808 rest on top of the fluid and are urged by the fluid against the vent opening 3802 when the fluid level exceeds a predefined threshold. Among other benefits, using a floats 3808 reduce constraints on the size of the vent openings 3802 to improve draining time.

In other embodiments, the vent openings 3802 may be closed (e.g., blocked, sealed, etc.) to allow pressure to accumulate within the fluid capacitors 3804 as the fluid level rises. Once the switch is deactivated (e.g., once flow to the inlet port is cut off), the air pressure forces the fluid out of the capacitor to more quickly empty the capacitors without other moving components.

Figure 37:
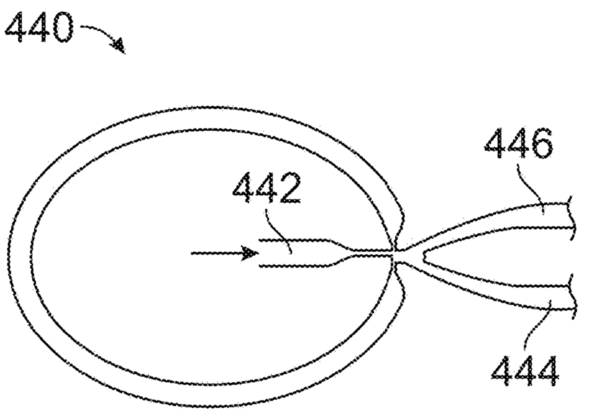
FIG. 37 is a sectional view of a fluidic oscillator, according to another exemplary embodiment.

In some embodiments, the geometry of the fluidic oscillator may be modified to coordinate flow through two or more jets while also controlling the proportion of total flow exiting the fluidic device through each of the jets. FIG. 37 shows an asymmetric bi-stable fluidic oscillator 440 configured to preferentially deliver a pulsating flow of water to one of two jets. Similar to the fluidic oscillator 414 of FIG. 11, the fluidic oscillator 440 of FIG. 37 includes an inlet channel 442 and two outlet channels 444, 446 configured to deliver water to multiple jets of the plumbing fixture. As shown in FIG. 37, an axis (e.g., a central axis) of the inlet channel 442 parallel to a flow direction through the inlet channel 442 is biased toward an upper outlet channel 446 of the fluidic oscillator 440. In this manner, flow is directed preferentially (with occasional switching) toward the upper outlet channel 446.

Figure 38A:
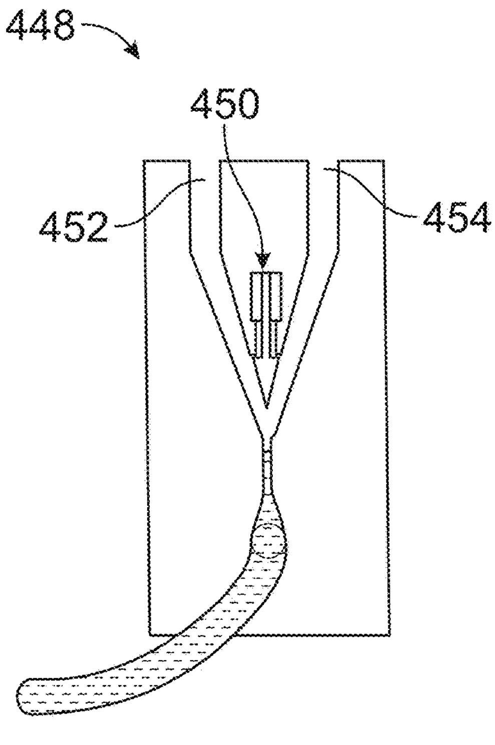
FIG. 38A is a sectional view of a fluidic oscillator, according to another exemplary embodiment.
Figure 38B:
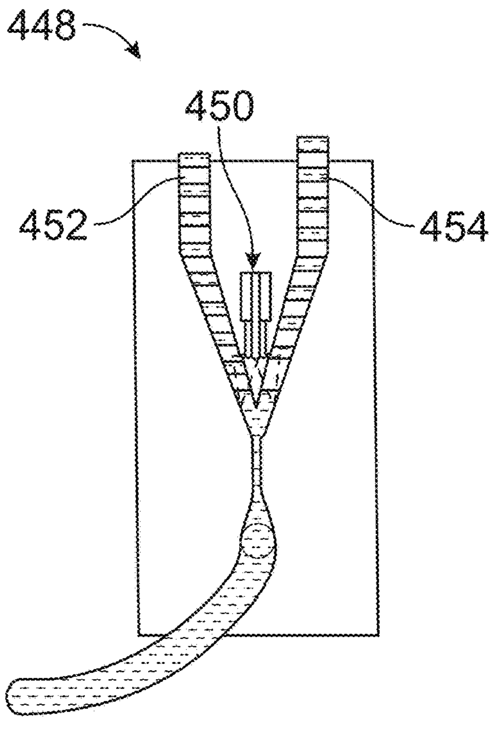
FIG. 38B is a sectional view of the fluidic oscillator of FIG. 38A during operation.

Yet another embodiment of a bi-stable fluidic oscillator 448 is shown in FIGS. 38A-38B. As shown in FIGS. 38A-38B, the fluidic oscillator 448 utilizes a piezo driven actuator 450 (e.g., a piezoelectric vibrator or other controllable vibrating mechanism) to switch the flow between one of two outlet channels 452, 454 of the fluidic oscillator 448. The frequency of the piezo driven actuator 450 may be modified in order to adjust the frequency of pulsating flow delivered through each outlet channel 452, 454. In some embodiments, the piezo driven actuator 450 may be configured to pump water through the fluidic oscillator 448 to one or more jets of the plumbing fixture under its own power (e.g., without supply pressure on the input leg of the fluidic oscillator 448).

Figure 39B:
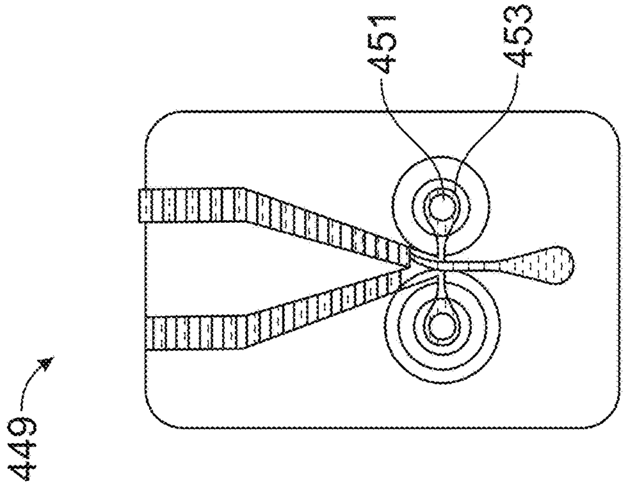
FIG. 39B is a top view of the fluidic oscillator of FIG. 39A.
Figure 39A:
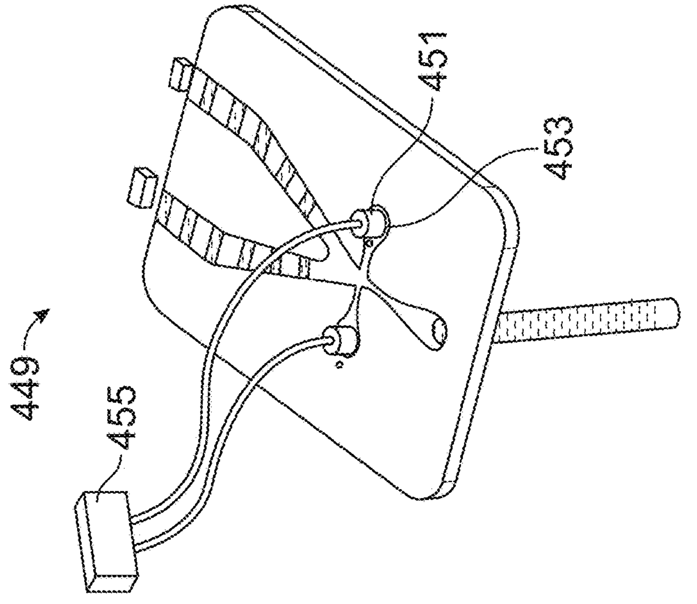
FIG. 39A is a perspective view of a fluidic oscillator, according to another exemplary embodiment.
Figure 39C:
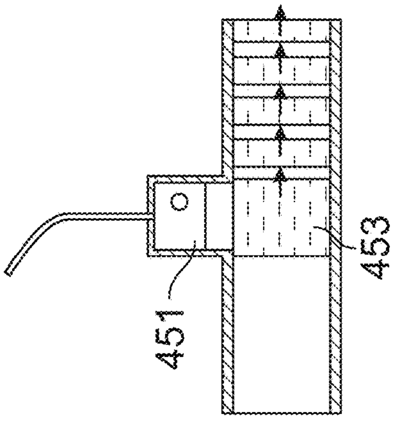
FIG. 39C is a side sectional view of the fluidic oscillator of FIG. 39A.

FIGS. 39A-39C show a bi-stable fluidic oscillator 449 that includes a plurality of piezo elements 451. Each of the piezo elements are positioned in a control port 453 of the bi-stable fluidic oscillator 449. The fluid control circuit may additionally include a controller 455 to selectively activate and deactivate each of the piezo elements 451 in order to switch the flow through different legs (e.g., outlet passageways) of the bi-stable fluidic oscillator 449.

Figure 40:
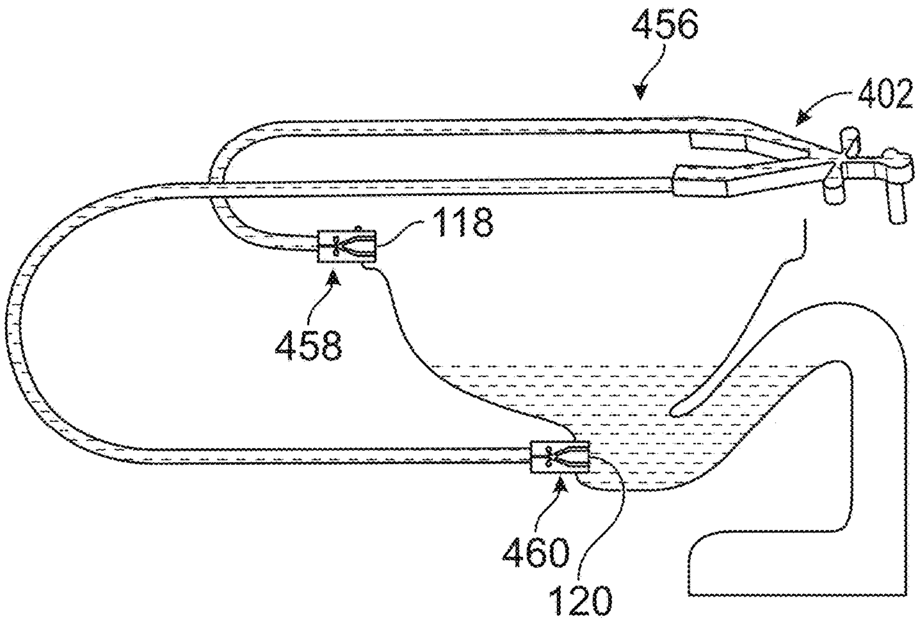
FIG. 40 is a side sectional view of a line pressure toilet including fluidic oscillators arranged in series, according to an exemplary embodiment.

The fluid control circuit may be modified to include a plurality of interconnected fluidics devices. These devices may be configured to interact with one another to set an operating frequency of pulsating flow at one or more jets. FIG. 40 shows a modified version of the fluid control circuit 400 of FIG. 9, according to an exemplary embodiment. As shown in FIG. 40, the fluid control circuit 456 includes a lower stage fluidic oscillator coupled to each of the rim jet 118 and the sump jet 120, shown as rim jet oscillator 458 and sump jet oscillator 460. The lower stage oscillators 458, 460 are each arranged in a series flow arrangement with an upper stage fluidic oscillator 402 (e.g., each of the lower stage oscillators 458, 460 are fluidly coupled to a corresponding one of the output channels of the upper stage fluidic oscillator 402). The frequency of water pulsations at the sump jet is a function of the geometry and frequency of both the upper stage oscillator 402 and the sump jet oscillator 458. The frequency of water pulsations at the rim jet is a function of the geometry and frequency of both upper stage oscillator 402 and the rim jet oscillator 460. Among other benefits, the fluid control circuit 456 of FIG. 40 provides a mechanism by which an overall operating frequency of the fluid control circuit 456 can be adjusted (e.g., via upper stage fluidic oscillator 402), while maintaining different operating frequencies at each of the rim jet 118 and the sump jet 120. Such a configuration is particularly desirable in situations where the waste accumulation occurs preferentially in certain locations of the toilet. In these situations, the jets used to clean the problematic area may be tuned independently from other jets in order to improve waste removal performance.

Figure 41:
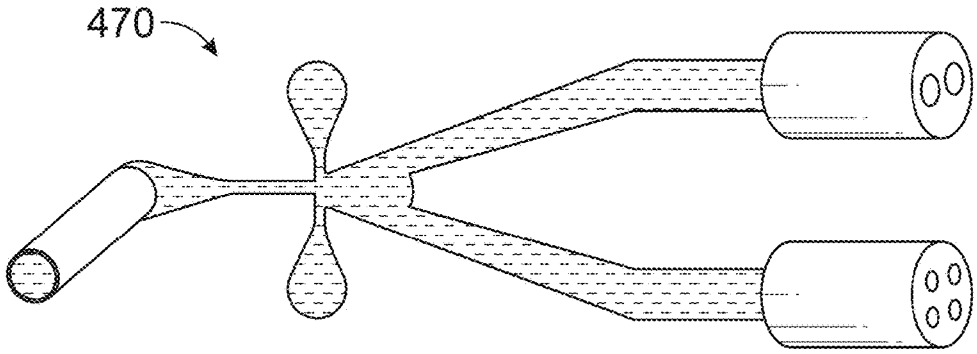
FIG. 41 is a sectional view of a fluidic oscillator including two different outlet nozzle configurations, according to an exemplary embodiment.
Figure 42:
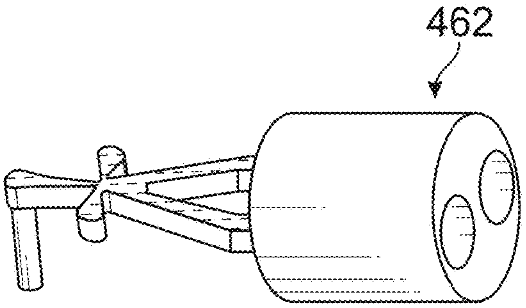
FIG. 42 is a perspective view of a single fluidic oscillator, according to an exemplary embodiment.
Figure 43:
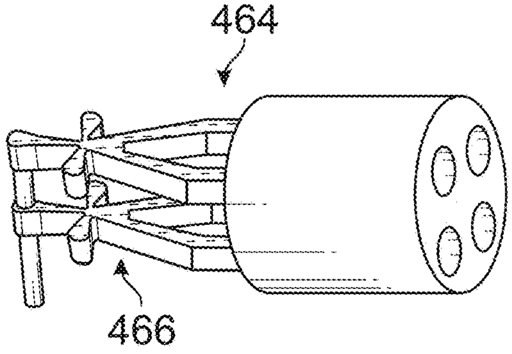
FIG. 43 is a perspective view of a dual fluidic oscillator, according to an exemplary embodiment.

FIGS. 41-43 show different arrangements of fluidic oscillators that may be implemented at the jet face, according to various exemplary embodiments. FIG. 41 shows a chained arrangement of fluidic oscillators 470, with additional sets of fluidic oscillators at each outlet. FIG. 42 shows a side-by-side arrangement of jets formed using a single fluidic oscillator 462 (e.g., at an upper outlet of FIG. 41). FIG. 43 shows a quad (e.g., rectangular) arrangement of jets formed using multiple fluidic oscillators 464, 466 arranged in a parallel flow arrangement (e.g., at a lower outlet of FIG. 41). Among other benefits, linking multiple fluidic oscillators together coordinates flow through each jet, while also providing a level of independent control over the operation of each jet.

Figure 44:
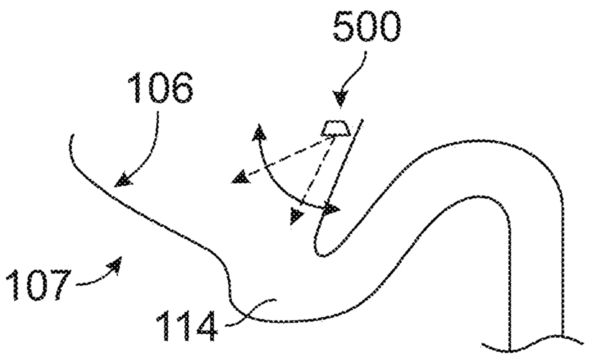
FIG. 44 is a side sectional view of a toilet including a fluidic oscillator, according to an exemplary embodiment.
Figure 45:
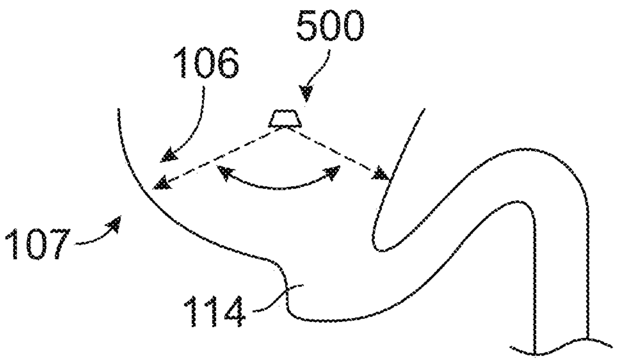
FIG. 45 is a side sectional view of a toilet including a fluidic oscillator, according to another exemplary embodiment.
Figure 46:
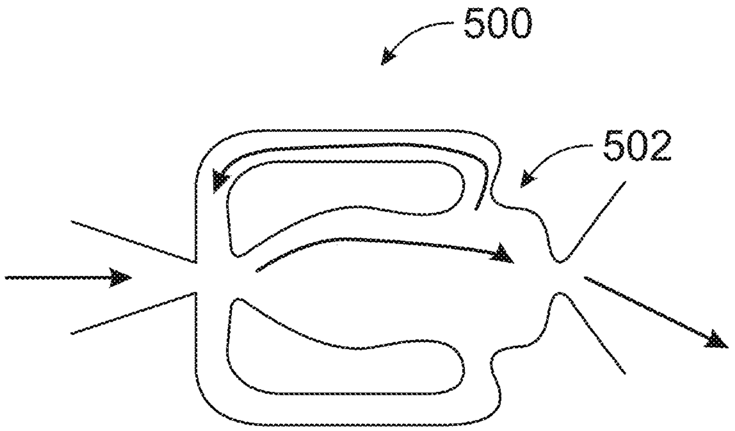
FIG. 46 is a sectional view of a fluidic oscillator, according to another exemplary embodiment.

In some embodiments, the jets of the plumbing fixture may be angled in different directions to more uniformly distribute water over the surfaces of the plumbing fixture and improve waste removal performance. FIGS. 44-45 show a toilet that is the same or similar to the toilet 100 of FIGS. 1-2. In the embodiment of FIGS. 44-45, the toilet includes a toilet body 107 defining a fluid receiving reservoir, shown as toilet bowl 106. The toilet also includes a single fluidic oscillator 500 configured to distribute water over an inner surface of the toilet bowl 106. In FIG. 44, the fluidic oscillator 500 is coupled (e.g., mounted, affixed, fastened, etc.) to the toilet body 107 along a back wall of the inner surface. The fluidic oscillator 500 is positioned to direct water toward both a forward wall of the inner surface and the sump 114. In other embodiments, the fluidic oscillator 500 may be positioned to direct water to other surfaces of the toilet bowl 106. In FIG. 45, the fluidic oscillator 500 is disposed along a side wall of the inner surface and configured to direct water toward both the forward wall and the back wall. In some embodiments, the fluidic oscillator 500 includes a fluidic diverter valve configured to switch flow between multiple angled jets. According to an exemplary embodiment, as shown in FIG. 46, the fluidic oscillator 500 is a compact (e.g., small size, low profile, etc.) fan oscillator 502 configured to continuously redirect (e.g., swing up and down as shown in FIG. 46) the flow of water to different locations within the toilet bowl 106.

In some embodiments, the fan oscillator 502 may be coupled to the rim 112 of the toilet. In other embodiments, the fan oscillator 502 may be coupled to the inner surface of a rimless toilet bowl. In yet other embodiments, the fan oscillator 502 may form part of a bidet wand for cleaning a user's body and/or spot cleaning troublesome areas during a flush cycle. The fan oscillator 502 may be configured to dispense fluidic surface sanitizing sprays, pre-usage wetting sprays, or rinse sprays onto the inner surfaces of the toilet bowl 106 during a flush cycle and/or in between flushes to maintain the appearance of the toilet bowl 106.

Figure 47:
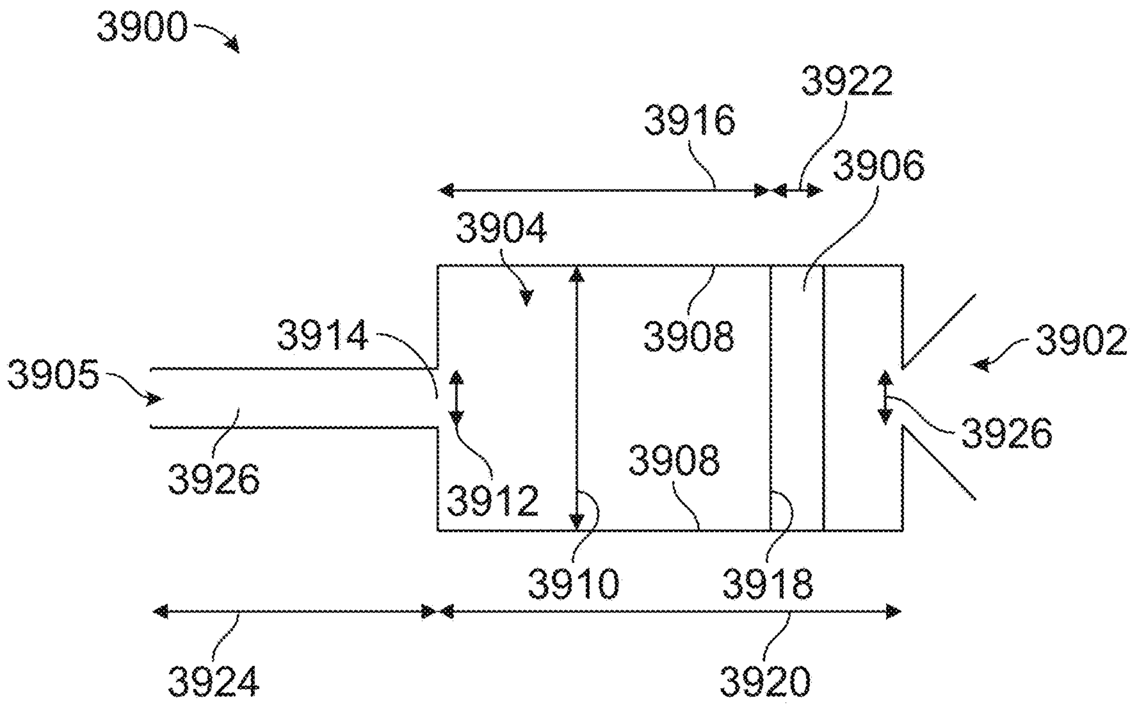
FIG. 47 is a sectional view of a fluidic oscillator, according to another exemplary embodiment.
Figure 48:
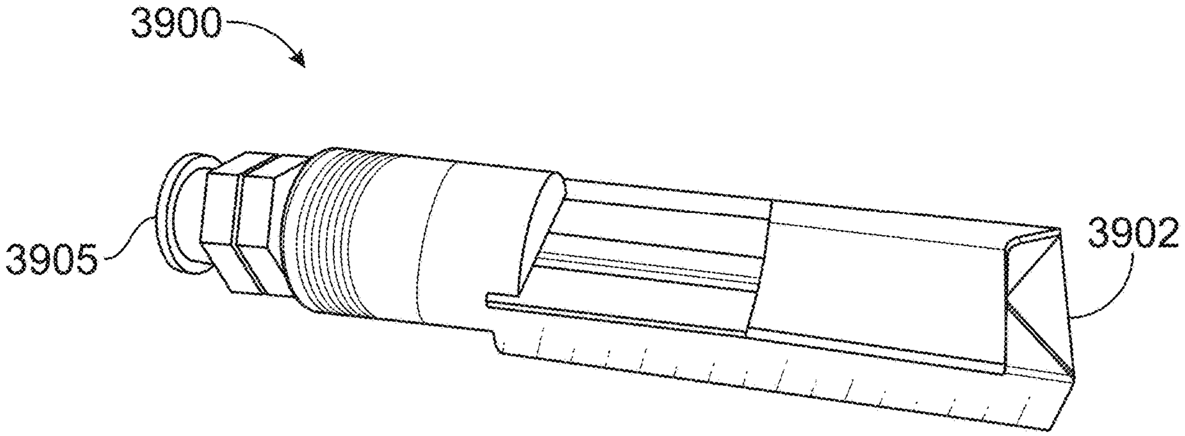
FIG. 48 is a perspective view of the fluidic oscillator of FIG. 47.

The geometry of the fan oscillator 502 may vary depending on the desired frequency, flow rate, and distribution area. The design and/or arrangement of the fluid channels within the fan oscillator may also differ in various exemplary embodiments. Referring now to FIGS. 47-48, a fluidic oscillator 3900 (e.g., fan oscillator, etc.) is shown that produces an oscillating flow of fluid at an outlet port 3902. The fluidic oscillator 3900 includes an inlet port 3905 and a plenum 3904 (e.g., cavity, space, etc.) that fluidly connects the inlet port 3905 and the outlet port 3902. The fluidic oscillator 3900 also includes a recessed area 3906 (e.g., trough) that is disposed along a lower wall of the plenum 3904 and that extends between sidewalls 3908 of the plenum 3904, such that the recessed area 3906 fills an entire width of the plenum 3904. According to an exemplary embodiment, the fluidic oscillator 3900 is formed from a single piece of material (e.g., the fluidic oscillator 3900 is a single unitary body, cartridge, etc.). In the exemplary embodiment of FIG. 47, a width 3910 of the plenum 3904 between sidewalls 3908 is approximately 4 times greater than a width 3912 at the inlet 3914 to the plenum 3904, a distance 3916 between an upstream end 3918 of the recessed area 3906 and the inlet 3914 in a flow direction (e.g., between the inlet 3914 and the outlet port 3902) is approximately half of an overall length 3920 of the plenum 3904, a length 3922 of the recessed area 3906 in the flow direction is approximately equal to the width 3912 of the inlet 3914, a length 3924 of a channel 3926 that fluidly connects the inlet 3914 to inlet port 3905 is approximately equal to the overall length 3920 of the plenum 3904, and a width 3926 of the outlet port 3902 is approximately equal to the width 3912 of the inlet port 3914. In other embodiments, the geometry of the flow channels within the fluidic oscillator 3900 may be different. Among other benefits, the geometry of the fluidic oscillator 3900 shown in FIGS. 46-47 may be manufactured from vitreous china and are particularly well-suited for incorporation into a toilet or urinal.

Figure 49:
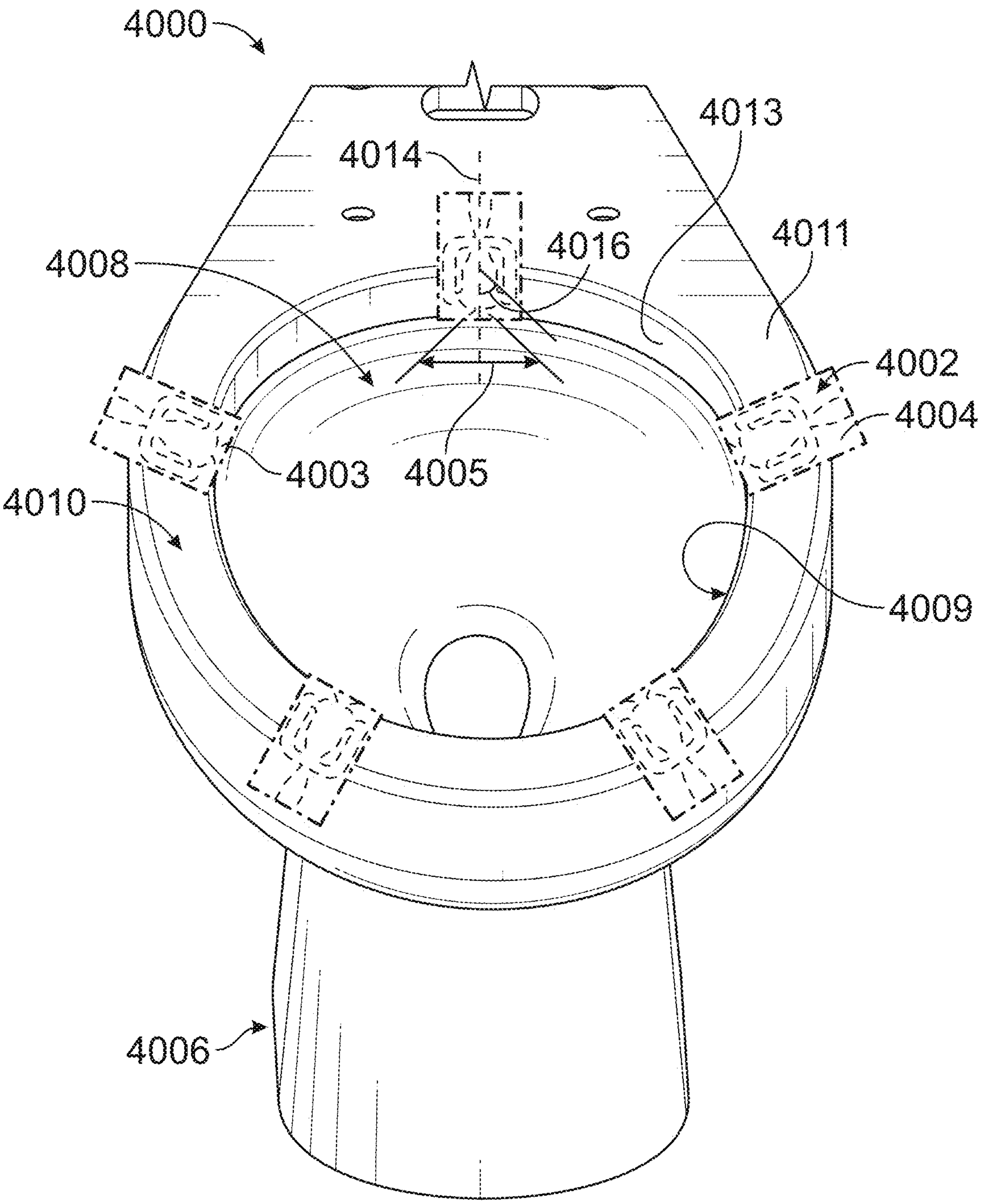
FIG. 49 is a perspective view of a toilet assembly with an oscillating rim jet system, according to an exemplary embodiment.

FIG. 49 shows a toilet assembly 4000 that includes an oscillating rim jet system 4002, according to an exemplary embodiment. The oscillating rim jet system 4002 includes a plurality of fluidic oscillators 4004 that are configured to distribute fluid onto the surfaces a toilet 4006 (e.g., toilet bowl 4008) in a sweeping (e.g., oscillating, fanning, side-to-side etc.) pattern. The fluidic oscillators 4004 may be the same as or similar to the fluidic oscillator 3900 described with reference to FIGS. 47-48 and/or the fluidic oscillator 502 described with reference to FIG. 46. As shown in FIG. 49, each of the fluidic oscillators 4004 is disposed along an upper perimeter of the toilet in a rim area 4010 of the toilet bowl 4008. The fluidic oscillators 4004 may be disposed within a rim channel 4009 that extends inwardly from the outer perimeter of the toilet bowl 4008. For example, the rim channel 4009 may be an overhanding channel (e.g., a "U" shaped channel) that includes a horizontal portion 4011 that extends radially inwardly from the outer perimeter of the toilet bowl 4008 (along an upper edge of the toilet bowl 4008) and a vertical portion 4013 that extends downwardly from the horizontal portion and in a substantially perpendicular orientation relative to the horizontal portion 4011. In some embodiments, the fluidic oscillators 4004 may be cartridges that are disposed at least partially within and/or connected to the rim channel 4009. In other embodiments, the fluidic oscillators 4004 may be at least partially molded into the rim channel 4009.

As shown in FIG. 49, the oscillating rim jet system 4002 includes six fluidic oscillators 4004 that are spaced equally in 72° increments along the perimeter of the toilet bowl 4008 to fully cover the interior surfaces of the toilet bowl 4008 in at least one vertical position above the sump (e.g., to cover the interior surfaces of the toilet bowl 4008 with fluid along an entire perimeter of toilet bowl 4008 in at least one vertical position between the sump and the rim area, etc.). In other embodiments, the system 4002 may include additional or fewer fluidic oscillators. The spacing between adjacent fluidic oscillators may also differ in various exemplary embodiments. An outlet port 4003 of each one of the plurality of fluidic oscillators 4004 is positioned to direct fluid is a side-to-side motion (e.g., in a substantially circumferential direction 4005) along a plane that is substantially parallel to the inner surface, or angled slightly toward the inner surface (e.g., such that a distance between the stream of fluid leaving the outlet port 4003 at a first side of the outlet port 4003 and the inner surface is approximately the same as a distance between the stream of fluid leaving the outlet port 4003 at a second side of the outlet port 4003 opposite the first side). Among other benefits, the flow patterns produced by the fluidic oscillators 4004 provides a pleasing aesthetic for a user of the toilet.

In the exemplary embodiment of FIG. 49, each of the fluidic oscillators 4004 is oriented approximately parallel with the vertical reference line 4014 passing through the rim area. In other embodiments, at least one fluidic oscillator 4004 may be arranged at an angle 4016 with respect to the vertical reference line 4014. According to an exemplary embodiment, each of the fluidic oscillators 4004 is positioned at an angle 4016 within a range between approximately 20° and 30° with respect to the vertical reference line 4014, such that the flow leaving through the outlet port 4003 circulates along the surfaces of the toilet bowl in a clockwise direction during a flush. In other embodiments, the arrangement of the fluidic oscillators 4004 may be different.

According to an exemplary embodiment, the combined flow rate through the fluidic oscillators 4004 (e.g., from the rim jet nozzles) is approximately 4.5 gal/min, or approximately 0.75 gal/min through each fluidic oscillator 4004. In other embodiments, the combined flow rate through the oscillating rim jet system 4002 may be different. The cycling frequency may be approximately 0.5 Hz, 1 Hz, 5 Hz, 10 Hz, 20 Hz, 40 Hz, 60 Hz, 80 Hz, 100 Hz, or any range between and including any two of the foregoing values (e.g., at least approximately 60 Hz to approximately 80 Hz, etc.), to maximize the aesthetic appearance of the fluidic oscillators 4004 in operation and their effectiveness in cleaning the surfaces of the toilet bowl 4008. In other embodiments, the frequency of fluid oscillations produced at the outlet port of the fluidic oscillators 4004 may be different.

Figure 50A:
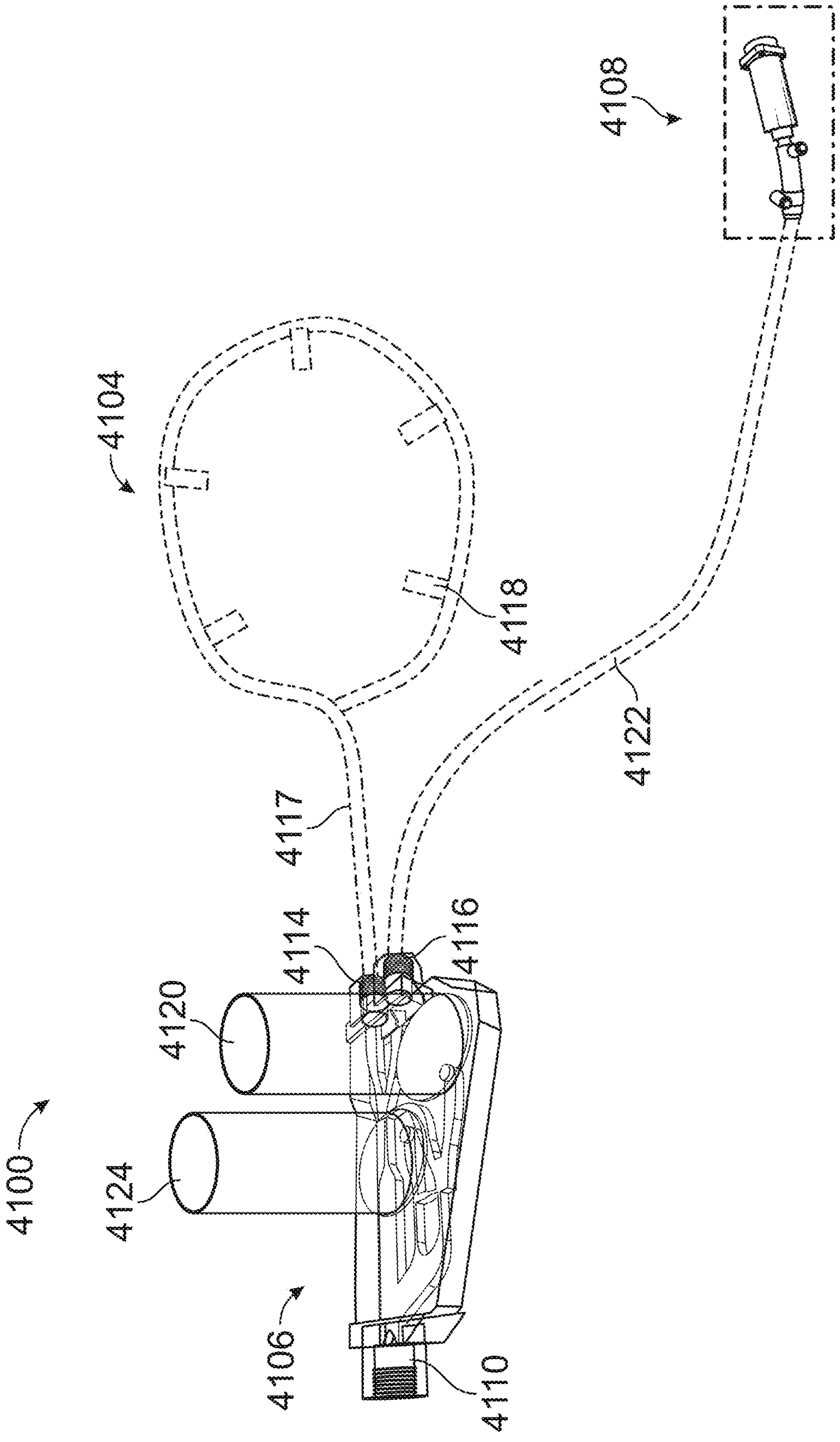
FIG. 50A is a schematic diagram of a flushing system for a toilet, according to an exemplary embodiment.
Figure 50B:
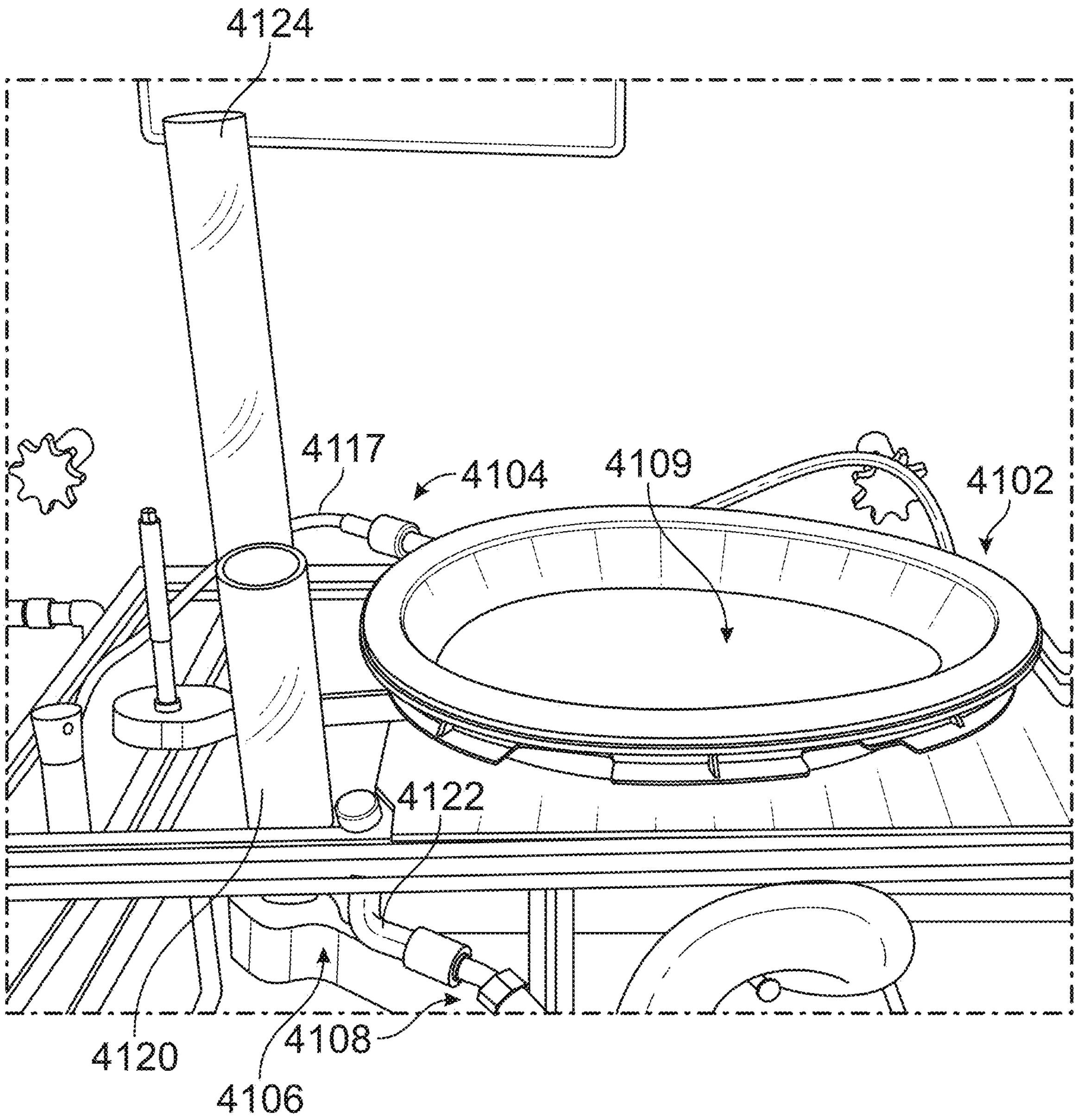
FIG. 50B is a prototype of the flushing system of FIG. 50B.

FIGS. 50A-50B show a flushing system 4100 for a toilet 4102 that includes an oscillating rim jet system 4104, according to an exemplary embodiment. The oscillating rim jet system 4104 includes a plurality of fluidic oscillators 4118 arranged in a ring (e.g., a circular arrangement, etc.). The fluidic oscillators 4118 are fluidly connected to one another. In other embodiments, each of the fluidic oscillators 4118 is separately fluidly connected to an inlet of the oscillating rim jet system 4104. As shown in FIGS. 50A-50B, the flushing system 4100 includes a fluidic switching device 4106 and a sump jet 4108. The fluidic switching device 4106 may be the same as or similar to the switching device 2700 of FIG. 18. In other embodiments, the fluidic switching device 4106 may be different. As shown in FIG. 50B, the plurality of fluid capacitors for the fluidic switching device 4106 may be positioned behind the toilet bowl 4109 (e.g., within a wall to which the toilet bowl 4109 is mounted, etc.). In other embodiments, the position of the fluidic switching device 4106 may be different. The sump jet 4108 is a fluid nozzle disposed in a sump area of a toilet bowl 4109 at a lower end of the toilet bowl 4109. In other embodiments, the sump jet 4108 may be replaced with a fluid nozzle in an upward leg of an outlet portion of the toilet, downstream of the sump area.

The fluidic switching device 4106 is configured to coordinate operation of the oscillating rim jet system 4104 and the sump jet 4108 during a flush event (e.g., a flush, etc.). An inlet port 4110 of the fluidic switching device 4106 is fluidly connected to a flush valve of a line pressure toilet 4102. A first outlet port 4114 of the fluidic switching device 4106 is fluidly connected to the oscillating rim jet system 4104 and a second outlet port 4116 of the fluidic switching device 4106 is fluidly connected to the sump jet 4108. During a flush event, fluid (e.g., water) is directed by the fluidic switching device 4106 to the oscillating rim jet system 4104 through a first fluid conduit 4117 that fluidly connects the first outlet port 4114 to each of the fluidic oscillators 4118. Flow continues through the oscillating rim jet system 4104 until sufficient backpressure is established in a first capacitor 4120. At this point, flow is redirected by the fluidic switching device through a second fluid conduit 4122 that fluidly connects the second outlet port 4116 to the sump jet 4108. Flow through the sump jet 4108 facilitates removal of any large debris leftover in the sump area toward the end of the flush event. Once sufficient backpressure is established in a second fluid capacitor 4124, the fluidic switching device 4106 returns flow to the oscillating rim jet system 4104 to refill the toilet bowl 4109. It will be appreciated that the timing, component position, and interconnections between components may differ in various exemplary embodiments.

Figure 51:
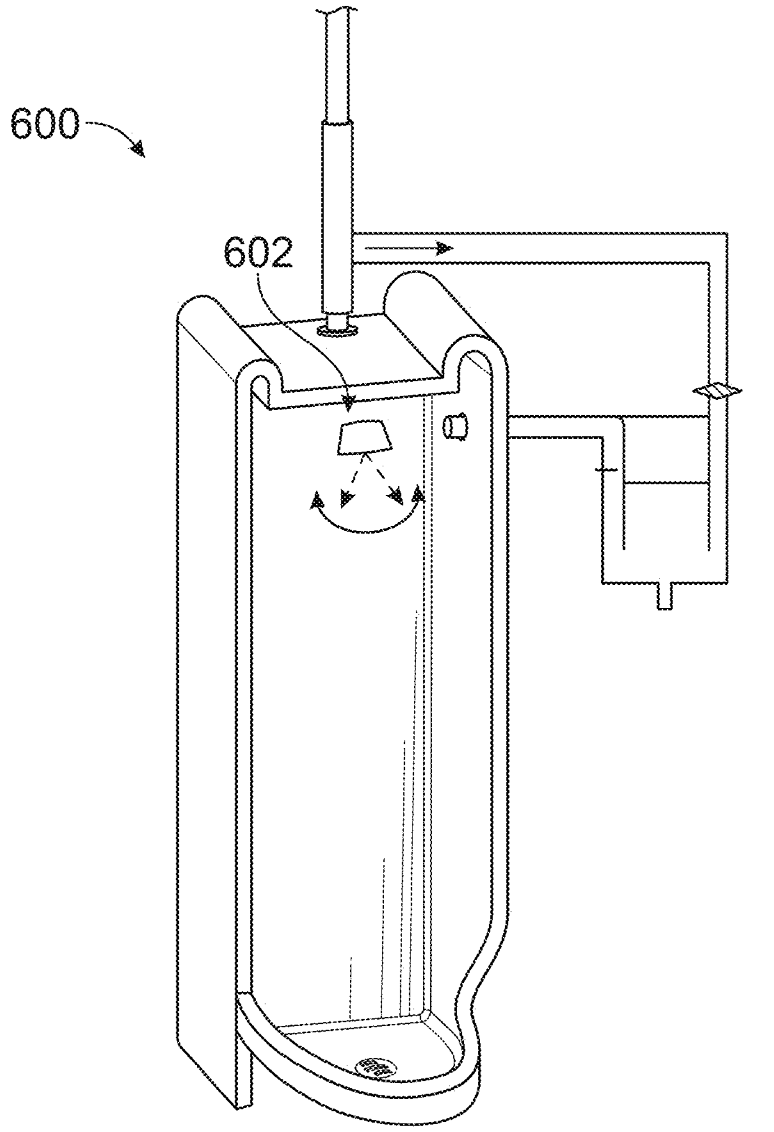
FIG. 51 is a perspective view of a urinal including a fluidic oscillator, according to an exemplary embodiment.

FIG. 51 shows a urinal 600 including a fluidic oscillator 602 configured to clean an inner surface of the urinal 600, according to an exemplary embodiment. The fluidic oscillator 602 may be the same or similar to the fan oscillator 502 of FIG. 46 or the fluidic oscillator 3900 of FIGS. 47-48. In other embodiments, the geometry of the fluidic oscillator may be different. As shown in FIG. 51, the fluidic oscillator 602 is coupled to an upper wall of the urinal 600 and is configured to distribute water along the upper surfaces of the upper wall. The urinal 600 may be a tankless urinal (e.g., line pressure, without an accumulator, etc.) that is directly connected to a water supply conduit at line pressure. In other embodiments, the urinal 600 may include a flush tank (e.g., accumulator, etc.) that is configured to provide a predefined quantity of water to the urinal 600 during a flush. According to the exemplary embodiment of FIG. 51, the fluidic oscillator 602 is be configured to provide water to the urinal 600 during a flush cycle in a sweeping motion. In other embodiments, the motion of the fluidic oscillator 602 may help to reduce splash while urinating. In yet other embodiments, the fluidic oscillator 602 may be configured to provide chemistry (e.g., chemical cleaning agents) to the surfaces of the urinal 600. The chemistry may reduce scale, stains, bacteria, or smells from within the urinal 600.

Figure 52:
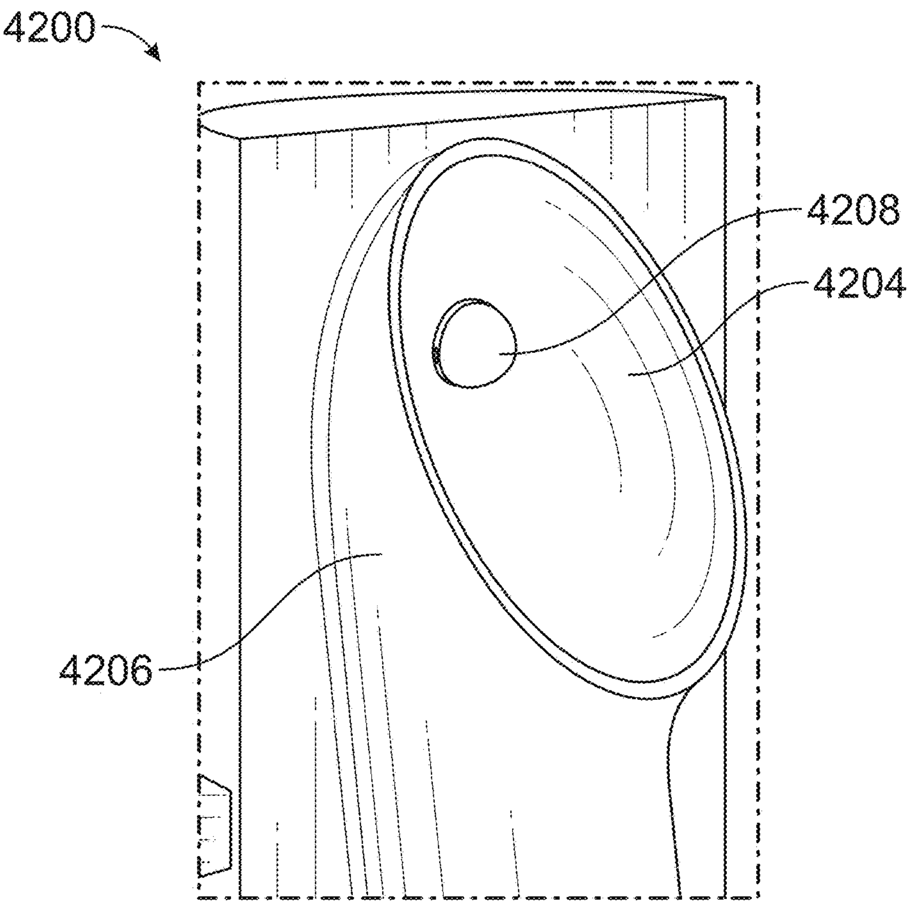
FIG. 52 is a perspective view of a urinal including a fluidic oscillator, according to another exemplary embodiment.
Figure 53:
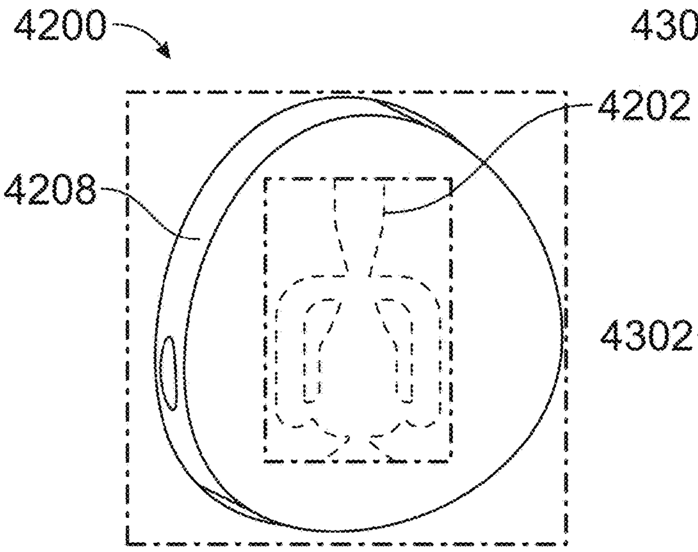
FIG. 53 is a perspective view of a fluidic oscillator for the urinal of FIG. 52, according to an exemplary embodiment.
Figure 54:
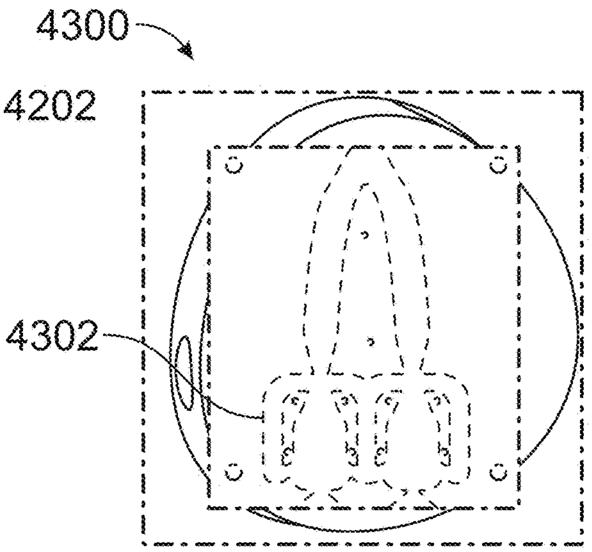
FIG. 54 is a perspective view of a fluidic oscillator for the urinal of FIG. 52, according to another exemplary embodiment.

Referring to FIGS. 52-53, a urinal assembly 4200 is shown that includes a fluidic oscillator 4202 (e.g., fan oscillator 502) disposed at an intermediate position along an inner surface 4204 of a urinal 4206. As shown in FIG. 53, the fluidic oscillator 4202 may be contained within (or integrally formed as) a cylindrically shaped extension piece 4208 that protrudes inwardly from the inner surface 4204. In other embodiments, the shape and position of the extension piece 4208 may be different. In some embodiments, as shown in FIG. 54, the extension piece 4300 may include more than one fluidic oscillator 4302 (e.g., two fluidic oscillators in a parallel arrangement, etc.). Among other benefits, using a plurality of fluidic oscillators 4302 (e.g., a double fluidic oscillator 4302 as shown in FIG. 54 provides wider fluid coverage across the inner surface 4204 of the urinal 600 and an interesting visual effect as compared to a single fluidic oscillator 4302.

Figure 55:
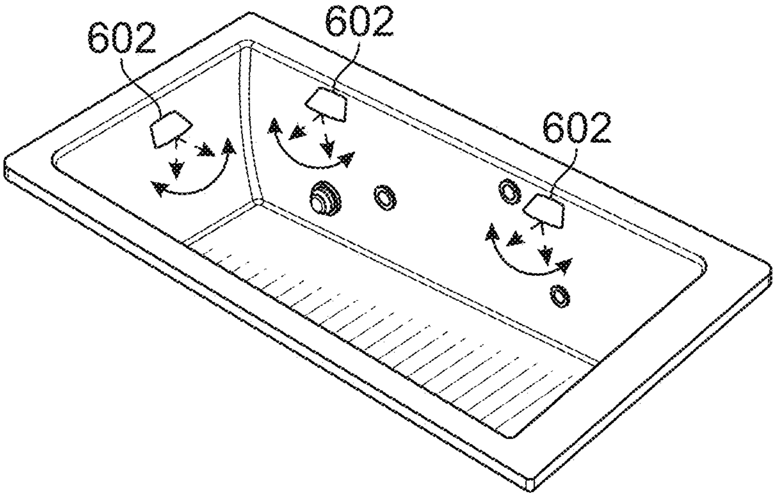
FIG. 55 is a perspective view of a bath including a plurality of fluidic oscillators, according to an exemplary embodiment.
Figure 56:
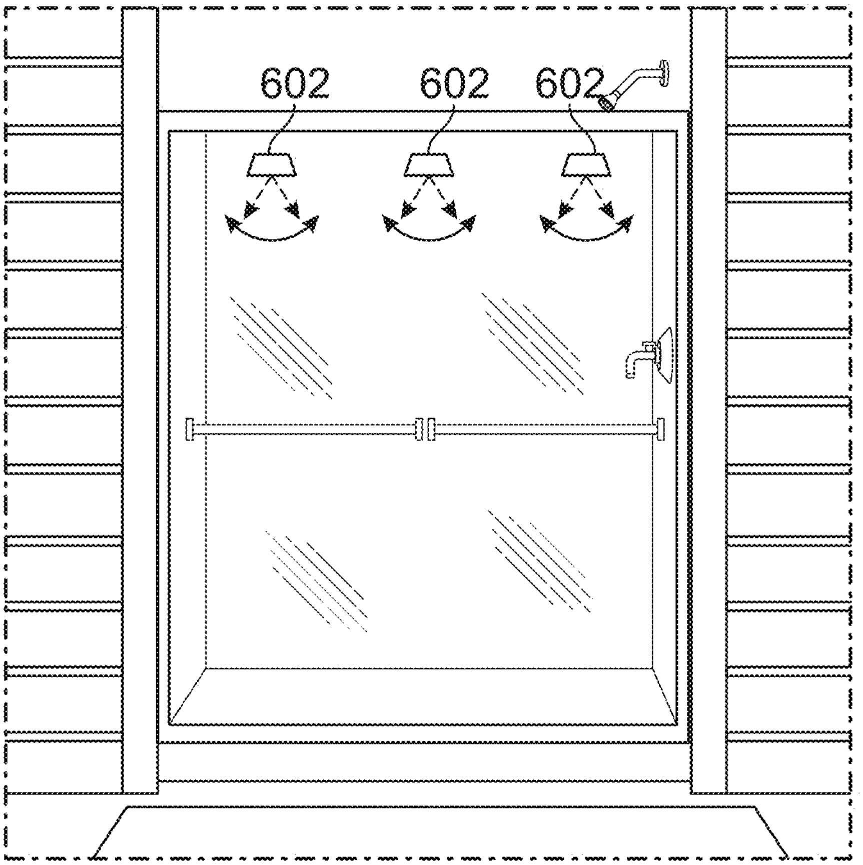
FIG. 56 is a side view of a shower including a plurality of fluidic oscillators, according to an exemplary embodiment.

The fluidic oscillator 502, 602 may be utilized in a variety of different plumbing fixtures; for example, to facilitate cleaning of one or more surfaces of the plumbing fixture during periods of non-use. In the embodiment of FIG. 55, a plurality of fluidic oscillators 602 are coupled to an inner wall of a whirlpool bath. The fluidic oscillators 602 are disposed along an upper ledge of the bath and spaced at regular intervals along a perimeter of the whirlpool bath. In the embodiment of FIG. 56, a plurality of fluidic oscillators 602 are spaced at regular intervals along a tiled shower wall. Due to their small size and low profile, the fluidic oscillators 602 may also be used within small spaces. For example, one or more fluidic oscillators 602 may be placed into overflows or under the rim (e.g., ledge, etc.) of a self-cleaning sink to improve the distribution of flow to different areas of the sink.

Figure 57:
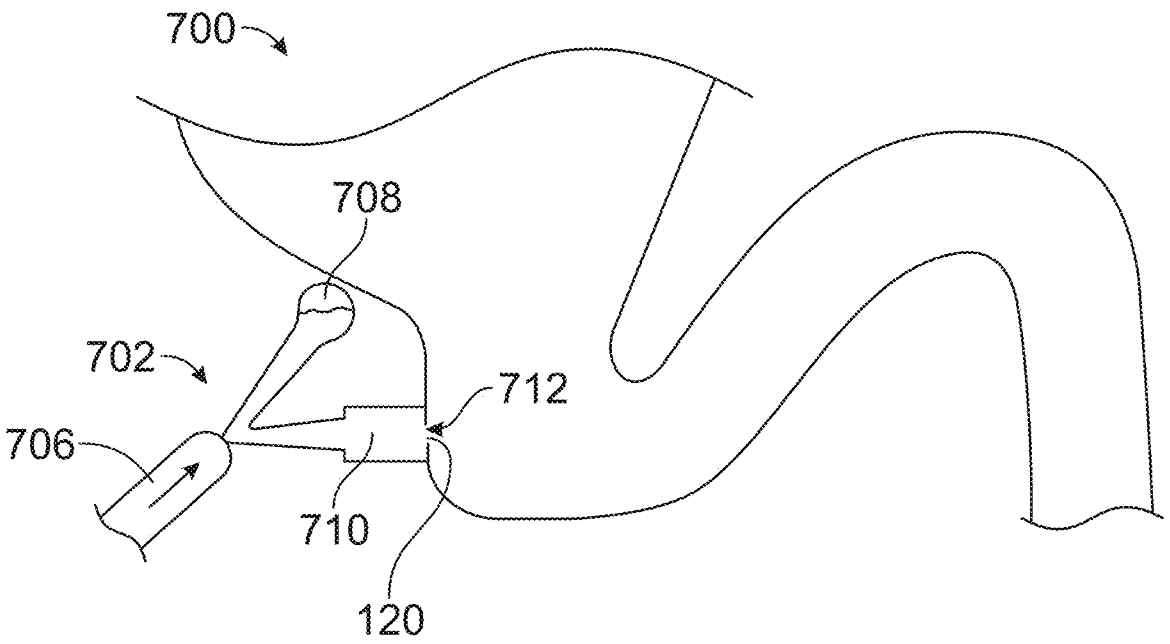
FIG. 57 is a side sectional view of a toilet including a fluidic oscillator, according to an exemplary embodiment.
Figure 58:
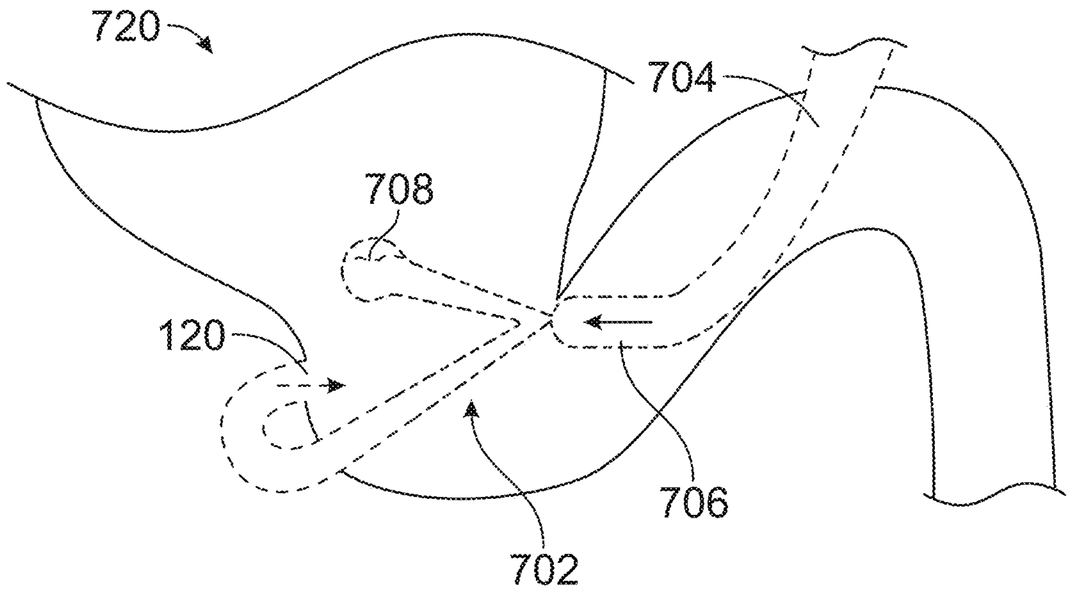
FIG. 58 is a side sectional view of a toilet including a fluidic oscillator, according to another exemplary embodiment.
Figure 59:
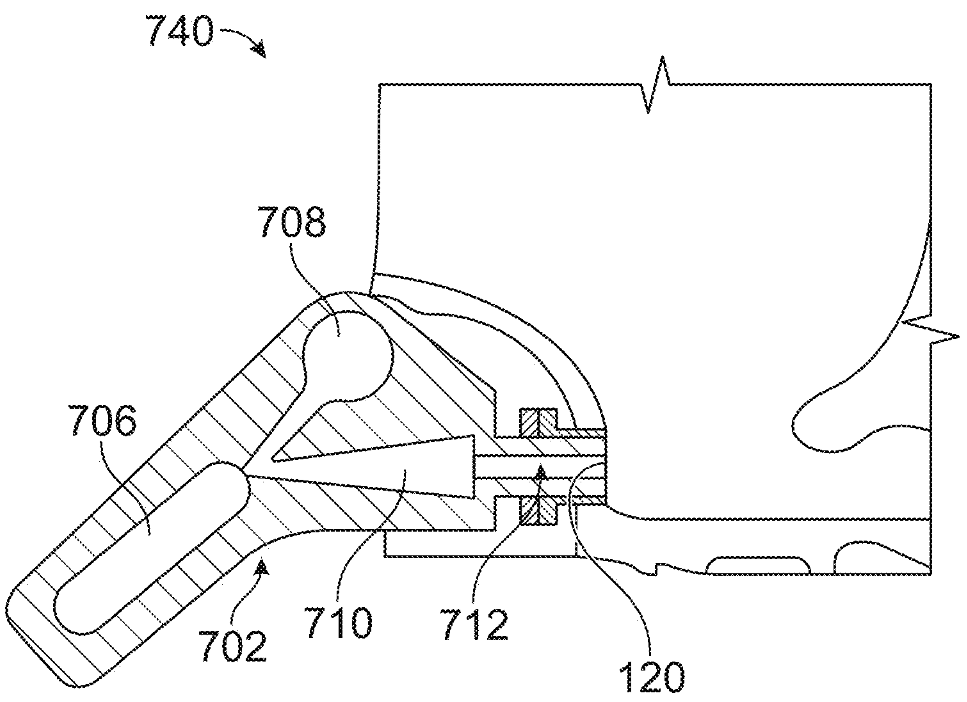
FIG. 59 is a side sectional view of a fluidic oscillator coupled to a sump jet of a toilet, according to an exemplary embodiment.

According to an exemplary embodiment, the fluidic device is configured to generate specialty jets from a pulsating flow of water. FIGS. 57-59 show cross-sectional views of toilets (shown as toilet 700 in FIG. 57, toilet 720 in FIG. 58, and toilet 740 in FIG. 59), each including a fluidic oscillator 702 configured to generate pulsating flow at the sump jet 120 of the toilet. In the embodiments of FIGS. 57 and 59, the sump jet 120 forms part of the fluidic oscillator 702. The fluidic oscillator 702 is coupled to the toilet proximate to a forward wall of the sump 114. In the embodiment of FIG. 58, the fluidic oscillator 702 is disposed within an inlet conduit 704 upstream of the sump jet 120. As shown in FIGS. 57-59, the fluidic oscillator 702 includes an inlet channel 706, a resonant chamber 708, and an outlet chamber 710. The fluidic oscillator 702 includes an outlet opening 712 disposed on an end of the outlet chamber 710 (e.g., a rightmost end of the outlet chamber 710 as shown in FIG. 57). In the embodiments of FIGS. 57 and 59, a cross-sectional area of the outlet opening 712 is less than a cross-sectional area of the outlet chamber 710. According to the exemplary embodiment of FIG. 58, a diameter of the outlet opening 712 is less than an inner diameter of the outlet chamber 710 at the outlet opening 712. The geometry of the outlet chamber 710 shown in FIG. 57 produces a toroidal jet in response to pulsating flow through the outlet chamber 710.

Figure 60:
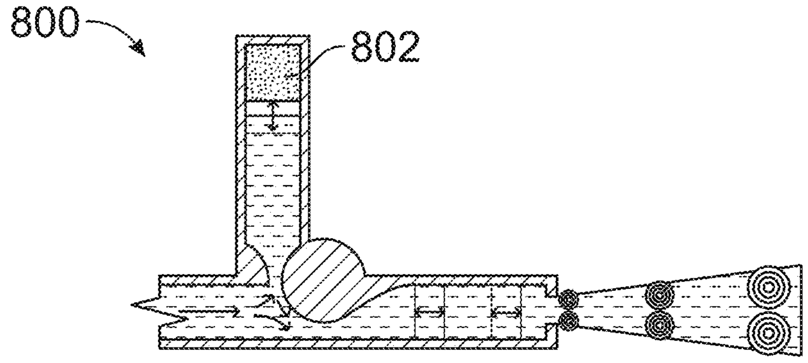
FIG. 60 is a side sectional view of a fluidic oscillator, according to another exemplary embodiment.
Figure 61:
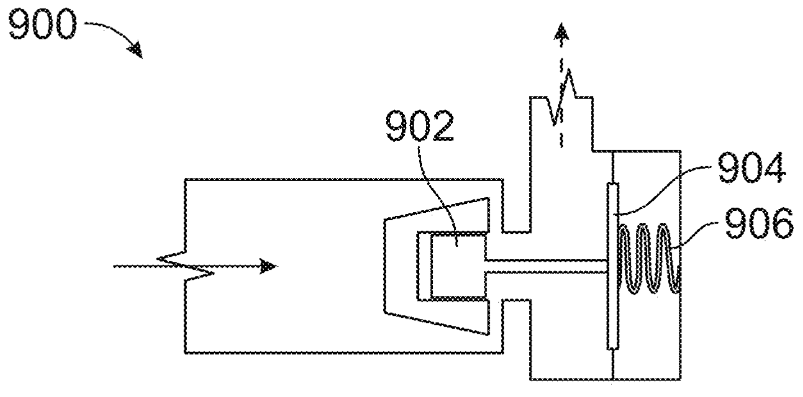
FIG. 61 is a side sectional view of a fluidic oscillator, according to another exemplary embodiment.

Various alternative device geometries may be utilized to generate a pulsating flow of water through the outlet chamber 710. FIG. 60 show a fluidic oscillator 800 whose cyclic pulsating frequency is a function of a diameter of an upper resonant chamber 802, according to another exemplary embodiment. FIG. 61 shows an example of a fluidic oscillator 900 that utilizes a mechanical linkage to control the frequency of pulsating flow. As shown in FIG. 61, the fluidic oscillator 900 includes a piston 902, a diaphragm 904 coupled to the piston 902, and a spring 906 coupled to the diaphragm 904. Water entering through an inlet of the fluidic oscillator 900 flows around the piston, passing into an outlet chamber where the diaphragm 904 is located. The flow pressurizes the outlet chamber, pressing against the diaphragm 904, compressing the spring 906, and moving the piston 902. Once a sufficient chamber pressure has been achieved, the piston 902 prevents any additional flow from entering the outlet chamber from the inlet. As the outlet chamber depressurizes (e.g., due to flow leaving the outlet chamber), the spring 906 moves the diaphragm 904, which acts to return the piston 902 to its initial position so that the process may repeat.

Figure 62:
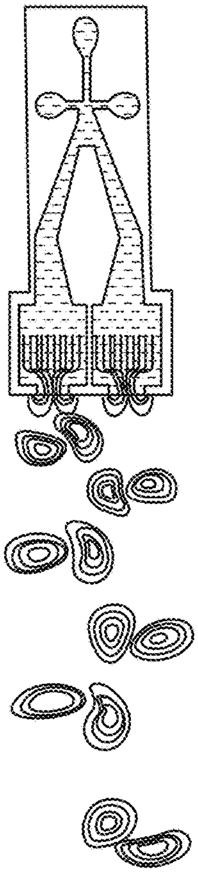
FIGS. 62-67 are side sectional views of different types of fluidic oscillators in operation, according to various exemplary embodiments.
Figure 63:
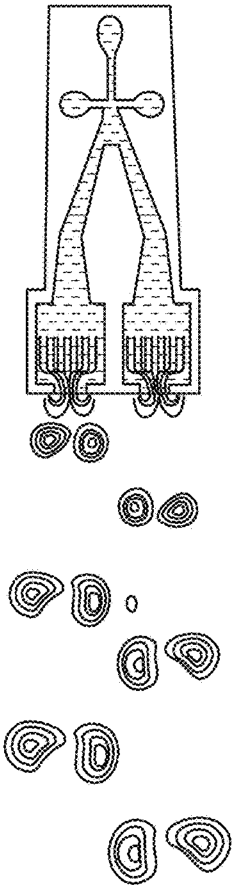
Figure 64:
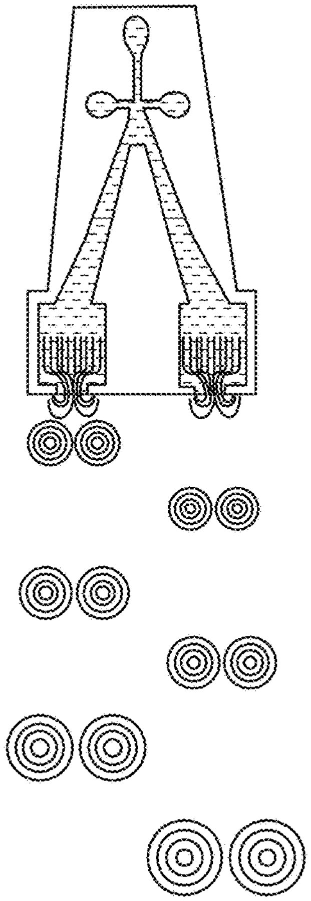

FIGS. 62-64 show examples of specialty jets (shown as jets 1000 in FIG. 62, jets 1003 in FIG. 63, and jets 1005 in FIG. 64) that may be formed using a single fluidic oscillator configured to generate pulsating flow. The jets created by at each outlet of the fluid oscillator interact with one another to form different flow structures. As shown in FIG. 62-64, the position of the outlets of the fluidic oscillators may be adjusted to generate new types of specialty jets.

Figure 65:
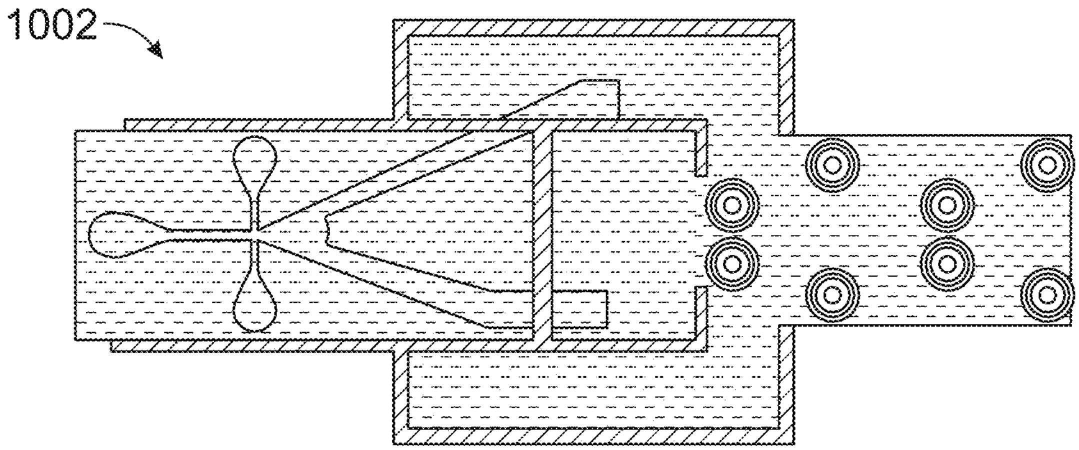
Figure 66:
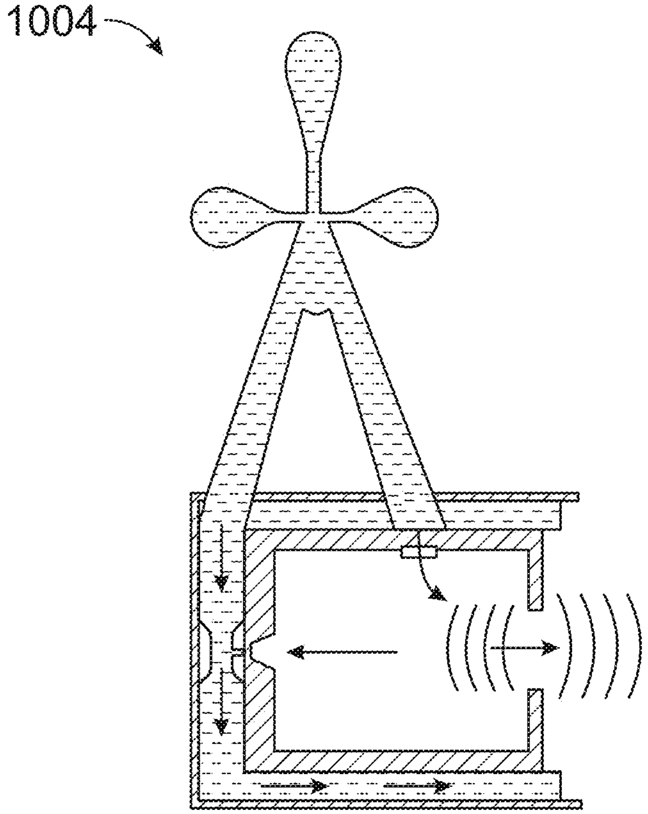
Figure 67:
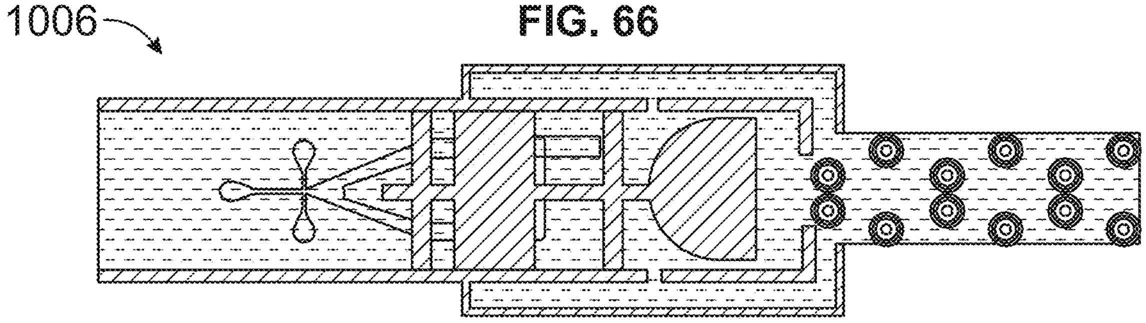

FIGS. 65-67 show standalone fluidic oscillators (shown as fluidic oscillator 1002 in FIG. 65, fluidic oscillator 1004 in FIG. 66, and fluidic oscillator 1006 in FIG. 67) configured to produce different types of specialty jets (e.g., toroidal jets of alternating size, etc.), according to various exemplary embodiments. As shown in FIGS. 65-67, the fluidic oscillators are the same or similar to the fluidic oscillator 402 described with reference to FIG. 10. The size and structure of the jets is manipulated by modifying the dimensions of an inner and outer outlet chamber (e.g., concentric outlet chambers, etc.), where each chamber is coupled to a different outlet channel of the fluidic oscillator.

The size of the toroidal jets and/or other flow structures generated by the fluidic oscillators (e.g., the fluidic oscillators of any of FIGS. 62-67, etc.) may be adjusted by changing the dimensions of the outlet chamber (e.g., outlet chamber 710 of FIGS. 57-59). Among other benefits, specialty jets generate greater momentum (e.g., thrust) than continuously flowing jets for the same mass flux of water than a continuously flowing stream of water. The specialty jets generated by the pulsing flow also improve bulk material removal to improve the cleaning capabilities of the plumbing product. As a result of the reduction in water consumption, specialty jets may be generated that reduce the overall noise level of the plumbing fixture (e.g., the sump jet, the rim jet, etc.) which, advantageously, improves the user experience. Moreover, specialty jets penetrate further into the fluid before dissipating as compared to continuously flowing jets.

Figure 68:
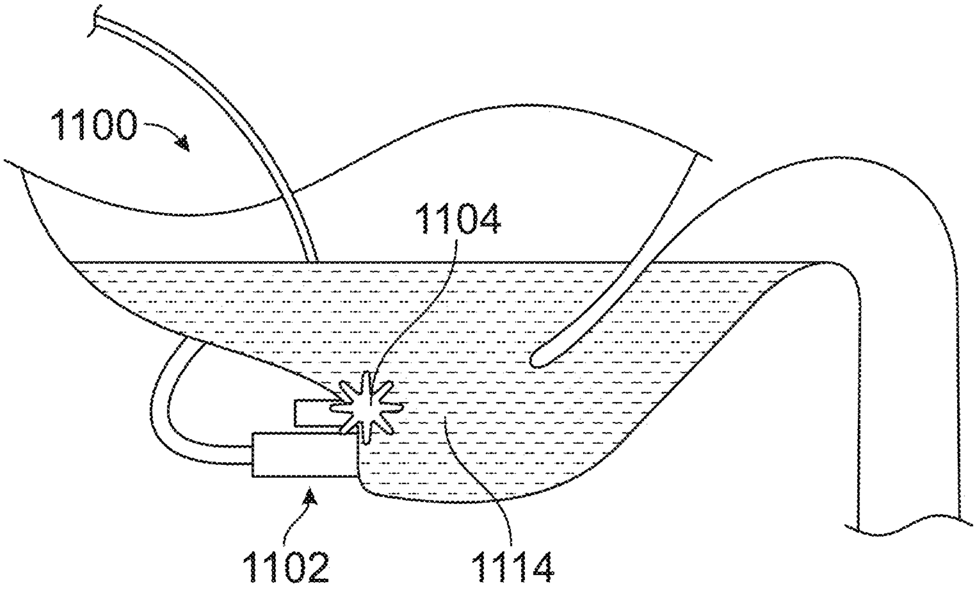
FIG. 68 is a side sectional view of a toilet including a fluidic diverter, according to an exemplary embodiment.
Figure 69:
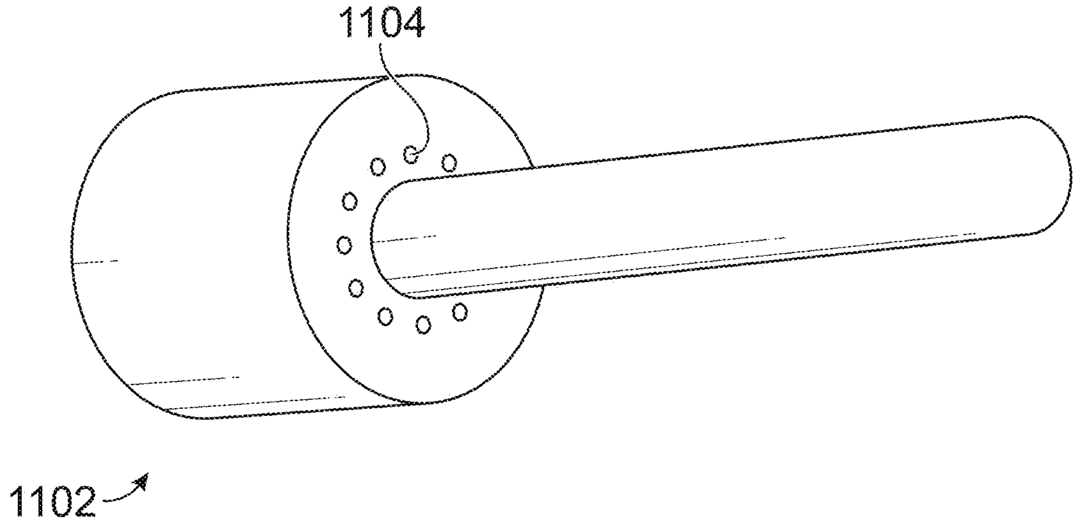
FIGS. 69-70 are perspective views of the fluid diverter of FIG. 68 in various states of operation, according to various exemplary embodiments.
Figure 70:
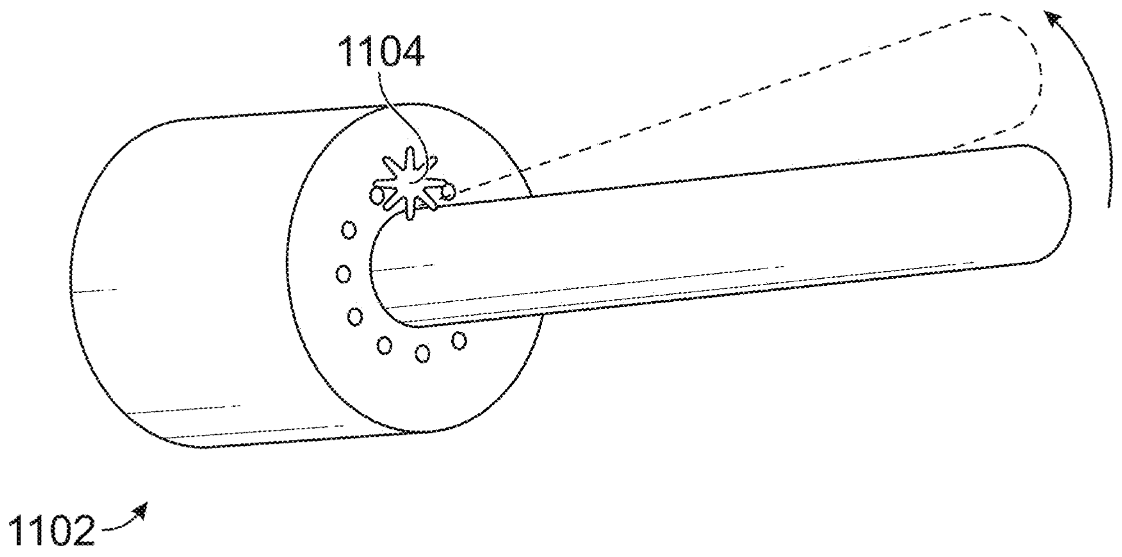

Referring now to FIG. 68, toilet 1100 including a fluidic device 1102 configured to control a direction of the flow leaving the jet face is shown, according to an exemplary embodiment. The fluidic device 1102 includes a plurality of synthetic jets 1104 arranged circumferentially around the jet face such that they at least partially surround a central jet. The synthetic jets 1104 include small nozzles (e.g., flow openings, etc.) that, when activated, redirect the flow of water from the central jet. FIG. 69 shows the fluidic device 1102 just before activating a synthetic jet. FIG. 70 shows the fluidic device 1102 after activating a synthetic jet disposed vertically above the central jet. As shown in FIG. 70, the synthetic jet redirects the flow of water from the central jet toward the synthetic jet (e.g., vertically upward as shown in FIG. 70).

As shown in FIG. 68, the fluidic device 1102 is disposed in the sump 114 of the toilet, below a water line of the sump 114. The fluidic device 1102 is configured to direct flow toward the water line of the toilet in order to break the surface tension and reduce splashing associated with an impinging water jet. Among other benefits, this configuration may also reduce noise generated by a user when peeing onto the surface of the water. In some embodiments, the fluidic device 1102 is used as part of a bidet seat wand to provide dynamic and/or directional flow control. In other embodiments, the fluidic device 1102 is used as a fluidic oscillator to direct water to different parts of the toilet bowl 106 during a cleaning operation. According to an exemplary embodiment, the fluidic device 1102 includes a fluidic oscillator that generates a pulsating flow stream through the central jet to further enhance cleaning performance and reduce water consumption.

Although the fluid control circuits and fluidics devices above were illustrated in the context of a line pressure toilet (e.g., toilet 100 of FIGS. 1-2), it will be appreciated that the devices and methods could also be applied to gravity-fed siphonic toilets including a flush tank or hybrid toilets in which a first jet of a plurality of jets is fed directly from a water supply line, and a second jet of the plurality of jets is fed by water from the flush tank. The devices and methods apply equally to residential and commercial urinals.

Shower Head

Figure 71:
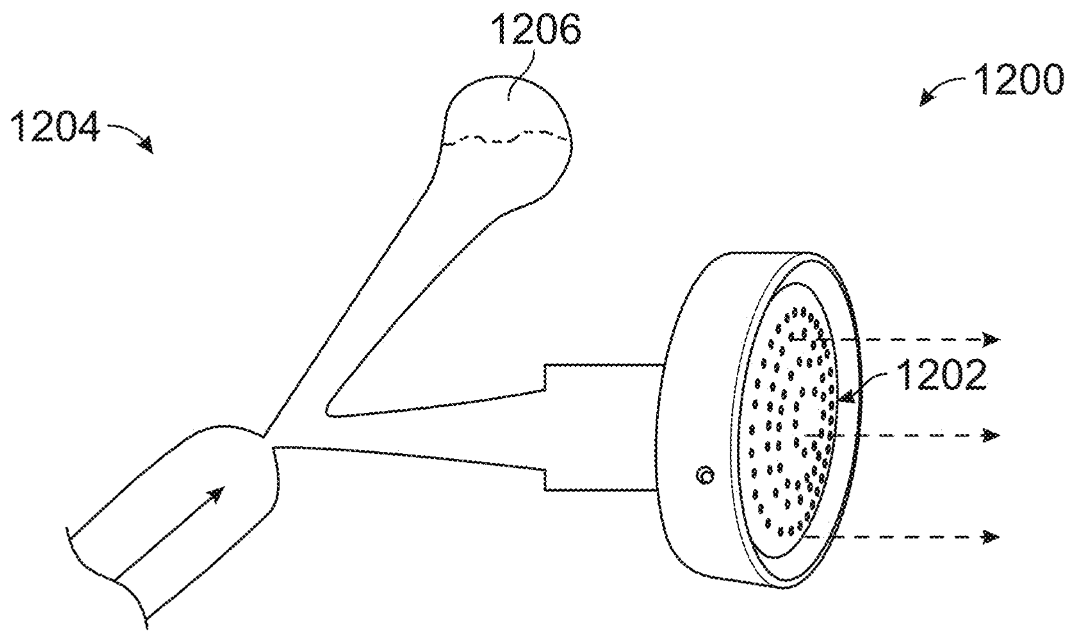
FIG. 71 is a side sectional view of a fluidic oscillator for a shower head, according to an exemplary embodiment.

According to an exemplary embodiment, the plumbing fixture includes a shower head. FIG. 71 shows a single shower head 1200 including a plurality of jets 1202, according to an exemplary embodiment. As shown in FIG. 71, the shower head 1200 includes a fluidic device including a fluidic oscillator 1204 fluidly coupled to the plurality of jets 1202. The fluidic oscillator 1204 may the same or similar to the fluidic oscillator 702 described with reference to FIGS. 57-59 (e.g., a fluidic oscillator configured to generating a pulsating flow of water). In other embodiments, the fluidic oscillator 1204 may be different. According to an exemplary embodiment, the fluidic oscillator 1204 is coupled to a water supply line upstream of the shower head 1200 (e.g., embedded in a wall behind the shower head 1200 to improve the aesthetic of the shower). In other embodiments, the fluidic oscillator 1204 is coupled directly to the shower head 1200. In some embodiments, the shower head 1200 is configured to activate and deactivate the fluidic oscillator 1204, for example, by diverting the flow of water into or out of the fluidic oscillator 1204 (e.g., through a straight section of tubing arranged in parallel with the fluidic oscillator 1204, etc.).

As shown in FIG. 71, the fluidic oscillator 1204 is configured to provide a pulsating flow of water to each one of the plurality of jets 1202 simultaneously. Among other benefits, the fluidic oscillator 1204 reduces the required flow rate to the shower head 1200 as compared to jets providing a continuous stream of water. The pulsating flow may provide an invigorating feeling to a user or, at high frequencies, simulate a continuous stream to improve the overall user experience. As with other fluidic devices described herein, the fluidic oscillator 1204 includes no moving parts, which improves reliability of the shower head 1200.

As shown in FIG. 71, the fluidic oscillator 1204 includes a resonant chamber 1206. A frequency of the pulsating flow through the plurality of jets 1202 varies with the volume of the resonant chamber 1206. In some embodiments, the shower head 1200 includes a lever, toggle, or another actuator configured to adjust the volume of the resonant chamber 1206. For example, the shower head 1200 may include a lever on a side of the shower head 1200 coupled to a wall of the resonant chamber 1206 or a switch configured to fluidly couple the resonant chamber 1206 to tubes of different lengths. A user may adjust a position of the lever or depress the switch to adjust the frequency of water pulses in order to improve user comfort or cleaning performance.

Figure 72:
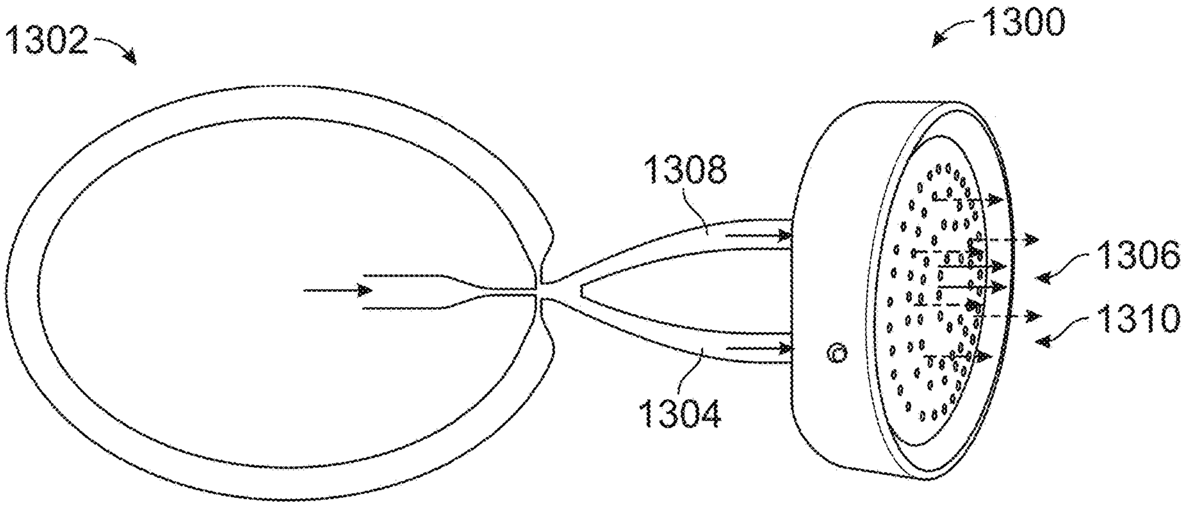
FIG. 72 is a side sectional view of a fluidic oscillator for a shower head, according to another exemplary embodiment.

Referring now to FIG. 72, a shower head 1300 configured to generate alternating inward and outward flow is shown, according to an exemplary embodiment. The shower head 1300 includes a fluidic oscillator 1302 configured to switch the flow periodically between two outlet channels of the fluidic oscillator 1302. As shown in FIG. 72, a first outlet channel 1304 of the fluidic oscillator 1302 is fluidly coupled to a first plurality of jets 1306 of the shower head 1300. A second outlet channel 1308 is coupled to a second plurality of jets 1310. According to an exemplary embodiment, the second plurality of jets 1310 circumferentially surrounds the first plurality of jets 1306. In other embodiments, the arrangement of jets 1306, 1310 may be different.

Figure 73:
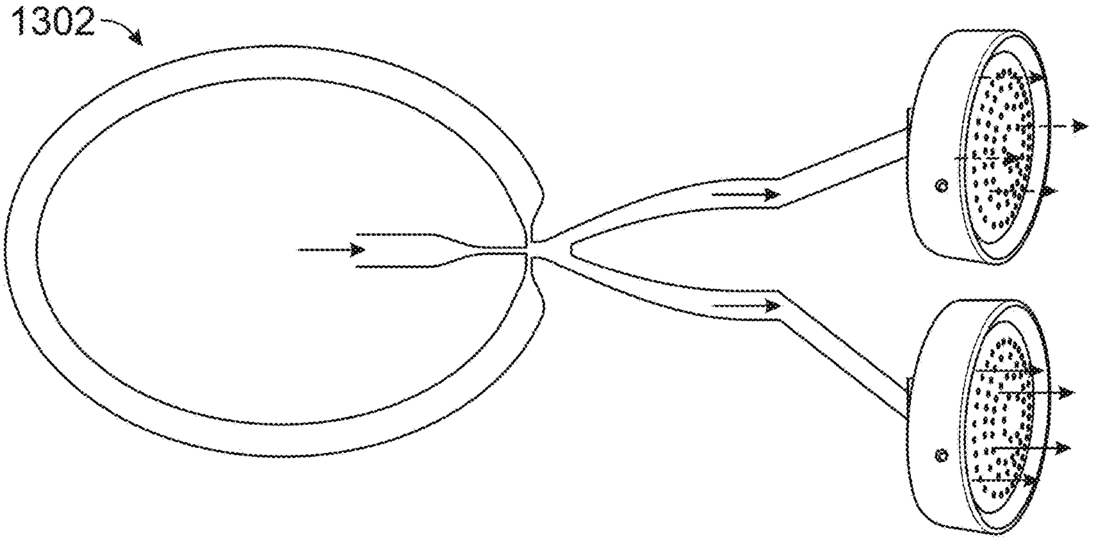
FIG. 73 is a side sectional view of a fluidic oscillator for multiple shower heads, according to an exemplary embodiment.
Figure 74:
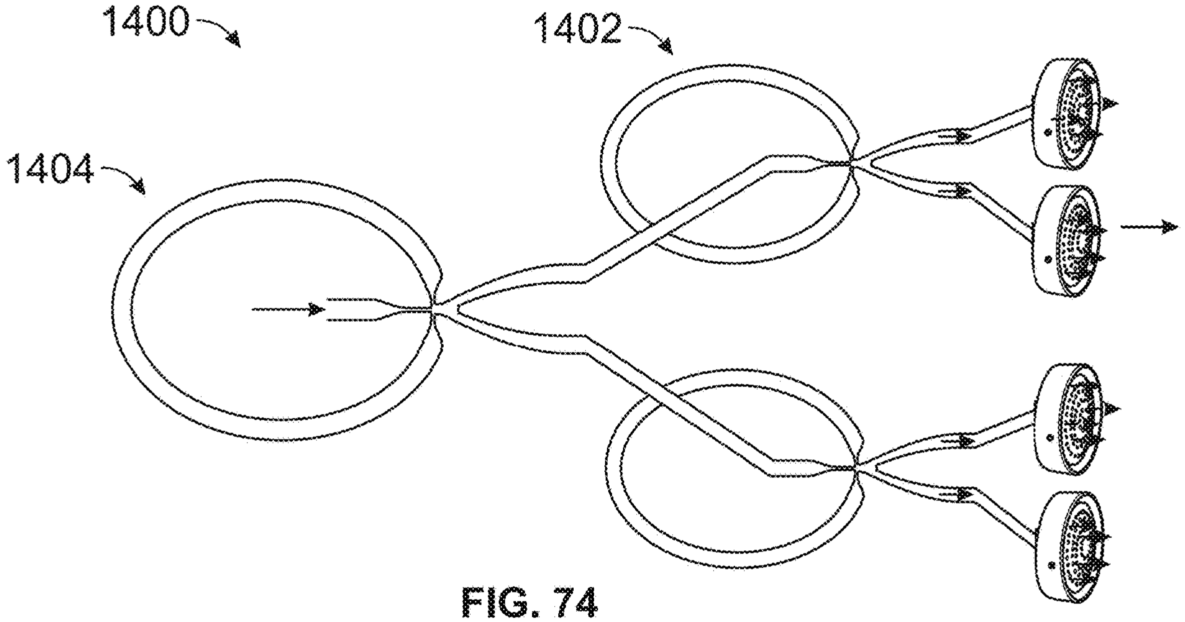
FIG. 74 is a side sectional view of a plurality of interconnected fluidic oscillators for multiple shower heads, according to an exemplary embodiment.

Application of the fluidics device may be extended to shower systems including multiple shower heads as shown in FIGS. 73-74. As shown in FIGS. 73-74, flow through each outlet channel of the fluidic oscillator 1302 may be directed a different shower head. As shown in FIG. 74, the shower system 1400 includes multiple fluidic oscillators 1402 arranged in a series with an upper stage fluidic oscillator 1404. The arrangement of a plurality of fluidic oscillators 1402 may be adjusted to provide different spray effects and/or to improve the overall bathing experience. In some embodiments, the fluidic oscillators 1404 and/or other fluidics devices may be formed as interchangeable plastic fluidic valve bodies (e.g., modular inserts, etc.), which provide modularity to the shower system. For example, the plastic fluidic valve bodies may be swapped out or rearranged within a fluid control circuit to produce different spray configurations at the water jets.

Figure 75:
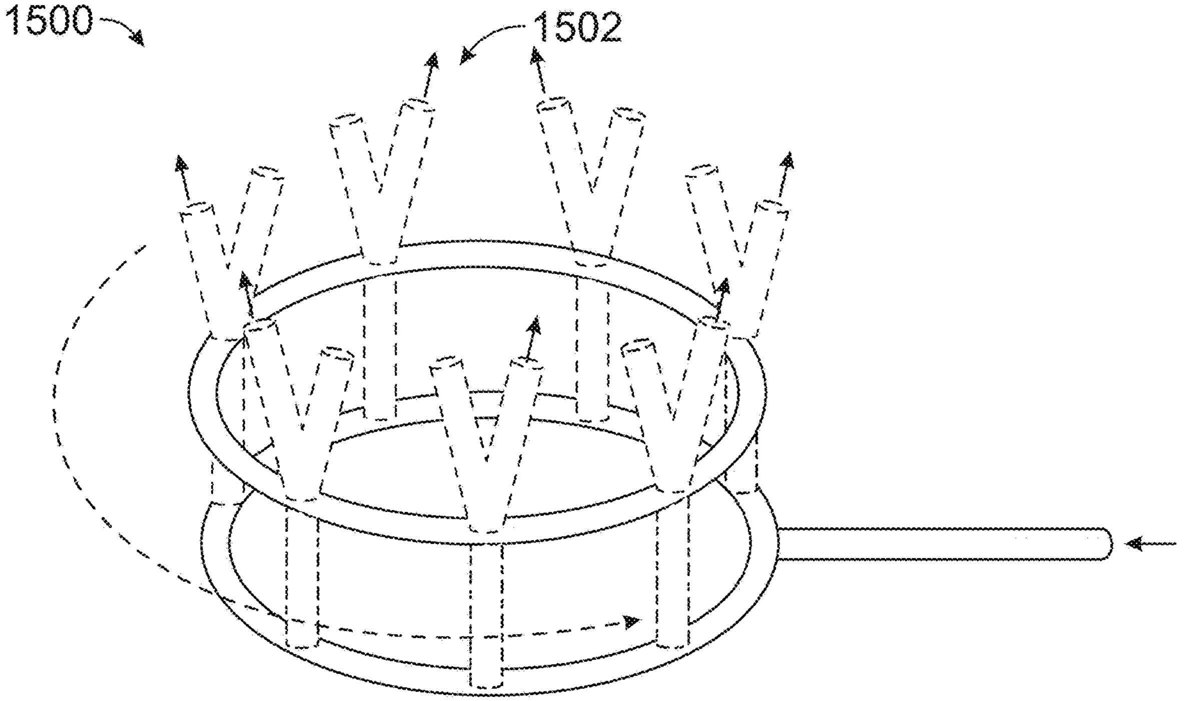
FIG. 75 is a perspective view of a shower head including circumferentially directional jets, according to an exemplary embodiment.

Referring now to FIG. 75, another implementation of a shower head 1500 including a circular multi-head oscillator is shown, according to an exemplary embodiment. The circular multi-head oscillator includes a plurality of fluidic oscillators 1502 arranged in a circular chain. The circular multi-head oscillator sets up various flow patterns at each outlet to provide a unique showering experience. As shown in FIG. 75, the fluidic oscillators 1502 are arranged in a parallel with one another downstream of a water supply line. The fluidic oscillators 1502 are configured to switch the direction of flow through the jets circumferentially during normal operation. The interaction between the fluidic oscillators 1502 creates a rotational effect. The effect or pattern generated by the circular multi-head oscillator may be different with different numbers of fluidic oscillators 1502.

Figure 76:
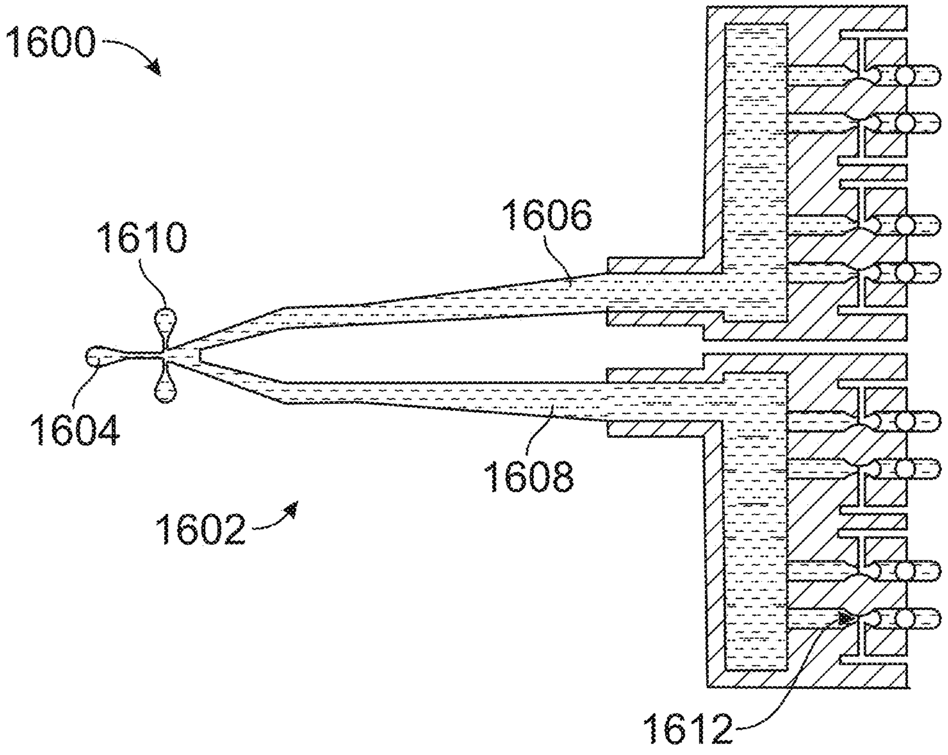
FIG. 76 is a side sectional view of a shower head configured to generate microbubbles, according to an exemplary embodiment.

A plurality of fluidics devices may be coupled together to generate desirable flow patterns for a user of the shower head. Referring now to FIG. 76, a shower head 1600 utilizing multiple fluidic devices is shown, according to an exemplary embodiment. The shower head 1600 includes a fluidic oscillator 1602 including an input channel 1604, a first outlet channel 1606, a second outlet channel 1608, and a resonant chamber 1610. The shower head 1600 also includes a plurality of venturis 1612 downstream of the fluidic oscillator 1602. The venturis 1612 are disposed within the shower head 1600 just upstream of a jet face of the shower head 1600. A first end (e.g., upstream end) of each venturi 1612 is fluidly coupled to one of the outlet channels 1606, 1608 of the fluidic oscillator 1602. A second end of each venturi 1612 is fluidly coupled to a corresponding one of a plurality of jets of the shower head 1600.

In operation, the fluidic oscillator 1602 pulsates water through each venturi 1612 of the shower head. The venturis 1612 inject bubbles (e.g., packets of air, etc.) into the flow stream during each pulse. Among other benefits, the venturis 1612 reduce the overall volume of water ejected from the shower head 1600 as compared to a continuous flow stream device. At high frequencies, the shower head 1600 provides the perception of continuous flow to a user, which may minimize user discomfort associated with lower flow rates of water from the shower head 1600. As a result of the reduced flow rate, the acoustical noise produced by the shower head 1600 is reduced. In some embodiments, the frequency of pulses may be adjusted to simulate calming sounds to improve the overall user experience of the shower system. Moreover, different arrangements of venturis 1612 and fluidic oscillators 1602 may be used to generate different spray patterns at the shower head 1600.

Figure 104:
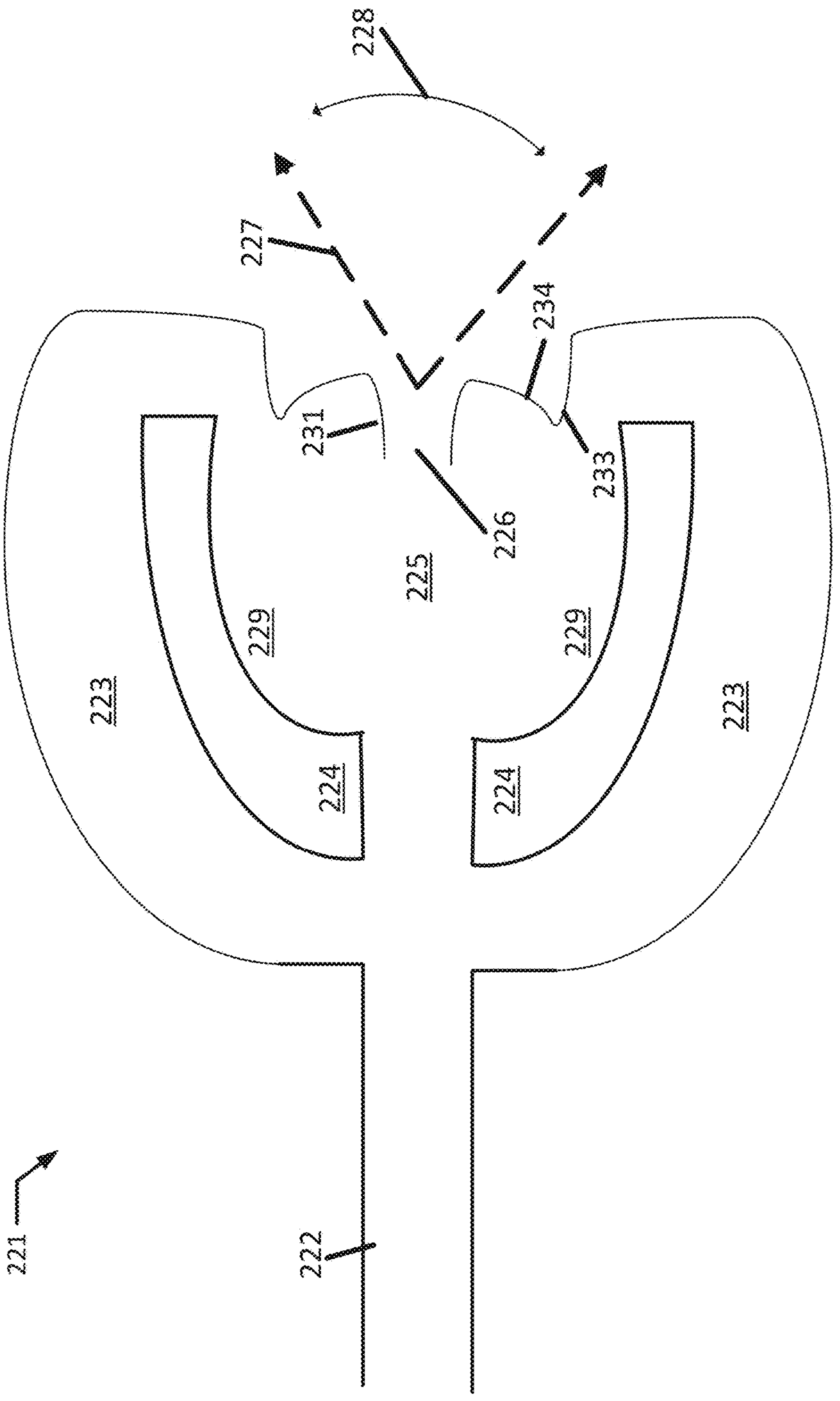
FIG. 104 illustrates an example fluid oscillator for a shower head.

FIG. 104 illustrates an example fluid oscillator 221 for a shower head. Illustrated is an internal cross section of the fluid oscillator 221 at a position between a top and a bottom of the fluid oscillator 221. The fluid oscillator 221 a main flow channel 222, one or more feedback channels 223, an island 224, a mixing chamber 225, an outlet 226 and one or more geometric features at the outlet of the fluid oscillator 221 that cause a fan output water flow 227 to oscillate, fluctuate, or pulsate across a predetermined angle range 228. The repeating pattern of water includes a back and forth pattern in a horizontal or vertical direction. That is the fluidic oscillator 221 may be mounted in a variety of directions to create any desired oscillation path for the output flow of water. Additional, fewer, or different components may be used.

The fluid oscillator 221 includes a main flow channel 222 at least partially in parallel to one or more feedback channels 223. As shown in FIG. 104, each of the feedback channels 223 is substantially parallel in part to the main flow channel 222 and each of the feedback channels 223 provides a path in the opposite direction (upstream) of the main flow channel 222 (downstream).

The fluid oscillator 221 includes at least one island divider 224 configured to separate the mixing chamber 225 from each feedback channel 223. The divider 224 my partially or fully extend from the bottom to the top of the fluidic oscillator 221.

The fluid oscillator 221 includes a mixing chamber 225 in communication with the main flow channel 222 and each of the feedback channels 223. The main flow channel 222 includes a pressurized fluid to create a spatially oscillating (fan sweep back and forth) jet. No power source is required. However, the input fluid (e.g., water supply) is provided under pressure. The diameter of the pipe may be selected to increase or decrease the input fluid to a desired pressure. The curved walls of the mixing chamber 225 provide a path for the flow of fluid to exhibit the coanda effect in which the flow attaches itself to the walls of the mixing chamber 225 and changes direction because it remains attached as the curved walls of the mixing chamber 225 curve away from the initial direction from the main flow channel 222. In addition or in the alternative, the mixing chamber 225 provides one or more pockets 229 for a separation flow to form that is triggered from the output from the respective feedback channel 223. The separation flow pushes the main flow away from the walls of the mixing chamber 225 to cause the oscillation to be realized in the output of the fluid oscillator 221.

The fluid oscillator 221 includes one or more geometric features at the outlet of the fluid oscillator 221 that cause a fan output water flow 227 to oscillate across a predetermined angle range 228. The fluidic oscillator 221 is self-sustaining and self-inducing by virtue of the shape of the main flow channel 222, the feedback channels 223, the island 224, and/or the mixing chamber 225. In addition, one or more features of the outlet of the fluidic oscillator 221 applies a limiting condition on the fan output water flow 227 to oscillate across the predetermined angle range 228.

In one example, the limiting condition is provided by a geometry including a narrow neck 231 extended into the mixing chamber 225. The neck 231 limits the predetermined angle range 228 by blocking some of the flow of water that unimpeded would have escaped the mixing chamber 225 to the outlet of the fluidic oscillator 221. The narrow neck 231 may also set a particular oscillation frequency due to reflection of the fluid back into the fluidic oscillator 221.

In one example, the limiting condition is provided by a geometry including a convex portion 233 that adjusts a path of the output of the feedback path 223. The convex portion 233 may direct the feedback flow of fluid into the pocket 229 at a smaller angle thus increasing the separation flow and, accordingly, the frequency of the output of the fluidic oscillator 221.

In one example, the limiting condition is provided by a geometry including a concave portion 234 configured to reverse the flow outside of the neck 231 internally into the mixing chamber 225. Fluid that otherwise would have flowed to the outlet of the fluidic oscillator 221 flows into the concave portion 234 then back into the rotational flow of the mixing chamber 225 as an additional feedback input to the mixing chamber 225. Thus, the concave portion 234 may be referred to as an auxiliary feedback for the fluidic oscillator 221.

In addition or in the alternative, a resonant chamber may be included in the fluidic oscillator 221. For example, the resonate chamber of any embodiments herein may be included in fluidic oscillator to further set a frequency of the flow pulses output from the shower head. The shower head may include an actuator to modify the volume of the resonant chamber and thereby modify the frequency of the flow pulses depending on user preferences or other settings.

Figure 105:
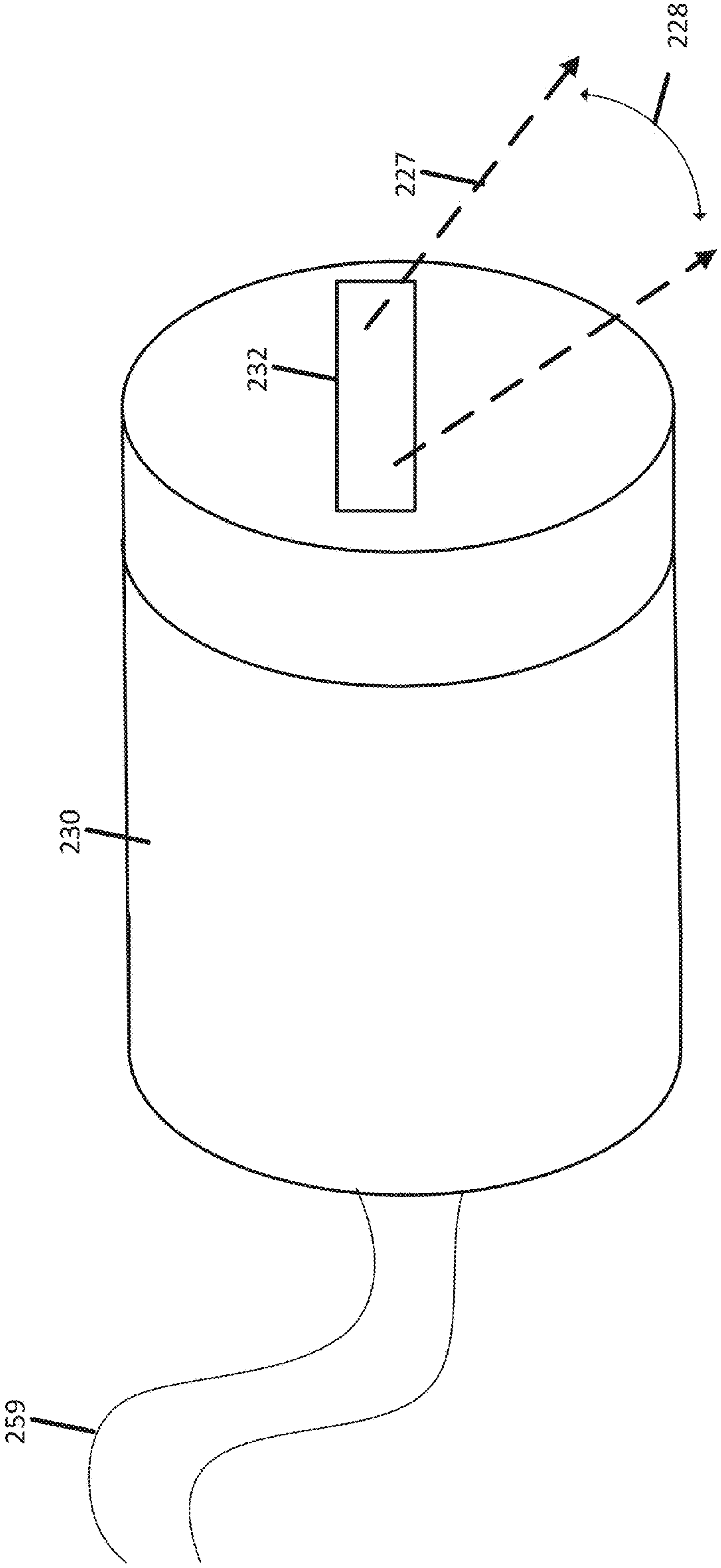
FIG. 105 illustrates an example shower head for the fluid oscillator of FIG. 104.

FIG. 105 illustrates an example shower head 230 for the fluid oscillator 221 of FIG. 104. The shower head 230 connects to a water supply (e.g., water tank, utility, water heater). The shower head 230 may connect to a mixing valve that combines two or more sources (e.g., cold supply, hot supply). The shower head 230 may include a water input pipe 259 configured to supply a flow of water. The shower head 230 may include at least one water outlet configured to provide the flow water including the repeating pattern of water. Additional, different, or fewer components may be included.

The water outlet of the shower head 230 may include an aperture 232 that cooperates with the fluid oscillator 221 to provide the fan output water flow 227 to oscillate, fluctuate, or pulsate across a predetermined angle range 228. As shown, the aperture 232 is rectangular having a larger dimension substantially parallel to the direction of oscillation. However, circular, oval, square or other shapes may be used. The aperture 232 may be coupled with or align with the predetermined geometry of the fluid oscillator 221. That is, the neck 231, the convex portion 233, and/or the concave portion 234 may be coupled to the aperture 232 and/or overlapping with the aperture 232 in the direction of the flow of water.

Figure 106:
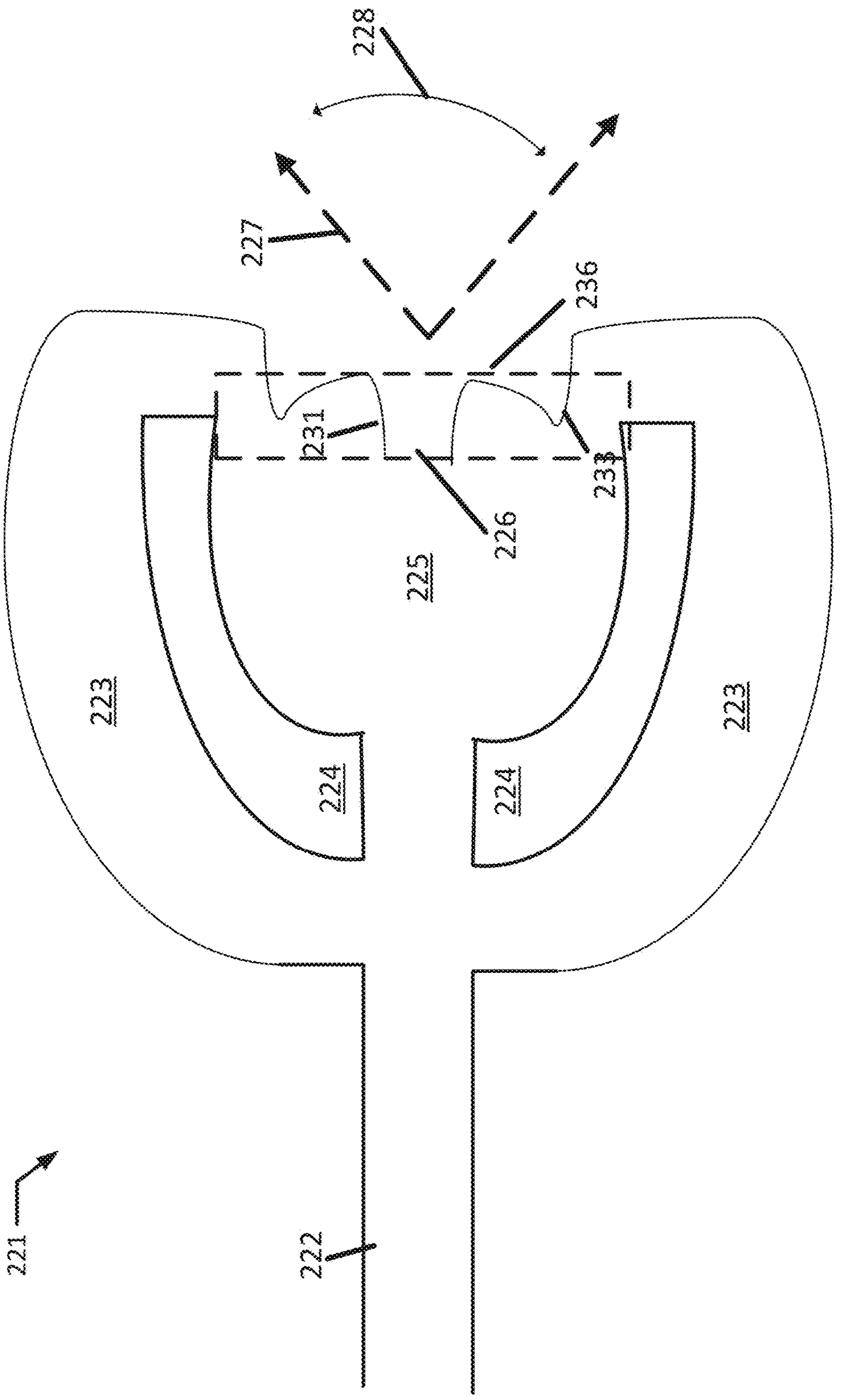
FIG. 106 illustrates ana example fluid oscillator including a regulation ledge for a shower head.

FIG. 106 illustrates an example fluid oscillator 221 including a regulation ledge 236 (shown in dotted lines for ease of illustration). In this example, the predetermined geometry to control the flow of water ejected from the fluidic oscillator 221 to include a repeating fan of water at a predetermined angle range includes the regulation ledge 236. The regulation ledge 236 receives the entire output, or a substantial portion thereof, of water from the fluid oscillator 221. The water flows off of the regulation ledge 236 in the oscillating pattern in a direction that is between the angle of output of the fluid oscillator 221 and the direction of gravity.

Figure 107:
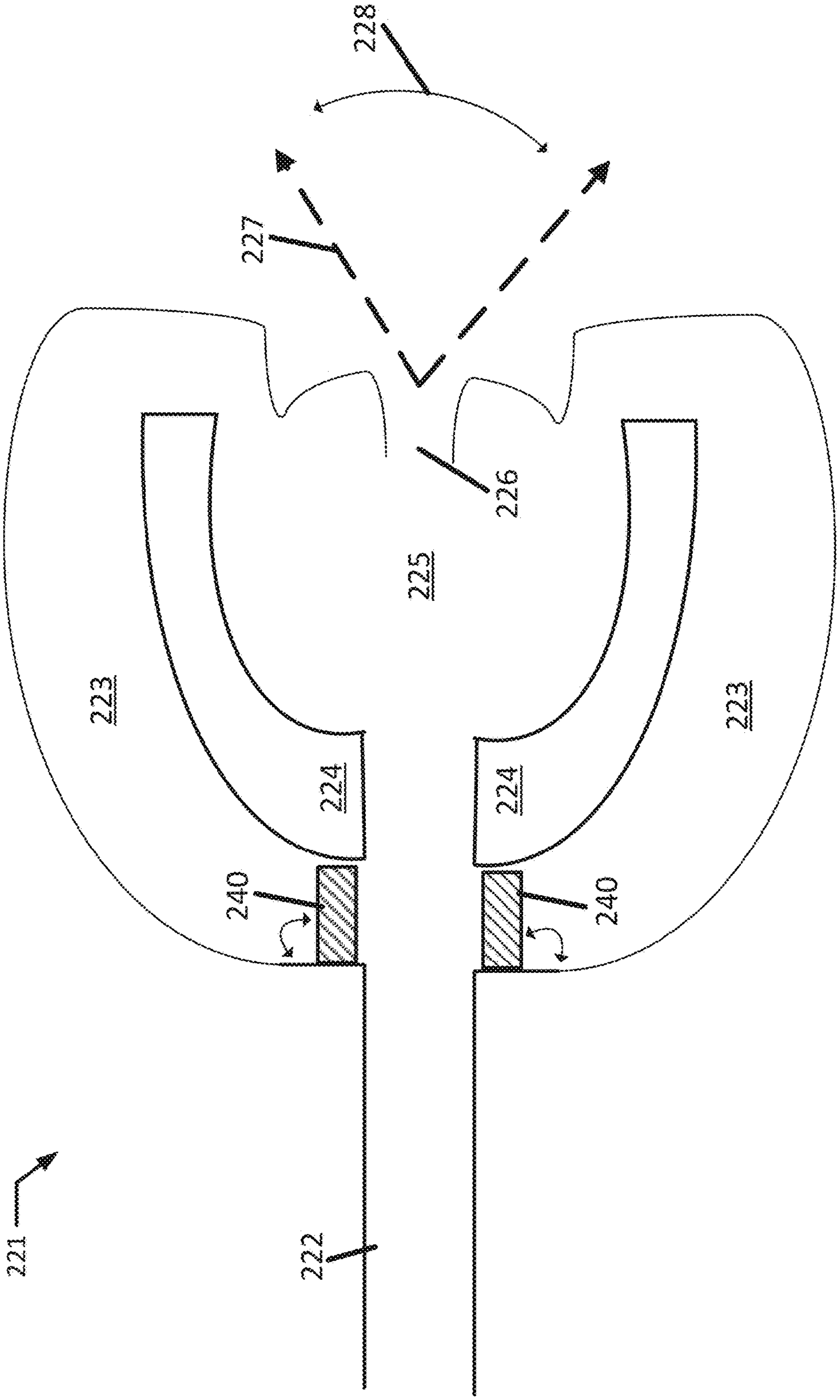
FIG. 107 illustrates an example fluid oscillator for a shower head including at least one valve.

FIG. 107 illustrates an example fluid oscillator for a shower head including at least one valve 240. The valve 240 is configured to open and close at least one of the plurality of feedback paths 223. Additional, different, or fewer components may be included.

When the valve 240 is opened, the feedback paths 223 provide the rotation of fluid in the mixing chamber 225 that causes the output of the fluidic oscillator 221 to oscillate. When the valve 240 is closed, the feedback paths 223 do not cause such an oscillation. Thus, the oscillation of the fluidic oscillator 221 may stop. In other words, with the valve 240 closed, all of the water of the main flow 222 may direction flow to the output of the fluidic oscillator 221 and the shower head 230 does not oscillator.

The valve 240 may be used to turn on and off the oscillation of the shower head 230. The valve 240 may be controlled in a variety of techniques.

The valve 240 may be manual. For example, the shower head 230 may include a button, lever or switch coupled to the valve 240. The user may depress or otherwise move the button, lever, or switch to rotate the valve 240 between the open position and the closed position. The shower head 230 may operate in a normal mode, with the valve 240 closed. To switch the shower head 230 to an oscillation mode, the user may open to valve which activates the fluid oscillator 221.

The valve 240 may be electronic. For example, rather than directly actuate the valve 240, the valve may be connected to a drive mechanism. The drive mechanism may include a solenoid, a motor, or another electronically controlled device to apply a force to the valve 240. The user input (e.g., button, lever, or switch) may be electrically connected to the drive mechanism. The user may depress the user input to activate the electronically controlled device to open or close the valve 240. In some examples, the user input may include a normal setting or position and an oscillation setting or position.

The valve 240 may be controlled by a controller (e.g., controller 401 described herein). The controller 401 may issues a command for the electronically controlled device to open or close the valve 240. The command may describe a valve position, a solenoid position, or a motor position.

Figure 108:
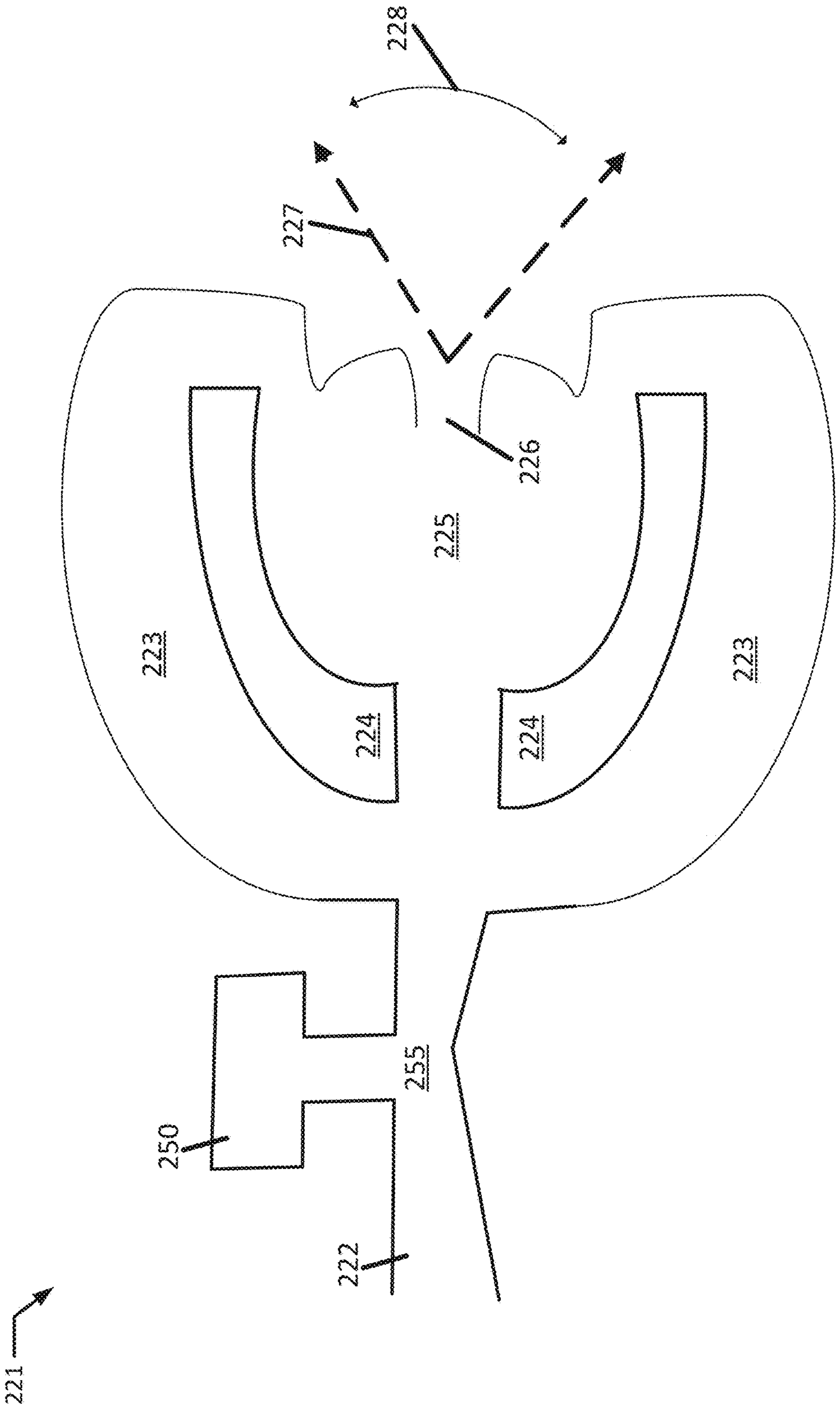
FIG. 108 illustrates an example fluid oscillator for a shower head coupled to an agent container.

FIG. 108 illustrates an example fluid oscillator for a shower head coupled to a container 250. The container 250 may include a solution, an agent, or an additive to be added to the water before (upstream) of the fluidic oscillator 221. The container 250 may include shampoo, conditioner, soap, cleaning solution, or a sanitizing agent (e.g., hydrogen peroxide). The term substance may be defined to include any of these materials. In one example, in addition or alternative to the container 250 located upstream of the fluidic oscillator 221, the container 250 may be located at one or both feedback channels 223.

The container 250 may dispense any of these substances using passive forces. Example passive forces may be derived from gravity, a venturi, or other techniques.

FIG. 108 illustrates a venturi 255 including a narrowing in the main flow path 222. The venturi 255 causes an increase in the velocity of flow of the fluid through the main flow path 222. The increased velocity creates a suction or lower pressure to draw the substance from the container 250 to the main flow path 222.

In another example, the container 250 may include a metering orifice that allows the substance to drip into the main flow path 222. The size of the orifice may be selected to define the amount of the substance that is provided to the main flow path 222.

In another example, the container 250 may include small tubes that provides the substance to the main flow path 222 through a capillary action. In another example, the container 250 may include a tube with a ball bearing. The flow of water through the main flow path 222 may provide an upward force to the ball bearing, which creates an opening for the substance to be dispensed from the container 250 through the tube having the ball bearing.

Figure 109:
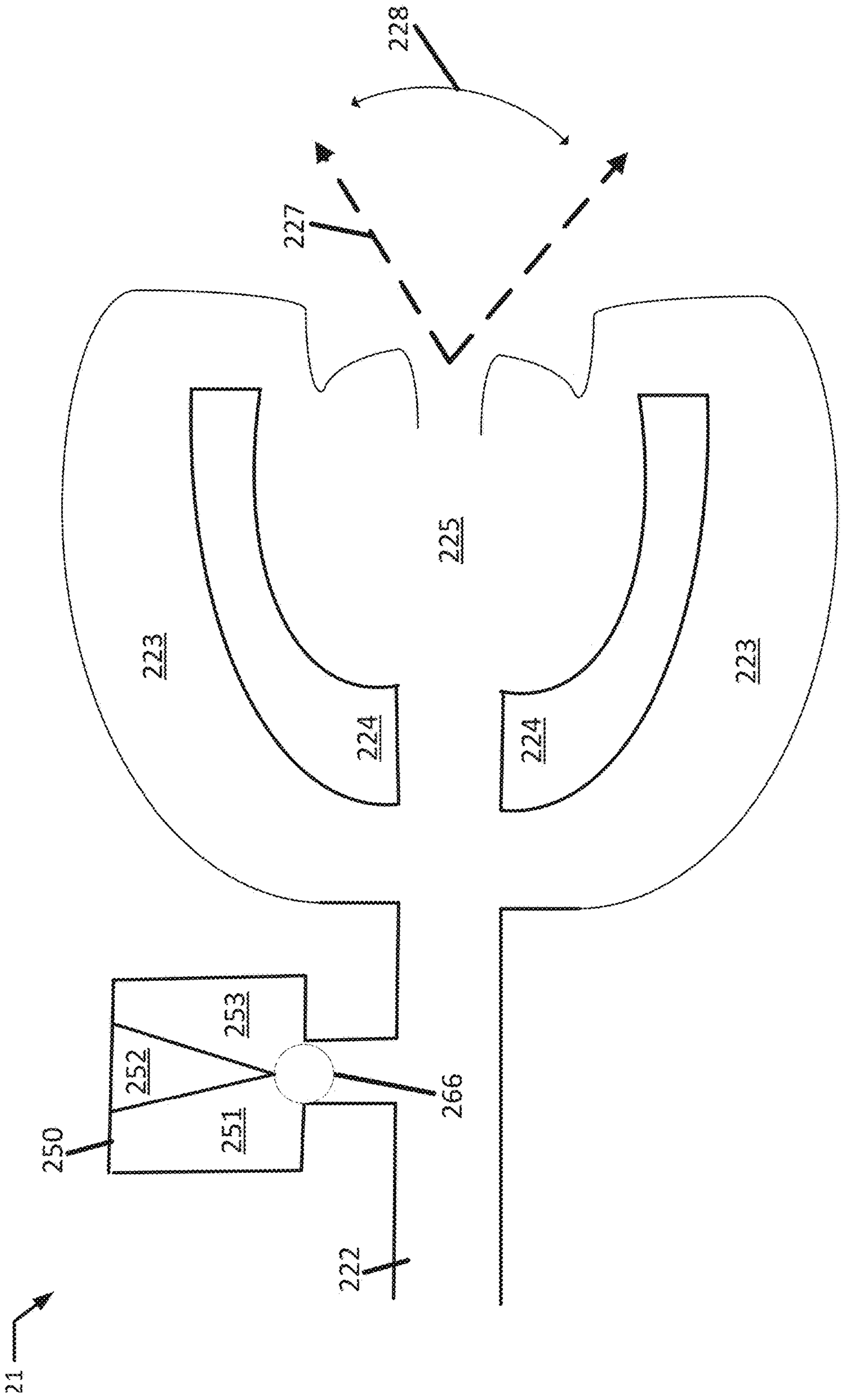
FIG. 109 illustrates an example fluid oscillator for a shower head coupled to multi-agent container.

FIG. 109 illustrates an example fluid oscillator for a shower head coupled to multi-substance container 250 including a first chamber 251, a second chamber 252, and a third chamber 253. Two chambers, four chambers, or another number may be used. A selector 266 is coupled to the container 250. The selector 266 includes valves or selectable paths to dispense a first substance at a first position, a second substance at a second position, and a third substance at a third position. The selector 266 may dispense shampoo at the first position and conditioner at the second position. The shampoo mixes with the water and travels through the fluidic oscillator 221 to be dispensed from the shower head in the oscillating pattern. The selector 266 is moved to the second position. The conditioner mixes with the water and travels through the fluidic oscillator 221 to be dispensed from the shower head in the oscillating pattern.

In some examples, the selector 266 may dispense soap at the third position. The soap mixes with the water and travels through the fluidic oscillator 221 to be dispensed from the shower head in the oscillating pattern. Other substances may be used. The substances may be dispensed in any order.

As one alternative, each of the first chamber 251, the second chamber 252, and/or the third chamber 253 may be located in different containers. For example, the containers may be aligned in a series upstream of the fluidic oscillator 221. In another example, the containers are individual located at different locations such as the first chamber 251 upstream of the fluidic oscillator 221, the second chamber 252 located on one feedback channel 223, and the third chamber 253 located on the other feedback channel 223.

The selector 266 may be controlled by a controller (e.g., controller 401 described herein). The controller 401 may issues a command for the selector 266 to provide a particular substance from a particular chamber of the container 250. The command may describe a valve position, a solenoid position, a motor position, or a rotation position associated with the selector 266.

Figure 110:
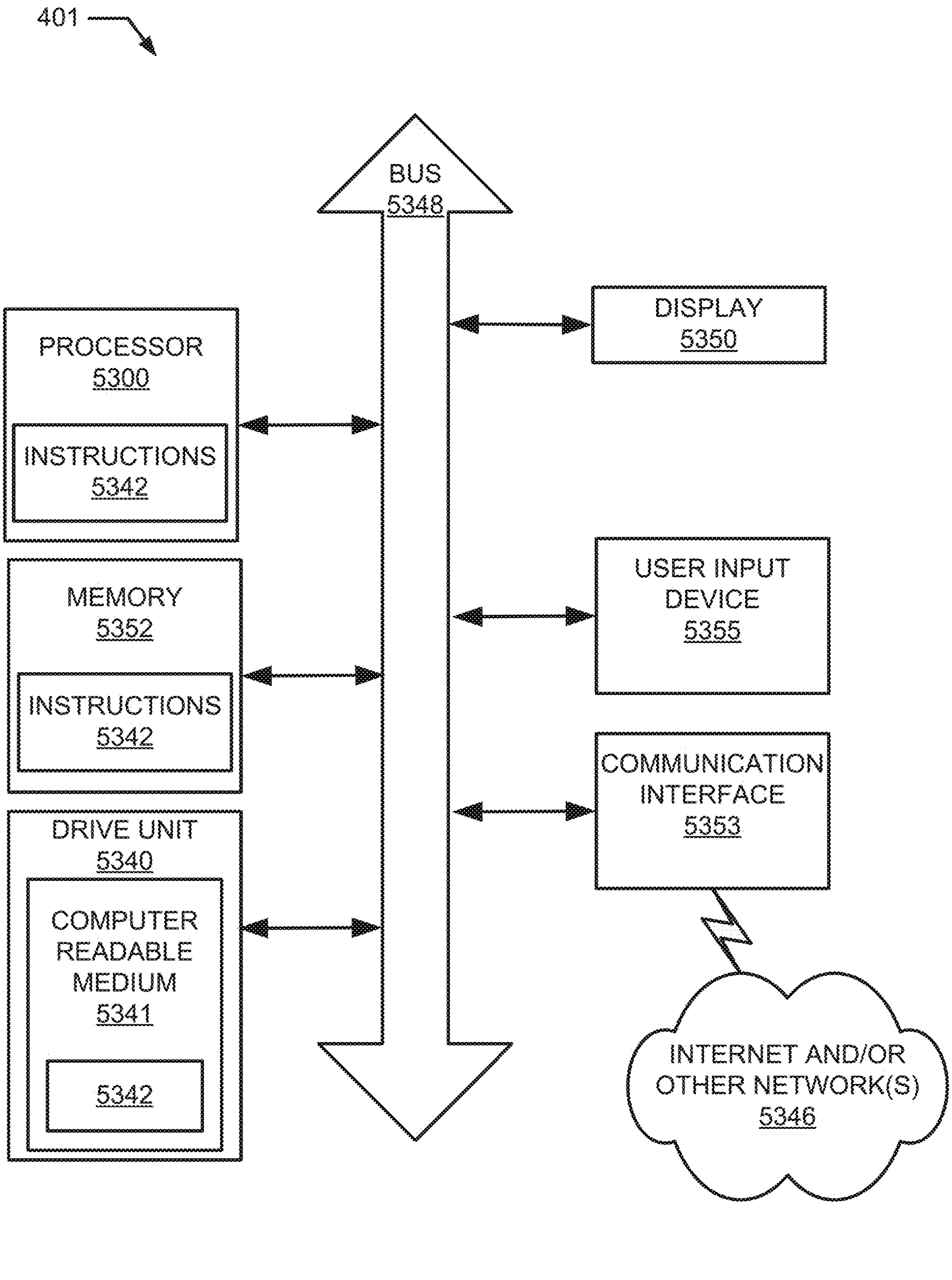
FIG. 110 illustrates an example controller for a fluidic oscillator and/or shower head.

FIG. 110 illustrates an example controller 401 for a fluidic oscillator and/or shower head. The controller 401 is configured to control the fluidic oscillator 221 such as through a feedback channel command for the feedback channel valve 240 to activate and deactivate the fluidic oscillator 221. The controller 401 is configured to control the substance container 250 through a substance selection command to cause selector 266 to release one or more substances from the container 250 or multiple containers.

The controller 401 may include a processor 5300, a memory 5352, and a communication interface 5353 for interfacing with devices or to the internet and/or other networks 5346. In addition to the communication interface 5353, a sensor interface may be configured to receive data for the operation of the fluidic oscillator 221 or shower head. For example, the sensor may be a flow sensor upstream of the fluidic oscillator 221 or placed in the feedback channel 223 to detect when fluid is flowing into the fluidic oscillator 221 or through the fluidic oscillator 221. The controller 401 receives sensor data and identifies that the fluidic oscillator 221 is operational before opening a particular valve. For example, the controller 401 may determine that the fluidic oscillator 221 is operational before causing the substance container 250 through a substance selection command to cause selector 266 to release one or more substances from the container 250 or multiple containers. In another example, the fluidic oscillator 221 is operational before deactivating the fluidic oscillator 221.

The components of the control system 401 may communicate using bus 5348. The control system 401 may be connected to a workstation or another external device (e.g., control panel) and/or a database for receiving user inputs, system characteristics, and any of the values described herein.

Optionally, the control system 401 may include an input device 5355 and/or a sensing circuit in communication with any of the sensors. The sensing circuit receives sensor measurements from as described above. The input device 5355 may include a switch (e.g., actuator), a touchscreen coupled to or integrated with, a keyboard, a remote, a microphone for voice inputs, a camera for gesture inputs, and/or another mechanism.

Optionally, the control system 401 may include a drive unit 5340 for receiving and reading non-transitory computer media 5341 having instructions 5342. Additional, different, or fewer components may be included. The processor 5300 is configured to perform instructions 5342 stored in memory 5352 for executing the algorithms described herein. A display 5350 may be supported by any of the components described herein. The display 5350 may be combined with the user input device 5355.

Figure 111:
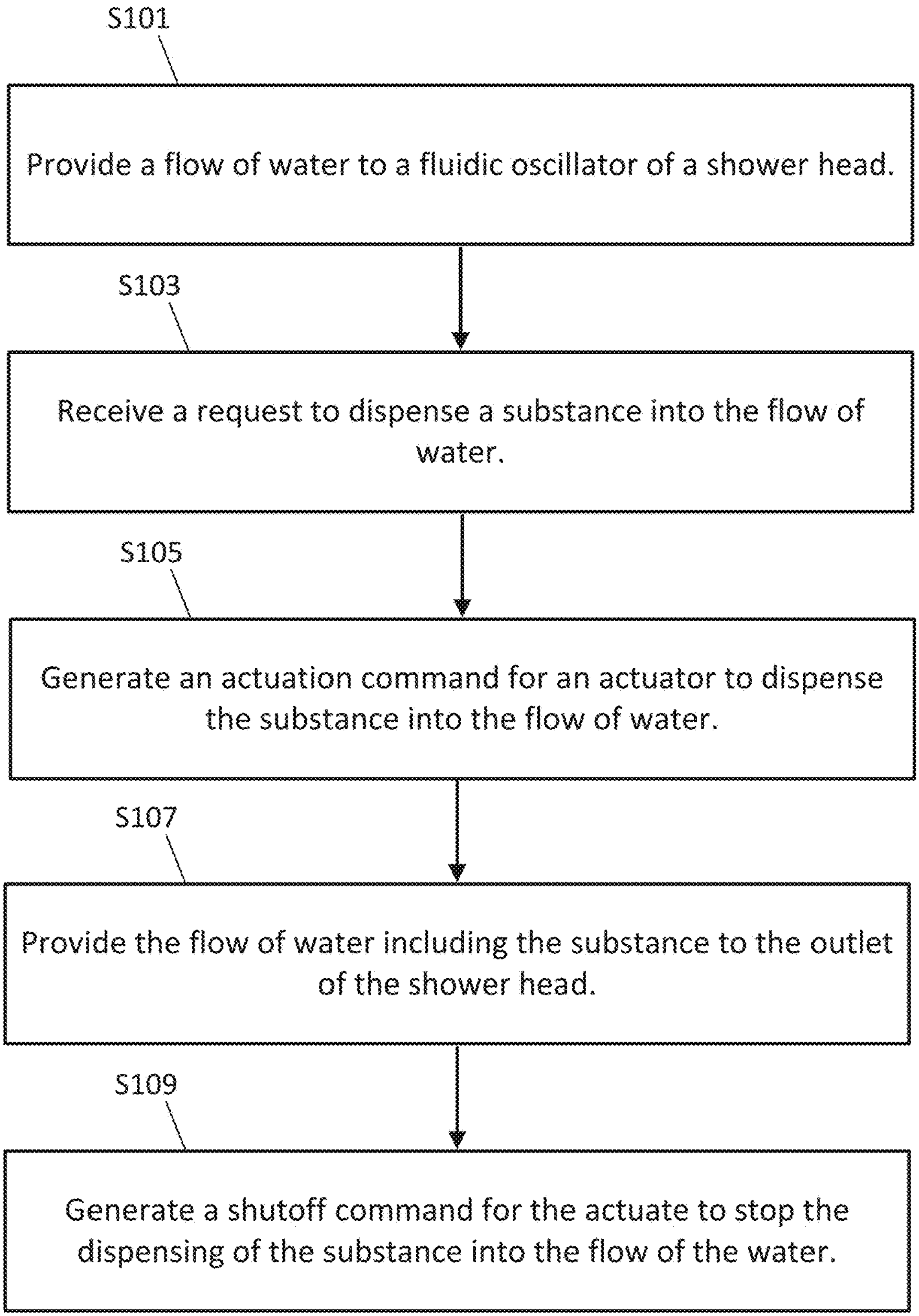
FIG. 111 illustrates an example flow chart for operation of the controller of FIG. 110.

FIG. 111 illustrates an example flow chart for operation of the controller of FIG. 110. Some or all of the acts of the flow chart may be performed by any combination of the controller 401 or an electronically coupled network device or server. Some or all of the acts may be performed by the shower head or corresponding fluidic oscillator. Additional, different or fewer acts may be included.

At act S101, provides a flow of water to a fluidic oscillator of a shower head. The flow of water may be provided by a supply input pipe or main channel of the shower head. The flow of water may be provided by the controller 401 opening a valve upstream of the shower head. The upstream valve may be associated with a mixing device or other master connection for the shower head.

At act S103, the controller 401 may receive a request to dispense a substance into the flow of water. The request may be received from a user input. In some examples, the user input is received at the user input device 5355, which may be physically coupled or electrically coupled to the shower head. In another example, the user input is received from a remove control, a mobile device, or another wireless connected device through the network to the shower head. The request may be provided audibly through a hub that sends the audible command to a server on the network for analysis. The server relays the request to the controller 401. In many of these examples, the request to dispense is based on a wireless signal.

At act S105, the controller 401 generate an actuation command for an actuator to dispense the substance into the flow of water. The actuation command may open a valve for the container including the substance or actuates a solenoid to open the container including the sub stance.

In some examples, the actuation command may be selected from a predetermined sequence to be dispensed into the flow of water. The predetermined sequence may include shampoo then conditioner. More specifically, the predetermined sequence may include (1) water with no added substance, (2) water with shampoo, and (3) water with no added substance. The predetermined sequence may include (1) water with no added substance, (2) water with shampoo, (3) water with no added substance, (4) water with conditioner, and (5) water with no added substance.

At act S107, the flow of water including the added substance is provided to the outlet of the shower head. The outlet of the shower head, in combination with the structure of the fluidic oscillator 221 is configured to provide a sweeping fan of water at a predetermined angle range.

At act S109, the controller 401 may generate a shutoff command for the actuate to stop the dispensing of the substance into the flow of the water. For example, at the end of the predetermined sequence, the upstream valve or mixing device may stop the flow of water into the shower head.

Processor 5300 may be a general purpose or specific purpose processor, an application specific integrated circuit (ASIC), one or more programmable logic controllers (PLCs), one or more field programmable gate arrays (FPGAs), a group of processing components, or other suitable processing components. Processor 5300 is configured to execute computer code or instructions stored in memory 5352 or received from other computer readable media (e.g., embedded flash memory, local hard disk storage, local ROM, network storage, a remote server, etc.). The processor 5300 may be a single device or combinations of devices, such as associated with a network, distributed processing, or cloud computing.

Memory 5352 may include one or more devices (e.g., memory units, memory devices, storage devices, etc.) for storing data and/or computer code for completing and/or facilitating the various processes described in the present disclosure. Memory 5352 may include random access memory (RAM), read-only memory (ROM), hard drive storage, temporary storage, non-volatile memory, flash memory, optical memory, or any other suitable memory for storing software objects and/or computer instructions. Memory 5352 may include database components, object code components, script components, or any other type of information structure for supporting the various activities and information structures described in the present disclosure. Memory 5352 may be communicably connected to processor 5300 via a processing circuit and may include computer code for executing (e.g., by processor 5300) one or more processes described herein. For example, memory 5352 may include graphics, web pages, HTML files, XML files, script code, shower configuration files, or other resources for use in generating graphical user interfaces for display and/or for use in interpreting user interface inputs to make command, control, or communication decisions.

In addition to ingress ports and egress ports, the communication interface 5353 may include any operable connection. An operable connection may be one in which signals, physical communications, and/or logical communications may be sent and/or received. An operable connection may include a physical interface, an electrical interface, and/or a data interface. The communication interface 5353 may be connected to a network. The network may include wired networks (e.g., Ethernet), wireless networks, or combinations thereof. The wireless network may be a cellular telephone network, an 802.11, 802.16, 802.20, or WiMax network, a Bluetooth pairing of devices, or a Bluetooth mesh network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory 5352) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

Bath

Figure 77:
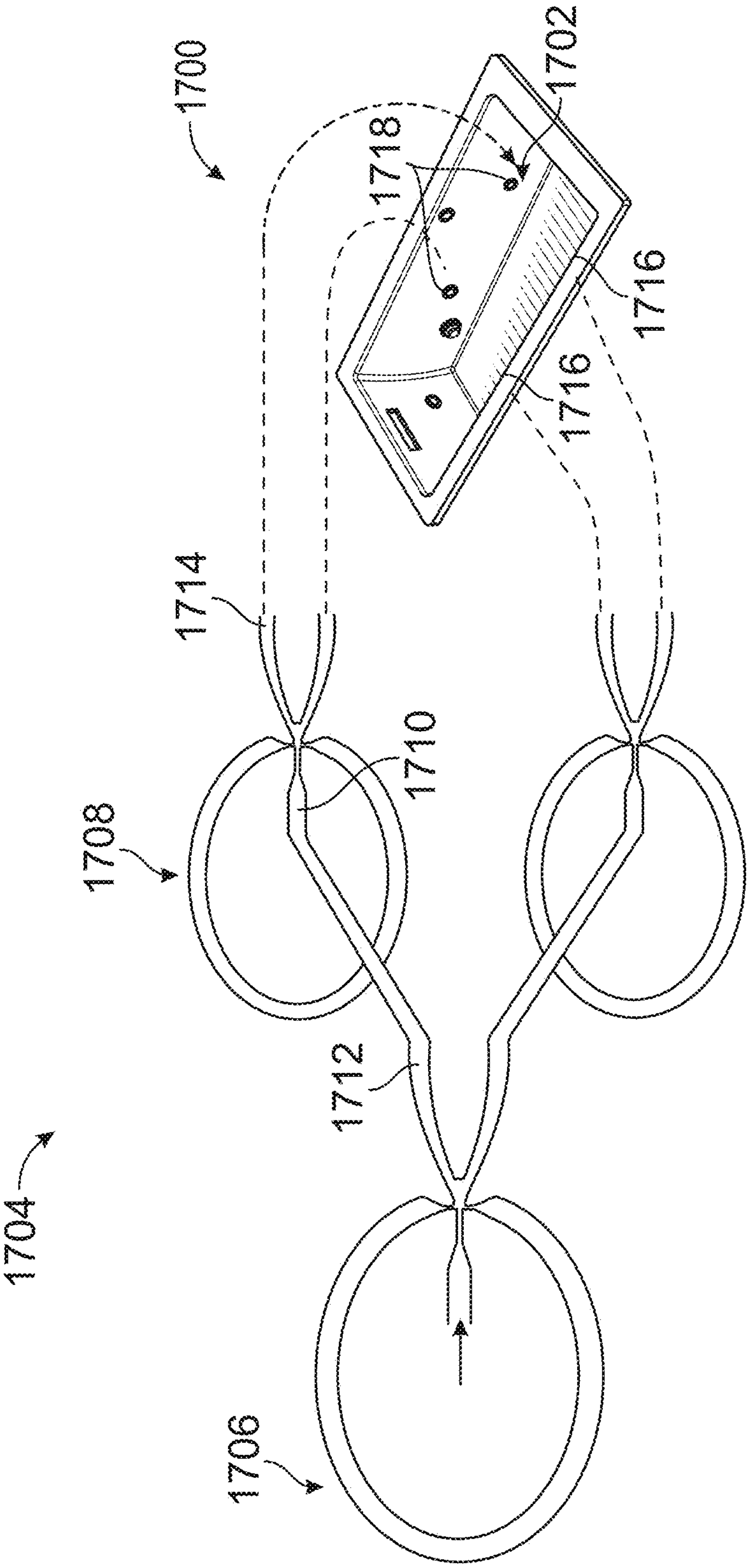
FIG. 77 is a schematic illustration of a chained fluidics device for a whirlpool bath, according to an exemplary embodiment.

Referring now to FIG. 77, a bath 1700 is shown, according to an exemplary embodiment. As shown in FIG. 77, the bath 1700 is configured as a whirlpool bath including a plurality of jets 1702 along the side walls of the bath 1700. In other embodiments, the bath 1700 may include a hot tub or jacuzzi. The bath 1700 includes a plurality of fluidic oscillators 1704 fluidly coupled to the plurality of jets 1702. As shown in FIG. 77, the plurality of fluidic oscillators 1704 include an upper stage fluidic oscillator 1706 and two lower stage fluidic oscillators 1708. An inlet channel 1710 to each of the lower stage fluidic oscillators 1708 is coupled to a corresponding one of a plurality of outlet channels 1712 from the upper stage fluidic oscillator 1706. The outlet channels 1714 from the lower stage fluidic oscillators 1708 are each coupled to a corresponding one of the jets 1702 in the bath 1700.

The number of water pulses provided by each of the jets 1702 over time can be dynamically controlled; for example, by varying the operating frequency of the upper and lower stage fluidic oscillators 1706, 1708. The number, type, and arrangement of fluidic oscillators 1706, 1708 and jets 1702 may be adjusted according to user preferences to improve the overall bathing experience. For example, the upper stage fluidic oscillator 1706 may be configured to operate at a lower frequency than the lower stage fluidic oscillators 1708, resulting in a periodic switching of flow between pairs of jets (a first pair of jets 1716 and a second pair of jets 1718 on either side of the user).

In some embodiments, the bath 1700 includes a fluidic oscillator configured to produce specialty jets (e.g., toroidal jets, etc.). The fluidic oscillator may be the same or similar to the fluidic oscillator 702 described with reference to FIGS. 57-59. The specialty jets improve flow penetration into the bath relative to a jet that produces a continuously flowing stream of water, which, advantageously, improves the user experience.

Figure 78:
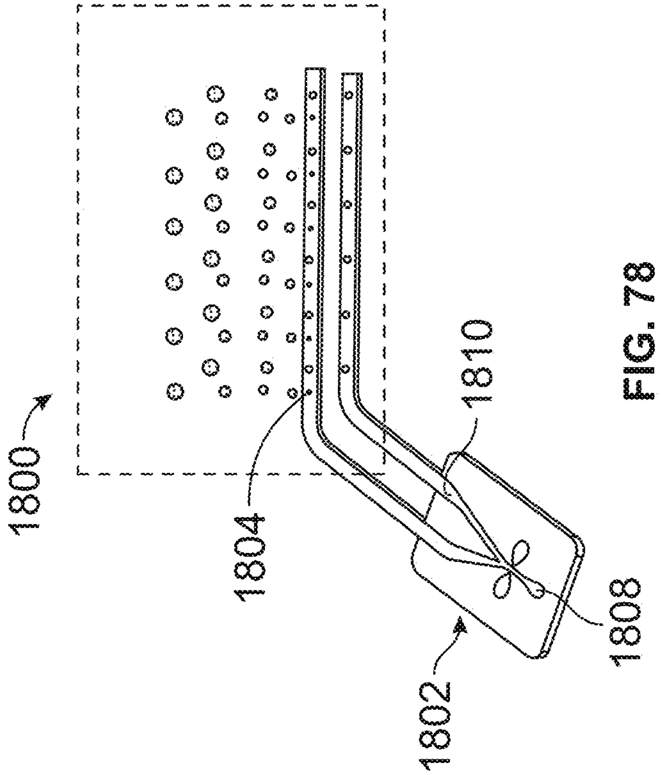
FIG. 78 is a sectional view of a fluidics device configured to produce microbubbles, according to an exemplary embodiment.
Figure 79:
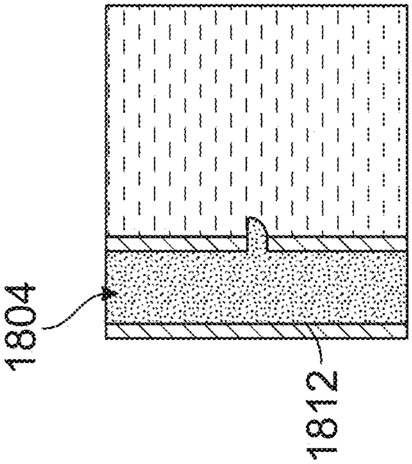
FIGS. 79-82 are illustrations of microbubble formation from an opening connected to a fluidic oscillator, according to various exemplary embodiments.
Figure 80:
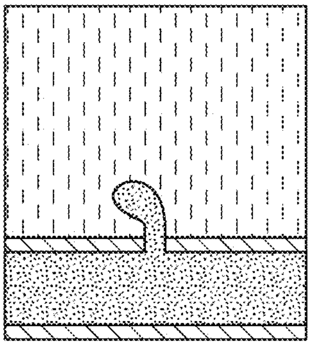
Figure 81:
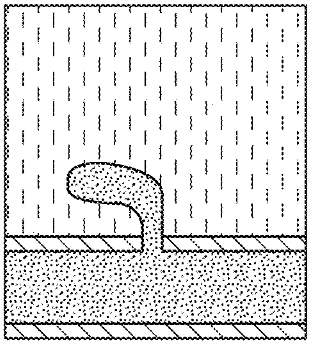

Referring now to FIG. 78, a bath 1800 is shown, according to an exemplary embodiment. The bath 1800 includes a fluidic device 1802 configured to generate microbubbles in the bath fill. As shown in FIG. 78, the bath 1800 includes a porous material 1804 disposed along a lower wall of the bath 1800. The porous material 1804 may include a metal mesh, a porous ceramic or graphite, or any other suitable material. The pore size of the porous material 1804 may be approximately 40 micron, although this may vary depending on the desired size of the microbubbles. In other embodiments, the placement of the porous material 1804 within the bath 1800 may be different (e.g., along a side wall of the bath 1800, etc.). The fluidic device 1802 includes a fluidic oscillator 1806, which may be, for example, a compressed air powered bi-stable fluidic oscillator. As shown in FIG. 78, the fluidic oscillator 1806 includes an inlet channel 1808 and an outlet channel 1810. The inlet channel 1806 is fluidly coupled to the surroundings (e.g., an atmosphere surrounding the bath). The outlet channel 1810 is fluidly coupled to the porous material 1804. The fluidic oscillator 1806 provides a source of pulsating air flow to the porous material 1804, causing small bubbles or pockets of air to form and detach from the surface of the porous material 1804. Among other benefits, the fluidic device 1802 operates with less noise as compared to aspirated whirlpool jets.

Figure 82:
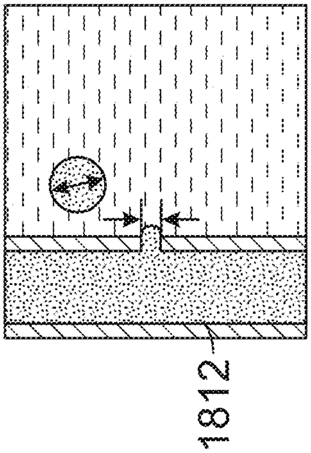
Figure 83:
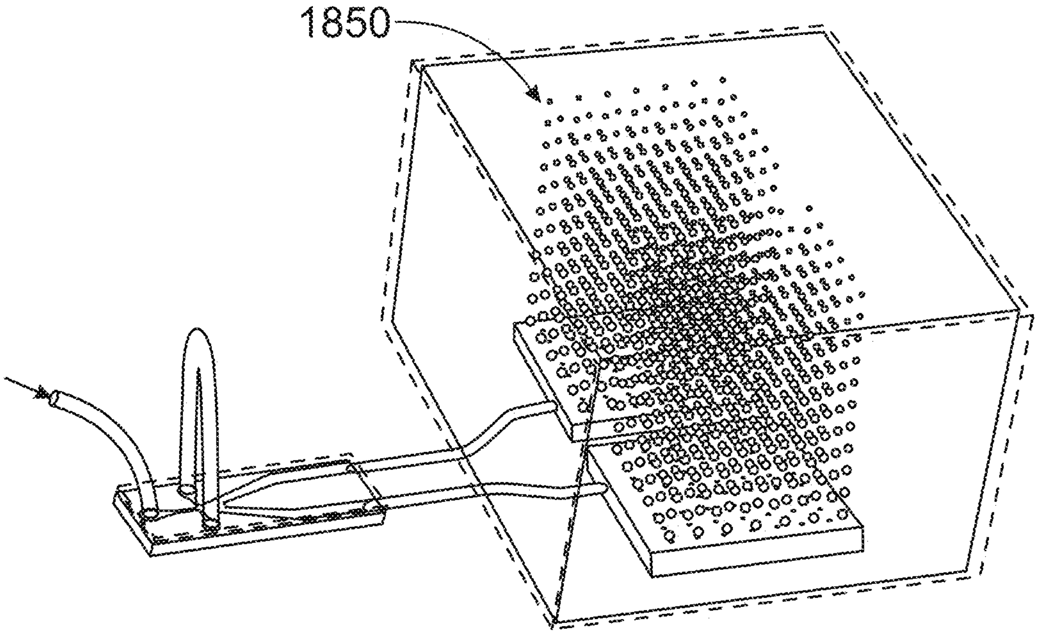
FIGS. 83-84 are illustrations of microbubbles in water, according to various exemplary embodiments.
Figure 84:
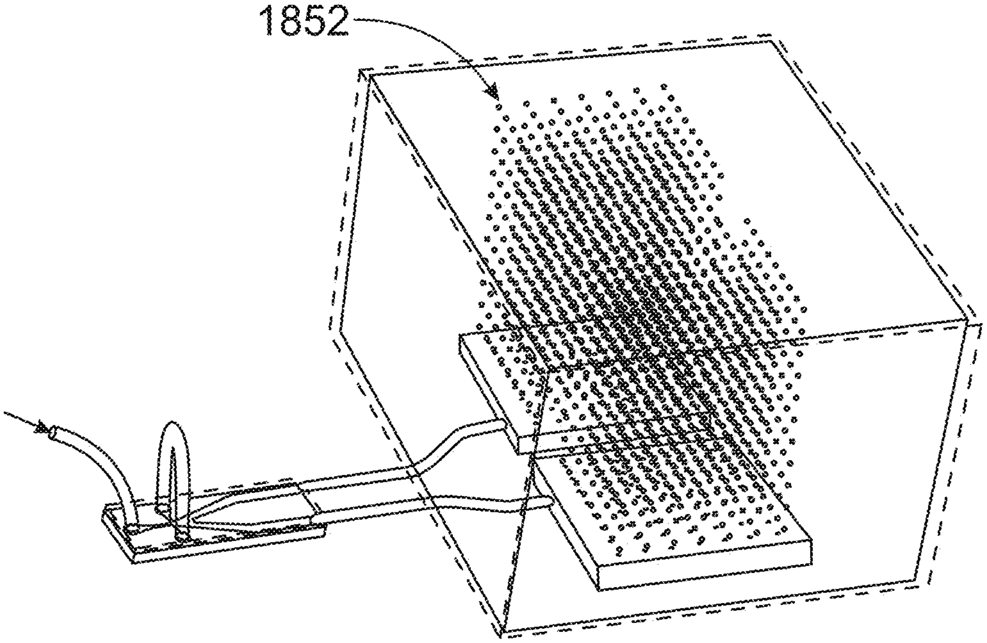

FIGS. 79-82 illustrate the process of bubble formation from a single pore 1812 of the porous material 1804. As shown in FIG. 82, a diameter of the bubble generated by the fluidic device 1802 is approximately the same as a diameter of the pore 1812. According to an exemplary embodiment, the pore 1812 size is approximately equal to 50 μm or smaller. Among other benefits, smaller bubbles will remain suspended within the bath fill for a longer period of time relative to large bubbles. The microbubbles also provide enhanced cleaning capabilities relative to large bubbles. Moreover, the microbubbles provide a unique sensation to an occupant of the bath (e.g., a tingling feeling, etc.), which improves the overall user experience. The microbubbles do not grow or combine which, advantageously, reduces the tendency of bubbles to cool and evaporate as they approach an upper surface of water in the bath 1800. According to an exemplary embodiment, the fluidic device 1802 is configured to generate billions of bubbles per second in a variety of sizes depending on the distribution of pore size in the porous material 1804, the supply air pressure to the fluidic device and the geometry of the fluidic device. FIGS. 83-84 illustrate possible flow fields (bubble size 1850 in FIG. 83, and bubble size 1852 in FIG. 83) that may be realized within the bath through the generation of microbubbles, according to various exemplary embodiments.

The number, type, and arrangement of components used in the fluidic device 1802 of FIG. 78 should not be considered limiting. For example, each outlet channel may be fluidly coupled to a different portion (e.g., section, part, etc.) of the porous material 1804 or to separate sheets of porous material located in different parts of the bath 1800. As with other embodiments described herein, the fluidic device 1802 may further include a lever, toggle, switch, or another form of actuator configured to vary an operating frequency of the fluidic oscillator in order to provide a user with the ability to customize the bathing experience.

Faucet

Figure 85:
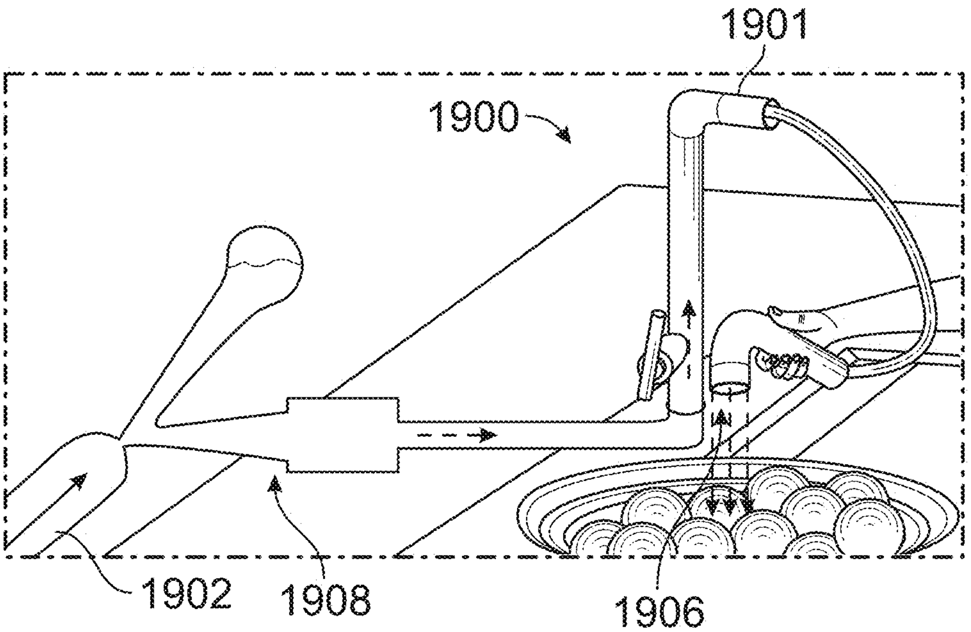
FIG. 85 is a side sectional view of a fluidic oscillator for a faucet, according to an exemplary embodiment.

Referring now to FIG. 85, a faucet 1900 is shown, according to an exemplary embodiment. The faucet 1900 may be a kitchen or bathroom faucet, or a permanent plumbing fixture in another room of a building. In some embodiments, the faucet 1900 is coupled to a countertop. The faucet 1900 includes a water inlet 1902 configured to receive water from a water supply conduit. The water supply conduit may be a water supply line inside a household, a commercial property, or another type of building. The water supply conduit may be configured to supply water at a city water pressure or well pump pressure to the faucet 1900. The water supply conduit may be a pipe, tube, or other water delivery mechanism. As shown in FIG. 85, the faucet 1900 includes a retractable spigot 1904.

As shown in FIG. 85, the faucet 1900 includes a plurality of jets 1906 disposed at a discharge end of the retractable spigot 1904. The faucet 1900 also includes a fluidic oscillator 1908. According to an exemplary embodiment, the fluidic oscillator 1908 is a mono-stable fluidic oscillator 1908 configured to supply a pulsating flow of water to each of the jets 1906. An inlet channel of the fluidic oscillator

1908 is fluidly coupled to the water supply conduit. An outlet channel of the fluidic oscillator 1908 is fluidly coupled to an inlet to the faucet body 1901. In some embodiments, the faucet 1900 additionally includes a lever, toggle, switch, or another form of actuator configured to adjust an operating frequency of the fluidic oscillator 1908 (e.g., by adjusting the volume of a resonant chamber of the fluidic oscillator 1908, etc.). Among other benefits, the flow pulsations produced by the fluidic oscillator 1908 may function as a water hammer to improve the removal of stuck-on dirt and contaminants from surfaces of dishware. Moreover, the fluidic oscillator 1908 may be tuned to introduce small bubbles (e.g., microbubbles or nanobubbles) into the spray, which can, advantageously, improve the cleaning capabilities of the faucet 1900.

In some embodiments, the mono-stable fluidic oscillator 1908 is replaced with a fan oscillator similar to the fan oscillator 502 described with reference to FIG. 46. In other embodiments, the fluidic oscillator includes a bi-stable fluidic oscillator.

Figure 86:
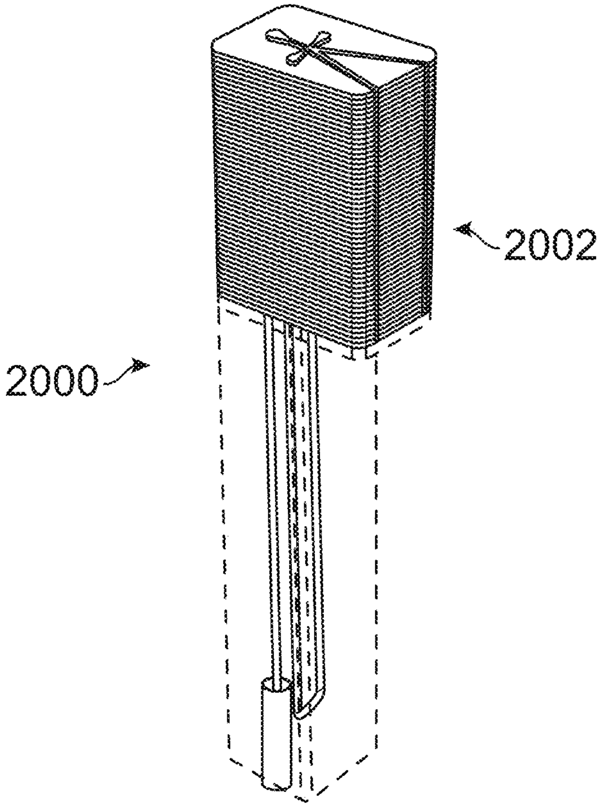
FIGS. 86-87 are perspective views of a fluidic oscillator for a faucet, according to another exemplary embodiment.
Figure 87:
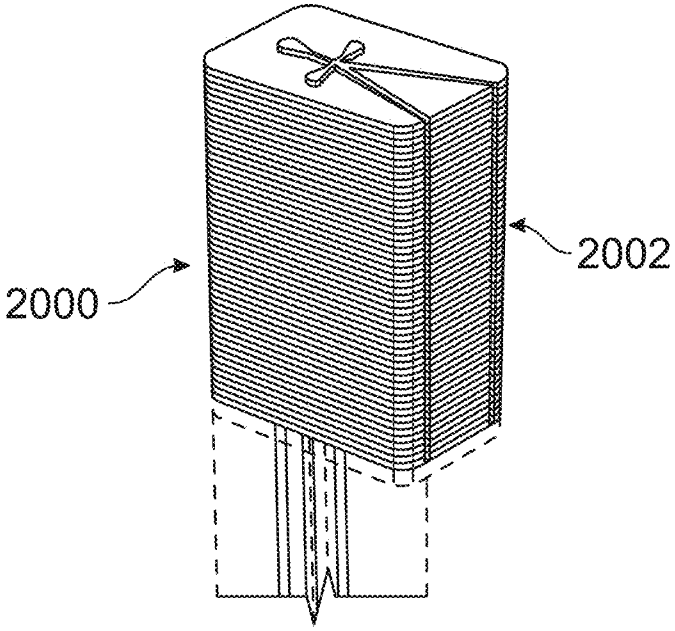

FIGS. 86-87 show a faucet 2000 including a plurality of bi-stable fluidic oscillators 2002, according to an exemplary embodiment. Each bi-stable fluidic oscillator 2002 includes a substantially rectangular plate onto which the channels of the bi-stable fluidic oscillator 2002 are formed. The bi-stable fluidic oscillators 2002 are arranged in parallel with one another in order to reduce pressure drop through the faucet 2000. In some embodiments, the faucet 2000 may be configured to activate different sets of fluidic oscillators 2002 in response to various control commands (e.g., manual manipulation of a lever, switch, or other form of actuator).

Figure 90:
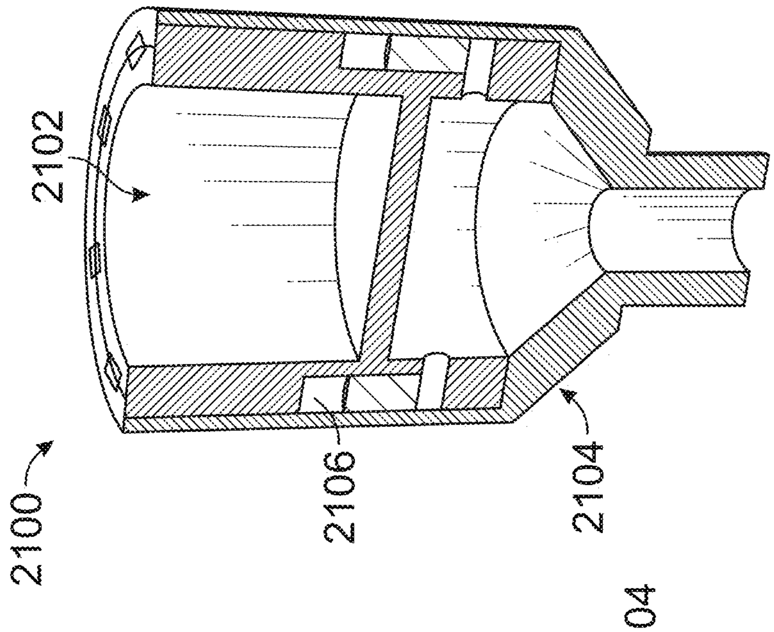
FIG. 90 is a sectional view of the fluidic oscillator of FIG. 88, according to an exemplary embodiment.
Figure 89:
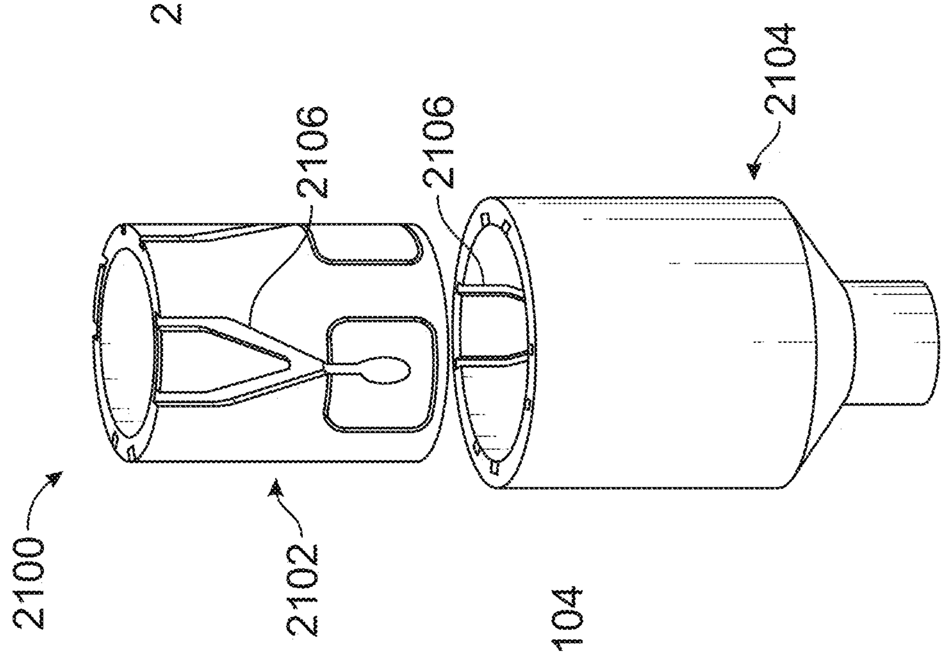
FIG. 89 is an exploded perspective view of the fluidic oscillator of FIG. 88, according to an exemplary embodiment.
Figure 88:
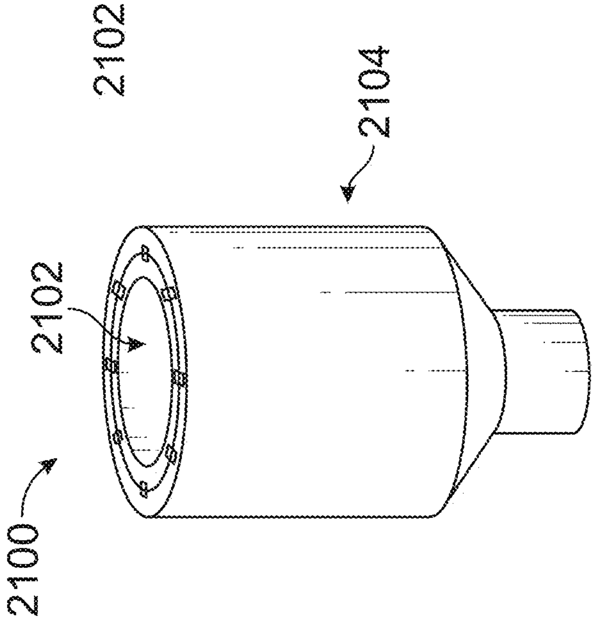
FIG. 88 is a perspective view of a fluidic oscillator for a faucet, according to another exemplary embodiment.

FIGS. 88-90 show a nozzle insert 2100 for a faucet, according to an exemplary embodiment. The insert 2100 is configured to engage with (e.g., insert into, couple to, etc.) an outlet of a faucet. In some embodiments, the nozzle insert 2100 is a retrofit nozzle configured to detachably couple to an existing faucet body. As shown in FIGS. 88-90, insert 2100 includes an inner portion 2102 and an outer portion 2104. As shown in FIG. 89, the inner portion 2102 is received within a chamber defined by the outer portion 2104 such that the outer portion 2104 surrounds the inner portion 2102. As shown in FIG. 89, both the inner portion 2102 and the outer portion 2104 are shaped as concentric cylinders. In other embodiments, the shape and arrangement of the inner and outer portions 2102, 2104 may be different.

According to an exemplary embodiment, both the inner portion 2102 and the outer portion 2104 include a plurality of channels 2106, which are machined or otherwise formed onto mating surfaces of the inner portion 2102 and the outer portion 2104 (e.g., an outer surface of the inner portion 2102 and an inner surface of the outer portion 2104). Together, the plurality of channels 2106 on the inner and outer portions 2102, 2104 form a plurality of bi-stable fluidic oscillators.

FIG. 90 shows the direction of flow through the nozzle insert 2100. Flow received at a first end of the insert (e.g., a lower end of the insert as shown in FIG. 90) passes into a distribution chamber. Flow is redirected from the distribution chamber through holes in the inner portion 2102 and into the channels occupying an annular region between the inner portion 2102 and the outer portion 2104. As shown in FIG. 90, the flow moves substantially axially (e.g., upwardly as shown in FIG. 90, parallel to an axis of the insert 2100, etc.) through the channels of the fluidic oscillators, which cause the flow to switch rapidly between a plurality of jets (e.g., outlet openings, etc.).

Figure 91:
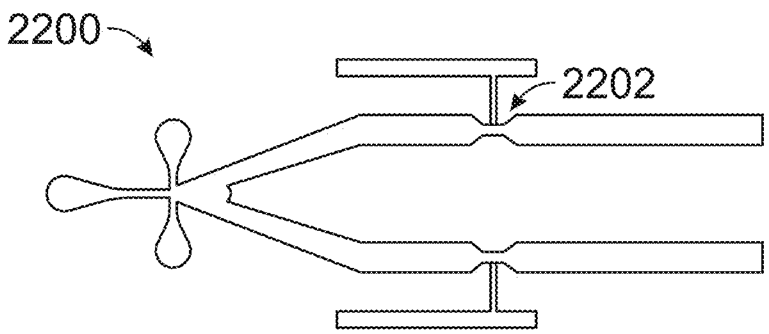
FIG. 91 is a sectional view of a fluidics device configured to generate microbubbles, according to another exemplary embodiment.
Figure 92:
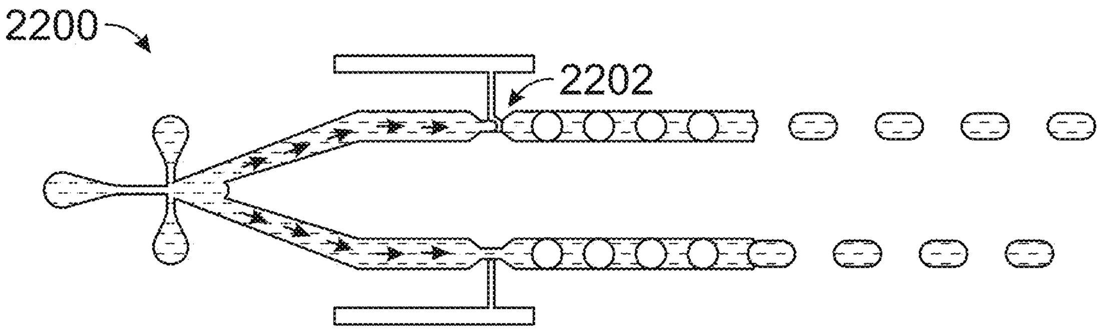
FIG. 92 is a sectional view of the fluidics device of FIG. 91 during normal operation, according to an exemplary embodiment.

The geometry of the channels may be modified in order to achieve different spray patterns and flows at the outlet of the insert 2100. For example, the insert 2100 may be modified to include a plurality of venturis along each outlet channel of the pulsating fluidic device to reduce water consumption and/or increase the cleaning capabilities of the faucet. FIGS. 91-92 show a fluidic oscillator 2200 including venturis 2202 arranged just upstream of the jets.

Pumping Device

Figure 93:
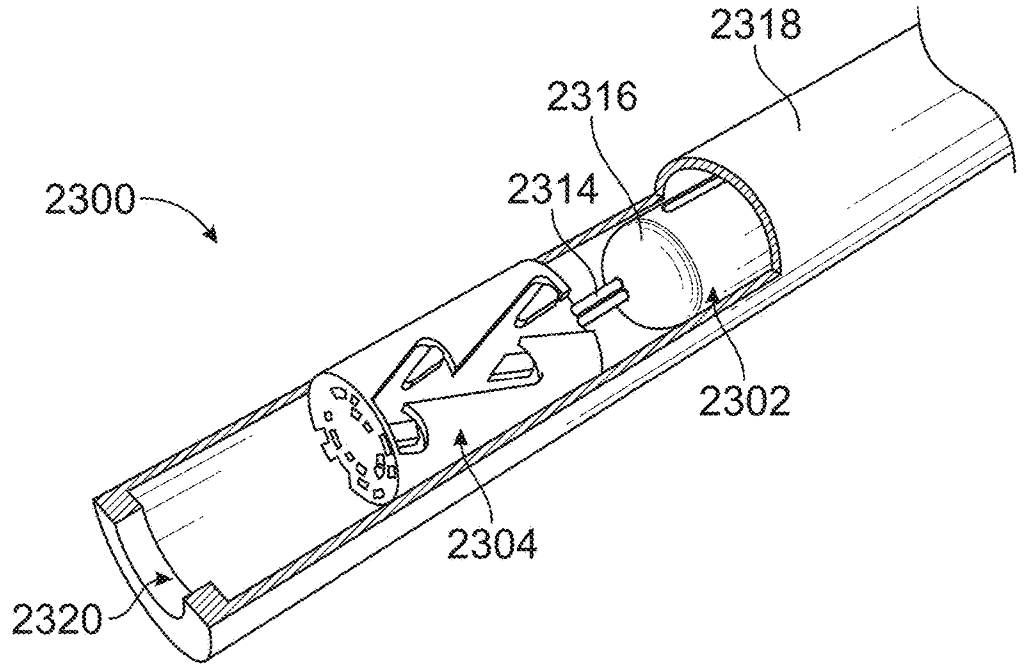
FIG. 93 is a perspective sectional view of a pumping device, according to an exemplary embodiment.
Figure 94:
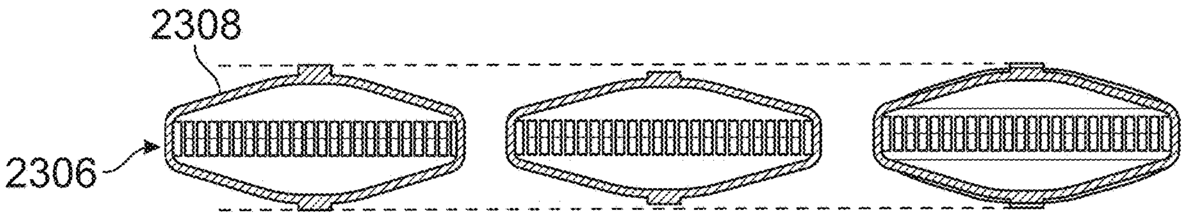
FIG. 94 is a side sectional view of a piezo element in various states of operation, according to an exemplary embodiment.
Figure 95:
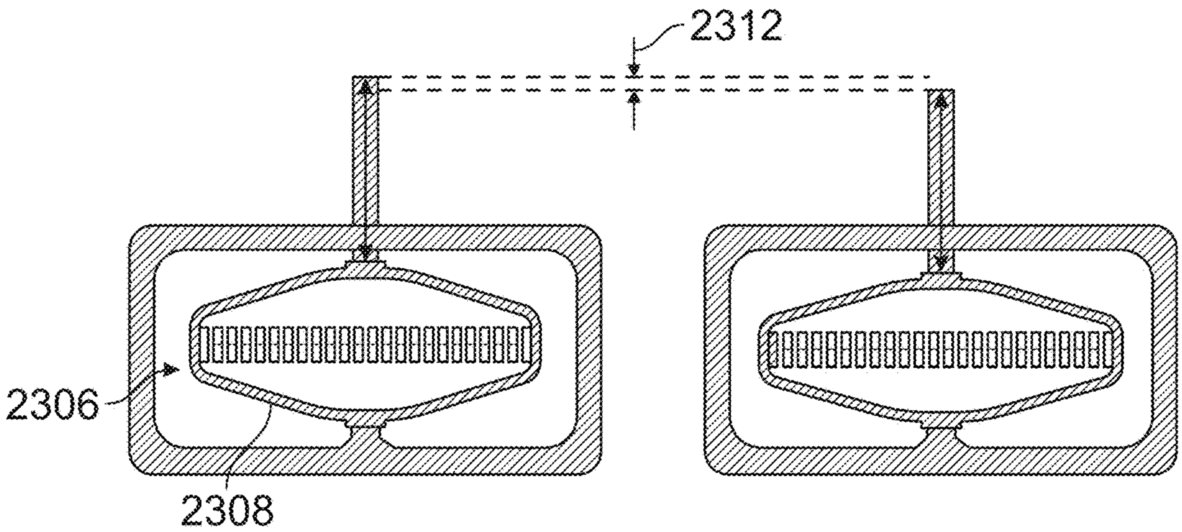
FIG. 95 is a side sectional view of a single piezo element that illustrates the displacement of the piezo element, according to an exemplary embodiment.
Figure 96:
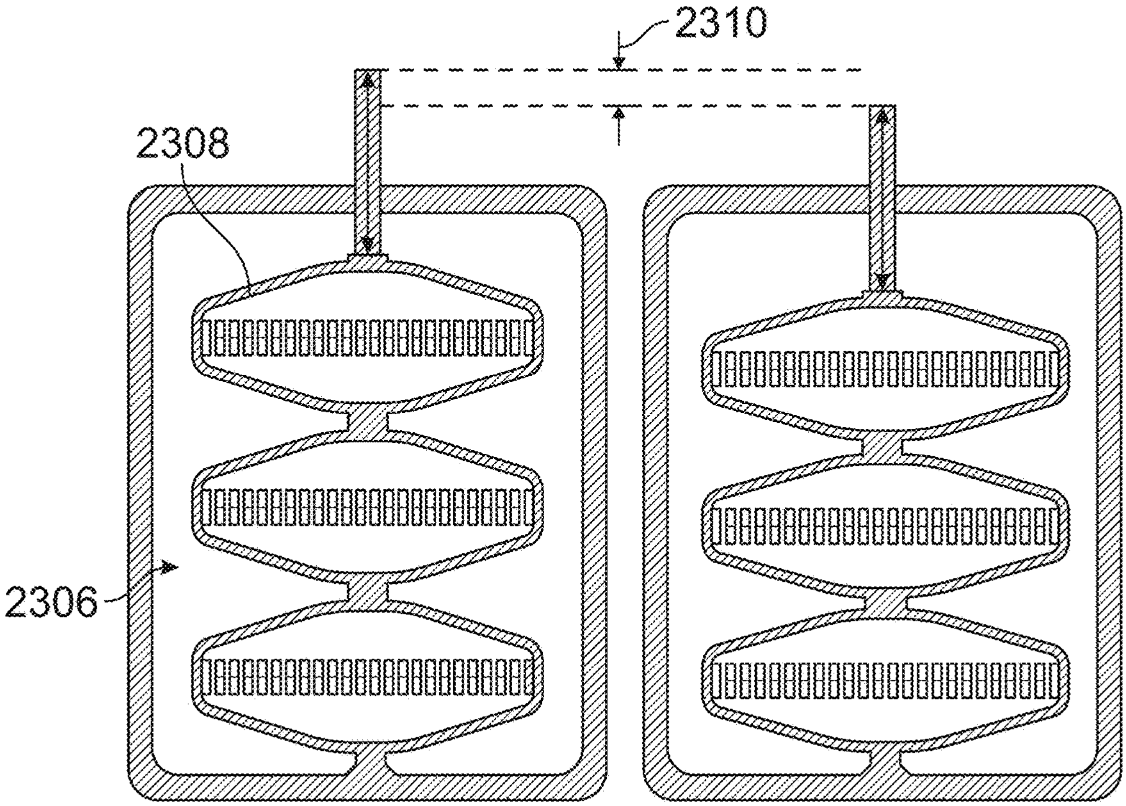
FIG. 96 is a side sectional view of a stack of piezo elements that illustrates the displacement of the stack, according to an exemplary embodiment.

FIG. 93 shows a pumping device 2300, according to an exemplary embodiment. The pumping device 2300 is structured to produce a pulsating jet of water. The pumping device 2300 includes a fluidic driver 2302 and a rectifier 2304 coupled to the fluidic driver 2302. The fluidic driver 2302 is structured to reposition and/or vibrate the rectifier 2304. The fluidic driver 2302 includes a plurality of piezo elements. As shown in FIG. 6, each one of the piezo elements 2306 includes a piezo actuator 2308 (e.g., a piezoelectric ceramic disc), which is structured to convert an electrical signal into a physical displacement. Among other benefits, the piezo elements 2306 may be actuated at very high frequencies as compared to other actuators such as solenoids. FIGS. 95 and 96 compare a total displacement that can be achieved by a single piezo element 2306 (FIG. 95) and a plurality of piezo elements 2306 stacked on top of one another (FIG. 96). As shown in FIG. 96, a total displacement 2310 of the plurality of piezo elements 2306 is approximately equal to the sum of the displacements 2312 of each individual piezo element (see FIG. 95). The fluidic driver 2302 additionally includes a housing 2316 configured to receive the piezo elements 2306 therein. As shown in FIG. 93, the piezo elements 2306 are coupled to the rectifier 2304 by a connecting member 2314 (e.g., a cylindrical rod, post, etc.).

Figure 97:
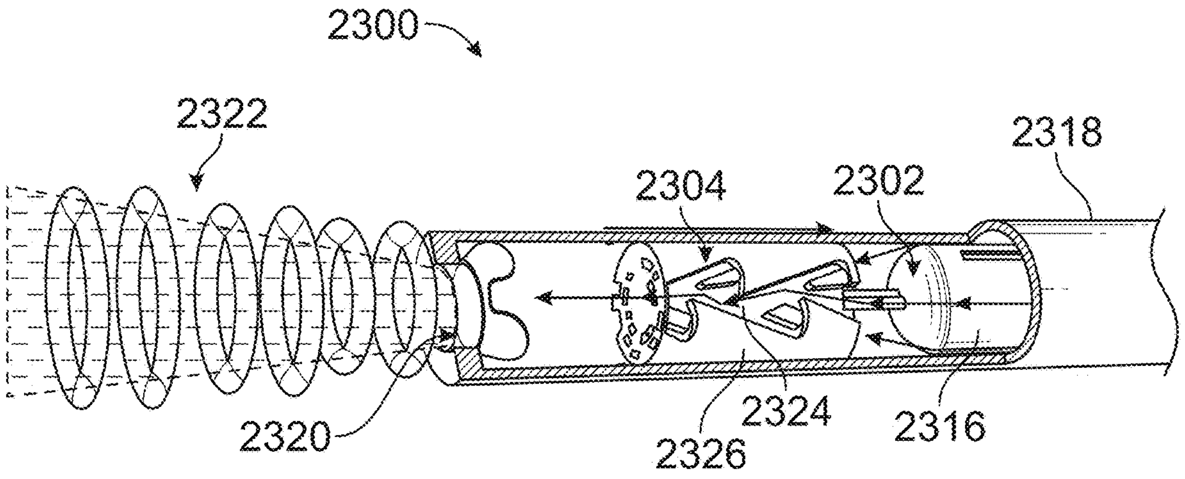
FIG. 97 is a perspective sectional view of the pumping device of FIG. 93 in a first state of operation.
Figure 98:
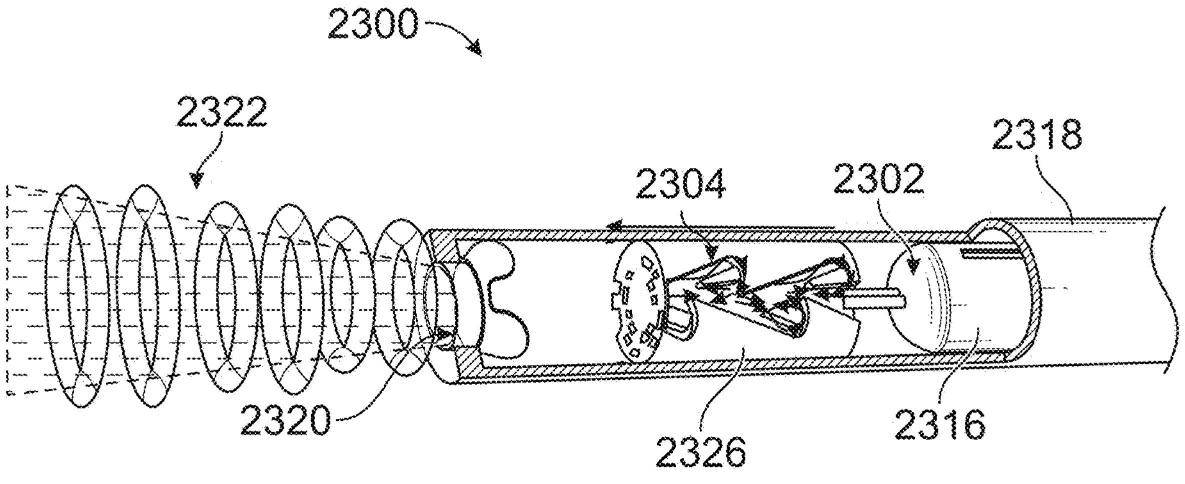
FIG. 98 is a perspective sectional view of the pumping device of FIG. 93 in a second state of operation.

FIGS. 97-98 show a side view of the pumping device 2300 in operation. Both the fluidic driver 2302 and the rectifier 2304 are disposed within a hollow sleeve 2318 in coaxial arrangement with the hollow sleeve 2318. As shown in FIG. 97, fluid flows around the housing 2316, through an annular space between the housing 2316 and the hollow sleeve 2318. Movement of the rectifier 2304 draws the fluid toward an opening 2320 (e.g., nozzle, through-hole, etc.) disposed in an end of the hollow sleeve 2318. The movement of the rectifier 2304 generates a pulsating jet of fluid 2322 that is ejected from the opening 2320. As shown in FIG. 97, when the rectifier 2304 is drawn back toward the fluidic driver 2302, fluid is allowed to pass freely (e.g., with little restriction, at low pressure drop through the rectifier 2304) through internal passages 2324 in a body 2326 of the rectifier 2304. As shown in FIG. 98, the geometry of the passages 2324 prevents fluid from returning through the rectifier 2304 (e.g., back toward the fluidic driver 2302) when the rectifier 2304 moves away from the fluidic driver 2302 toward the opening 2320. The reciprocating, back and forth movement of the rectifier 2304 pumps fluid out through the opening 2320, thereby generating a pulsating jet of fluid.

Figure 99:
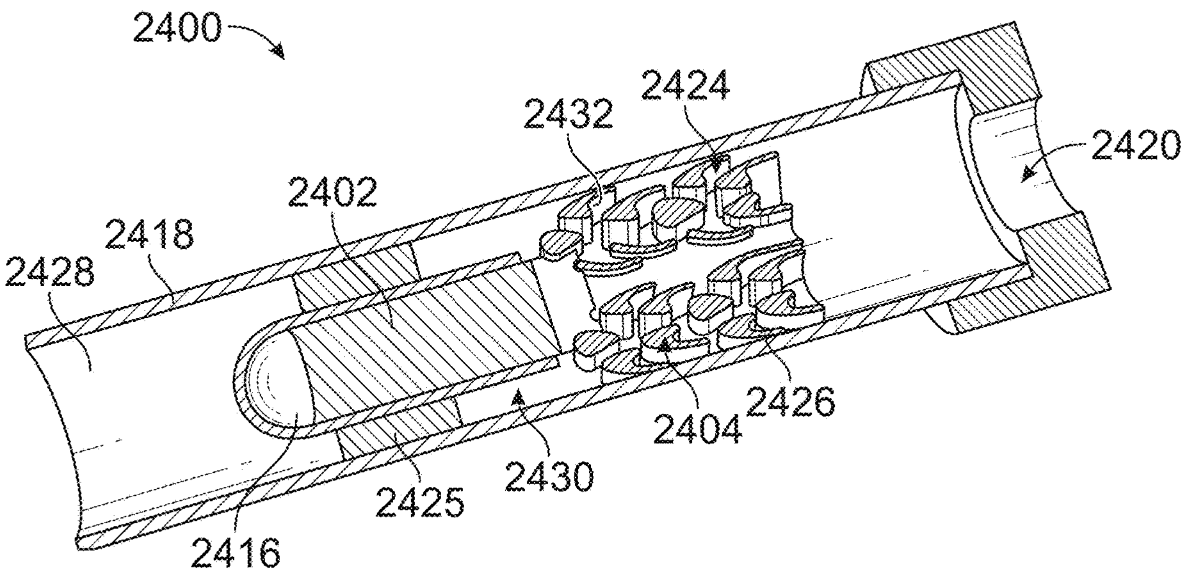
FIG. 99 is a side sectional view of a pumping device, according to another exemplary embodiment.
Figure 100:
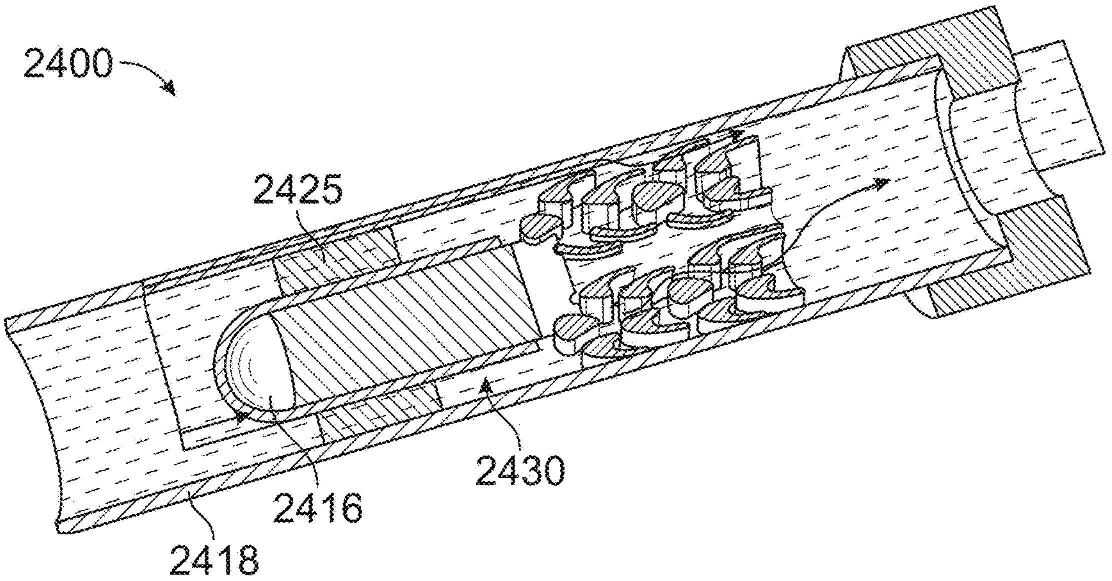
FIGS. 100-102 are side sectional views of the pumping device of FIG. 99 in various states of operation.

Referring to FIG. 99, a cross-sectional view through a pumping device 2400 that is similar to the pumping device 2300 is shown, according to an exemplary embodiment. The pumping device 2400 includes a fluidic driver 2402 and a rectifier 2404. The fluidic driver 2402 includes a plurality of extension pieces 2425 extending outwardly from a housing 2416 of the fluidic driver 2402 in substantially perpendicular orientation relative to an outer surface of the housing 2416 (e.g., radially outward relative to a central axis of the housing 2416). In the embodiment of FIG. 99, the extension pieces 2425 are thin rectangular plates. In other embodiments, the extension pieces 2425 may be thin rods, posts, or any other suitable structure. The extension pieces 2425 couple the housing 2416 to an inner surface 2428 of a hollow sleeve 2418 of the fluidic driver 2402 and support the housing 2416 in coaxial arrangement with the hollow sleeve 2418. As shown in FIG. 100, the extension pieces 2425 are sized and shaped to reduce losses and allow nearly unimpeded passage of water through an annular space 2430 between the housing 2416 and the hollow sleeve 2418.

Figure 101:
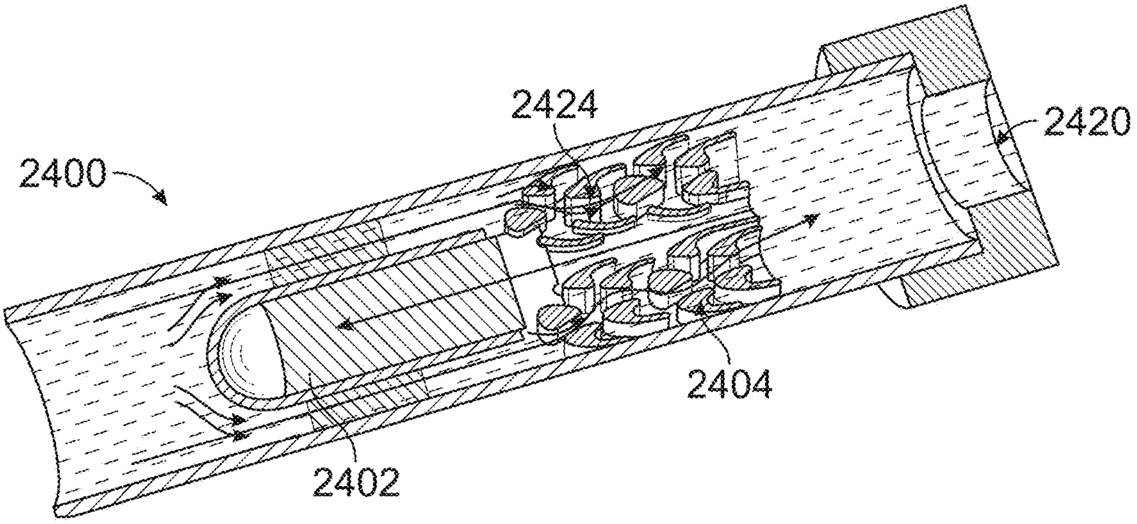
Figure 102:
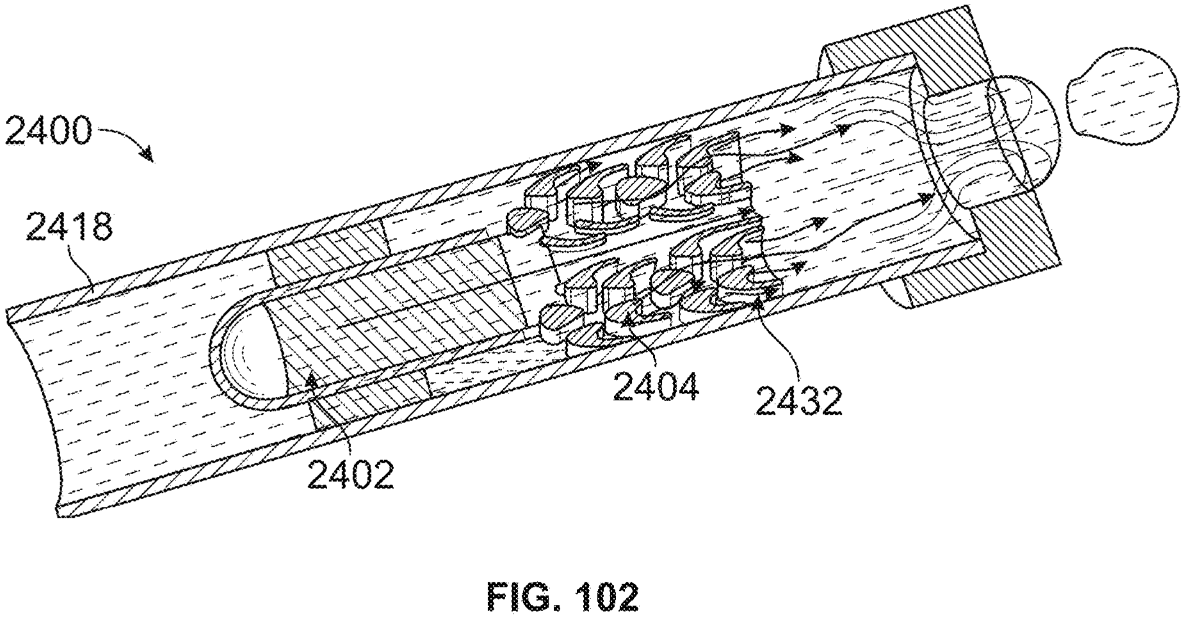
Figure 103A:
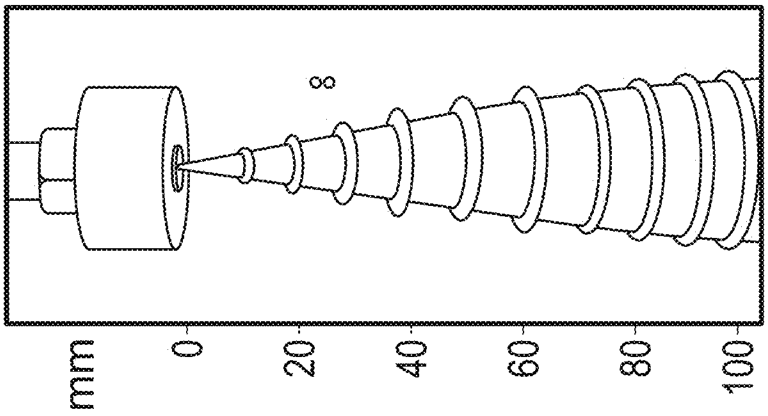
FIG. 103A-103D are images showing different flow structures produced by a pumping device, according to an exemplary embodiment.
Figure 103B:
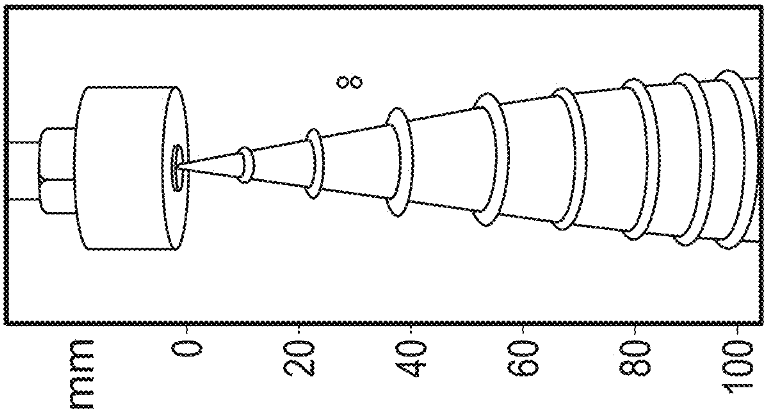
Figure 103C:
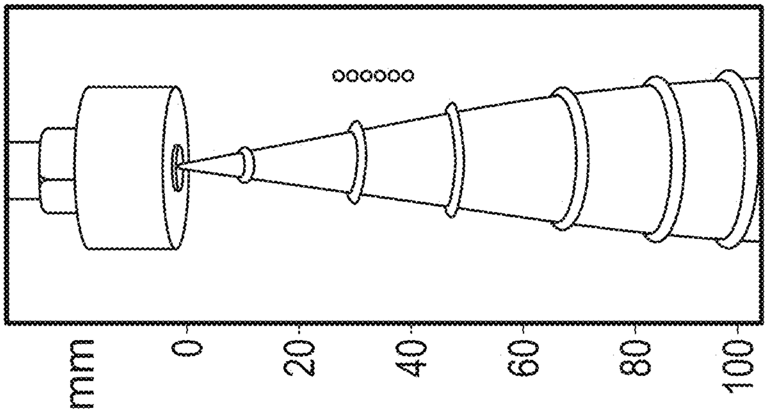
Figure 103D:
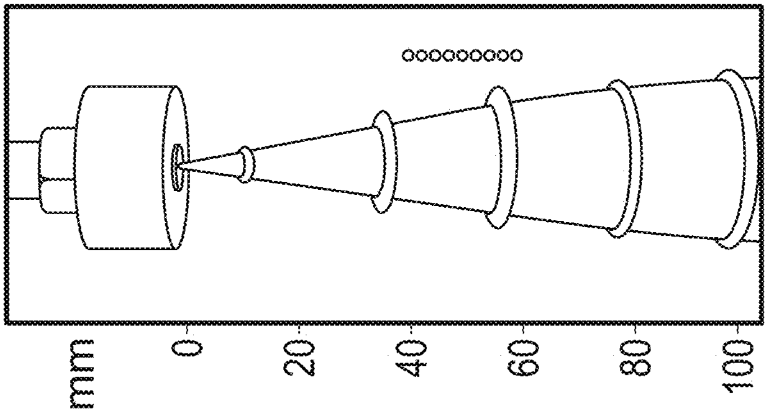

As shown in FIG. 99, the rectifier 2404 includes a plurality of internal passages 2424 formed into a body 2426 of the rectifier 2404. The internal passages 2424 are shaped to minimize flow losses (e.g., pressure drop, etc.) in a direction of flow (e.g., from the fluidic driver 2402 toward the opening 2420) through the pumping device 2400. The internal passages 2424 includes side branches 2432 that are substantially "U" shaped, which capture and entrain fluid flowing backwards through the rectifier 2404 (e.g., from an opening 2420 in the hollow sleeve 2418 toward the fluidic driver 2402). FIGS. 101-102 show the pumping device 2400 in operation. As shown in FIG. 101, when the fluidic driver 2402 retracts the rectifier 2404 away from the opening 2420, fluid is allows to pass through the internal passages 2424 with little pressure drop through the rectifier 2404. As shown in FIG. 102, as the fluidic driver 2402 extends to force the rectifier 2404 toward the opening 2420, water is prevented from back flowing through the rectifier 2404 as a result of back pressure created by the side branches 2432. Thus, the rectifier 2404 is sized and shaped to act as a piston, forcing fluid out through the opening 2420 when moving toward the opening 2420. During operation, fluid (e.g., water) continually moves through the hollow sleeve 2418 to reduce the effects of cavitation in the rectifier 2404.

FIGS. 103A-103D shows some of the various flow structures that can be produced by the pumping device 2400. The pumping device 2400 generates a pulsed jet that is substantially conical in shape. The flow structures generated by the pumping device 2400 may be varied by adjusting the frequency of the pumping device 2400 (e.g., the fluidic driver 2402).

The plumbing fixtures, of which various exemplary embodiments are disclosed herein, provide several advantages over continuous flow devices. The plumbing fixtures include one or more fluidics devices configured to control the flow of water through one or more jets of the plumbing fixture. The fluidics devices may be configured to provide pulsating flows, oscillating flows, or a combination thereof to reduce water consumption and noise, while maximizing the cleaning capabilities of the plumbing fixture. The fluidics devices may be interconnected to produce a variety of different spray patterns and flow structures. In some embodiments, the fluidics devices may be combined into a fluid logic control circuit to coordinate the timing and activation of jets for the plumbing fixture, thereby eliminating the need for complex and expensive electronic valves.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the application as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the apparatus and control system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments.

Other substitutions, modifications, changes and omissions may also be made in the design, operating conditions and arrangement of the various exemplary embodiments without departing from the scope of the present application. For example, any element disclosed in one embodiment may be incorporated or utilized with any other embodiment disclosed herein.

What is claimed is:

1. A shower head, comprising:

a water input pipe configured to supply a flow of water;

a fluidic oscillator including at least one predetermined geometry to control the flow of water ejected from the fluidic oscillator to include a repeating fan of water at a predetermined angle range, wherein the fluidic oscillator further includes a plurality of island dividers, each configured to separate the mixing chamber from a feedback channel, wherein the fluidic oscillator further comprises a mixing chamber, wherein the at least one predetermined geometry includes a narrow neck extended into the mixing chamber and the narrow neck extends farther into the fluidic oscillator than an edge at least one of the plurality of island dividers; and at least one water outlet configured to provide the flow water including the repeating fan of water from the shower head.

2. The shower head of claim 1, wherein the at least one predetermined geometry includes a convex portion forming at least in part a feedback input.

3. The shower head of claim 1, wherein the repeating fan of water includes a back and forth pattern in a horizontal or vertical direction.

4. The shower head of claim 1, wherein the fluidic oscillator further comprises:

a main flow path and a plurality of feedback paths parallel to the main flow path.

5. The shower head of claim 4, further comprising:

at least one valve configured to open and close at least one of the plurality of feedback paths.

6. The shower head of claim 1, further comprising:

a container coupled to the fluidic oscillator and configured to provide at least one agent or other substance to a main flow path of the fluidic oscillator.

7. The shower head of claim 6, further comprising:

a selector coupled to the container, wherein the at least one agent includes a plurality of agents selectable by the selector.

8. The shower head of claim 1, further comprising:

a controller configured to generate a selection command for a first valve and a feedback channel command for a second valve.

9. A shower head, comprising:

a water input pipe configured to supply a flow of water;

a fluidic oscillator including at least one predetermined geometry to control the flow of water ejected from the fluidic oscillator to include a repeating fan of water at a predetermined angle range, wherein the fluidic oscillator further comprises a mixing chamber and an island divider, wherein the at least one predetermined geometry includes a narrow neck extended into the mixing chamber toward the island divider and extending farther into the fluidic oscillator than an edge of the island divider; and at least one water outlet configured to provide the flow water including the repeating fan of water from the shower head.

10. The shower head of claim 9, wherein the at least one predetermined geometry includes a convex portion forming at least in part a feedback input.

11. The shower head of claim 9, wherein the repeating fan of water includes a back and forth pattern in a horizontal or vertical direction.

12. The shower head of claim 9, wherein the fluidic oscillator further comprises:

a main flow path and a plurality of feedback paths parallel to the main flow path.

13. The shower head of claim 12, further comprising:

at least one valve configured to open and close at least one of the plurality of feedback paths.

14. The shower head of claim 9, further comprising:

a container coupled to the fluidic oscillator and configured to provide at least one agent or other substance to a main flow path of the fluidic oscillator.

15. The shower head of claim 14, further comprising:

a selector coupled to the container, wherein the at least one agent includes a plurality of agents selectable by the selector.

16. The shower head of claim 9, further comprising:

a controller configured to generate a selection command for a first valve and a feedback channel command for a second valve.

* * * * *